(12) United States Patent
Kelly et al.

(10) Patent No.: US 10,304,147 B2
(45) Date of Patent: May 28, 2019

(54) DRIVE-THRU / POINT-OF-SALE AUTOMATED TRANSACTION TECHNOLOGIES AND APPARATUS

(71) Applicants: Kevin Kelly, Decator, GA (US); Joseph Craig Kelly, Jacksonville, FL (US)

(72) Inventors: Kevin Kelly, Decator, GA (US); Joseph Craig Kelly, Jacksonville, FL (US)

( * ) Notice: Subject to any disclaimer, the term of this patent is extended or adjusted under 35 U.S.C. 154(b) by 0 days.

(21) Appl. No.: 15/969,640

(22) Filed: May 2, 2018

(65) Prior Publication Data

US 2018/0253805 A1 Sep. 6, 2018

Related U.S. Application Data

(63) Continuation-in-part of application No. 15/799,331, filed on Oct. 31, 2017.

(60) Provisional application No. 62/464,840, filed on Feb. 28, 2017, provisional application No. 62/415,224, filed on Oct. 31, 2016.

(51) Int. Cl.
| | |
|---|---|
| *G06Q 30/00* | (2012.01) |
| *G06Q 50/12* | (2012.01) |
| *G06Q 20/32* | (2012.01) |
| *H04W 4/021* | (2018.01) |
| *G06Q 20/18* | (2012.01) |
| *G06K 19/06* | (2006.01) |

(52) U.S. Cl.
CPC ............ *G06Q 50/12* (2013.01); *G06Q 20/18* (2013.01); *G06Q 20/322* (2013.01); *H04W 4/021* (2013.01); *G06K 19/06028* (2013.01)

(58) Field of Classification Search
CPC ...... G06Q 50/12; G06Q 20/12; G06Q 20/202; G06Q 30/0633
USPC ..................................................... 705/15, 16
See application file for complete search history.

(56) References Cited

U.S. PATENT DOCUMENTS

| | | | |
|---|---|---|---|
| 4,351,247 A | 9/1982 | Clark | |
| 4,675,515 A | 6/1987 | Lucero | |

(Continued)

FOREIGN PATENT DOCUMENTS

| | | | |
|---|---|---|---|
| CA | 2 720 949 C | 6/2016 | |
| EP | 0607318 B1 | 5/1999 | |

(Continued)

OTHER PUBLICATIONS

International Search Report and Written Opinion dated Jan. 22, 2018, issued in connection with corresponding International Application No. PCT/US17/59263 (11 pages total).

(Continued)

*Primary Examiner* — Rokib Masud
(74) *Attorney, Agent, or Firm* — Rogers Towers, P.A.; Joseph P. Kincart

(57) ABSTRACT

The present invention includes methods and apparatus for the automated provision of goods through the use of scanning systems. More specifically, the present invention provides a method for automatically conveying which goods are being ordered, where the goods will be picked up, an associated method of payment, kitchen fulfillment, item tracking, and automatic delivery by a dispenser apparatus. In preferred embodiments, the present invention is applied to the automated ordering and pick-up of food items at a fast food restaurant.

20 Claims, 70 Drawing Sheets

(56) References Cited

U.S. PATENT DOCUMENTS

| | | | |
|---|---|---|---|
| 5,053,868 A | 10/1991 | Higgins et al. | |
| 5,168,354 A | 12/1992 | Martinez et al. | |
| 5,509,071 A | 4/1996 | Petrie et al. | |
| 6,003,015 A | 12/1999 | Kang et al. | |
| 6,914,582 B2 | 7/2005 | Tanaka | |
| RE42,759 E | 9/2011 | Olewicz et al. | |
| 8,181,920 B2 | 5/2012 | Brown | |
| 8,319,738 B2 | 11/2012 | Taylor | |
| 8,365,868 B2 | 2/2013 | Johnson et al. | |
| 8,583,490 B2 | 11/2013 | Klementowicz | |
| 8,626,590 B2* | 1/2014 | Istfan | G06Q 10/10 705/15 |
| 8,651,324 B2 | 2/2014 | Borghi | |
| 8,886,557 B2 | 11/2014 | Shahbazi et al. | |
| 9,715,685 B2* | 7/2017 | Berlin | G06Q 30/00 |
| 2004/0153377 A1 | 8/2004 | Dallman | |
| 2005/0154560 A1 | 7/2005 | Fitzpatrick et al. | |
| 2008/0255901 A1 | 10/2008 | Carroll et al. | |
| 2011/0173041 A1 | 7/2011 | Breitenbach et al. | |
| 2012/0036028 A1 | 2/2012 | Webb | |
| 2012/0170728 A1 | 7/2012 | Inengrovitz et al. | |
| 2014/0089077 A1* | 3/2014 | Zuckerman | G07F 17/0064 705/14.37 |
| 2014/0163849 A1 | 6/2014 | Adam et al. | |
| 2014/0172531 A1 | 6/2014 | Liberty et al. | |
| 2014/0358703 A1 | 12/2014 | Stuntebeck et al. | |
| 2015/0144653 A1* | 5/2015 | Kline | B67D 1/0888 222/1 |
| 2015/0324890 A1 | 11/2015 | Wilson et al. | |
| 2016/0148269 A1* | 5/2016 | Lamont | G06Q 30/0267 705/14.63 |
| 2016/0148306 A1* | 5/2016 | Bellavance | G06Q 30/0641 705/15 |
| 2016/0156635 A1 | 6/2016 | Liu et al. | |
| 2016/0159496 A1 | 6/2016 | O'Toole | |
| 2016/0244311 A1* | 8/2016 | Burks | B67D 1/0888 |
| 2016/0247142 A1 | 8/2016 | Yang et al. | |
| 2016/0353235 A1 | 12/2016 | Williams et al. | |

FOREIGN PATENT DOCUMENTS

| | | |
|---|---|---|
| JP | 2015041339 A | 3/2015 |
| WO | 2015050515 A1 | 4/2015 |
| WO | 2015114331 A1 | 8/2015 |

OTHER PUBLICATIONS

International Search Report and Written Opinion dated Jul. 13, 2018, issued in connection with corresponding International Application No. PCT/US18/30303 (10 pages total).

* cited by examiner

980 — 981 983 —
982 —

970 —

Ordering Process at a Kiosk

- 1600 Optionally commence ordering process with a facial scan
- 1601 Allow a user to place an order at a kiosk, or on a mobile device then scan order barcode at kiosk
- 1602 Communicate order, identification and other data to servers/cloud and receive information back to a mobile device to constitute a barcode
- 1603 Issue an order to restaurant to create a logistics order in kitchen and signals to a label printer to print a barcode
- 1604 Prepare the order and affix the label to a tray, cup or other packaging
- 1605 Place order into dispenser and optionally scan barcode with a barcode scanner
- 1606 Communicate progress of order to customer
- 1607 Initiate a communication process at the dispenser where the customer presents their mobile device with barcode to scanner at the dispenser
- 1608 Move dispenser positions to open the pod with the order to the customer where they pick out the order

FIG. 16

License Plate Scanning and Dispensing Apparatus

Allow a user to place an order via any accepted process at a restaurant that associates the order with a user
1800

Allow a user to drive a vehicle through a drive-thru lane to a dispenser
1801

Scan the license plate of the car
1802

Send image data related to the license plate scan to servers/cloud and determine if the user is in the system
1803

If the user is in the system and an order is ready for pickup at the dispenser move a related food product to a pickup location of the dispenser
1804

Optionally send a bar code to a mobile device of the user and request the user scan the barcode to the device to authorize dispensing, in the alternative authorize the dispensing based on the license plate scan
1805

Dispense the product to the customer of the vehicle at a dispenser
1806

FIG. 18

Operational Flows not Involving Mobile Application Processing

---

1900 — Allow a user to approach a kiosk within a restaurant without a mobile device 1901 — Receive an order from the user at a kiosk 1902 — Communicate order, identification and other data to servers/cloud and receive information back to kiosk, print a receipt with a unique barcode at kiosk and distribute to user 1903 — Issue an order to restaurant to create a logistics order in kitchen and signals to a label printer to print a barcode 1904 — Prepare the order and affix the label to a tray, cup or other packaging 1905 — Place order into dispenser and optionally scan barcode with a barcode scanner 1906 — Communicate progress of order to user 1907 — Initiate a communication process at the dispenser where the customer presents their receipt with barcode to scanner at the dispenser 1908 — Move dispenser positions to open the pod with the order to the user where they pick out the order

FIG 19

Operational Flows with Drive-thru Point of Sale Kiosk Scan

Allow a user to drive a vehicle to a restaurant without a mobile device
2000

Allow the user to drive the vehicle through a drive-thru lane of the restaurant
2001

Perform a scan of the license plate of the vehicle
2002

Communicate license plate image data to servers/cloud processing of the system
2003

Process image data to determine if the license plate data is associated with a user in the system
2004

Allow the user to place an order without a mobile device at an outdoor kiosk by voice command or touch screen interface
2005

Print a receipt for the order with a unique barcode and distribute to the user
2006

FIG. 20

Generation of One Time Identifiers for Shared Orders

Display menu options for a restaurant with an application on a mobile device
2110

Allow a first user to initiate a group ordering process on a mobile device
2111

Collect a number of group users and identification of users
2112

Repeat an ordering process with each group user comprising the steps of inviting the user to present an order, presenting menu options, collecting user selections if made, confirming selections with user, and informing user if others have offered to pay
2113

Communicate the status of each group order to the first user
2114

Allow the first user to complete the order process, enforcing a time limit as required
2115

Process the group order details, payment info, customer info and merchant information and generate data for a unique bar code
2116

Communicate the unique bar code information to a mobile device of the first user
2117

FIG. 21A

Remote Location Dispensing

- Optionally commence ordering process with a facial scan
2300

- Allow a user to place an order on a mobile device and request a delivery to a remote location dispenser
2301

- Communicate order, identification and other data to servers/cloud and notify restaurant of order request and remote dispenser request
2302

- On approval of restaurant, issue an order to restaurant to create a logistics order in kitchen and signals to a label printer to print a barcode
2303

- Prepare the order and affix the label to a tray, cup or other packaging
2304

- Deliver order into dispenser and optionally scan barcode with a barcode scanner
2305

- Communicate progress of order to customer with a unique barcode for order pick-up
2306

- Initiate a communication process at the remote dispenser where the customer presents their mobile device with barcode to scanner at the dispenser
2307

- Move dispenser positions to open the pod with the order to the customer where they pick out the order
2308

FIG. 23

Remote Location Dispensing and Drone Replenishment

| |
|---|
| Allow a user to place an order on a mobile device and request a delivery to a remote location dispenser<br>2400 |
| Communicate order, identification and other data to servers/cloud and notify restaurant of order request and remote dispenser request<br>2401 |
| On approval of restaurant, issue an order to restaurant to create a logistics order in kitchen and signals to a label printer to print a barcode<br>2402 |
| Prepare the order and affix the label to a tray, cup or other packaging<br>2403 |
| Dispatch a drone to the restaurant, optionally including a transportable pod to leave at restaurant, and allowing the restaurant to affix the order to the drone in a transportable pod<br>2404 |
| Allow restaurant staff to dispatch drone from restaurant, and coordinate flight of drown to the chosen remote dispenser<br>2405 |
| Deliver order into dispenser and transfer transportable pod to the dispenser, optionally picking up a transportable pod to return to home base<br>2406 |
| Communicate progress of order to customer with a unique barcode for order pick-up<br>2407 |
| Initiate a communication process at the remote dispenser where the customer presents their mobile device with barcode to scanner at the dispenser<br>2408 |
| Move dispenser positions to open the pod with the order to the customer where they pick out the order<br>2409 |

FIG. 24

Order with Application

| | |
|---|---|
| 2500 | Facilitate User Selection of Store or Dispenser in Application (Various Methods, i.e. proximity, on scan, on voice command, through app) |
| 2501 | (Optionally) Facilitate User to Send Order Request to Other Users, Combine Request |
| 2502 | Facilitate User to Select Order, Configure or Confirm Payment Options / Details |
| 2503 | Ready/Queue Order |
| 2504 | Coordinate with System |
| 2505 | Generate Unique Barcode |
| 2506 | Await Arrival at Store or Dispenser Location |
| 2507 | Use License Plate/ Facial Scanner to Recognize User (Places "Go To" Automatic Order, Suggestes Favorites, Suggests Orders, Order History) |
| 2508 | Facilitate Scan at Kiosk to Place order |
| 2509 | (Optionally) Use Signing Key to Delete Barcode Action |
| 2510 | (Optionally) Accept Payment at Kiosk if Not Paid Through Application |
| 2511 | Coordinate with System and Kitchen the Order and User Details/Identification |

FIG. 25A

Remote Ordering

| | |
|---|---|
| 2700 | Receive Request from User to Select Store or Dispenser in Application (Various Methods, i.e. proximity, on scan, on voice command, through app) |
| 2701 | (Optionally) Send Order Request to Other Users, Combine Request |
| 2702 | Facilitate Selection of Order, Configure or Confirm Payment Options / Details |
| 2703 | Ready / Queue Order |
| 2704 | Coordinate with System |
| 2705 | Receive Order, Process Payment |
| 2706 | Generate Unique Barcode |
| 2707 | Coordinate with System and Kitchen the Order and User Details / Identification |
| 2708 | Fulfill Order in Kitchen |
| 2709 | (Optionally) Deliver to Dispenser by Kitchen Staff, Drone, Vendor |
| 2710 | Notify User that Order is Ready at Pick Up Location |
| 2711 | Facilitate Arrival at Store or Dispenser Location |

FIG. 27A

Remote Ordering

| 2712 | (Optionally) Recognize User With License Plate / Facial Scanner to Move Dispenser or Notify Kitchen Staff |
|---|---|

| 2713 | (Optionally) Perform Scan of Barcode or Identifier to Move Dispensor or Notify Kitchen Staff |
|---|---|

| 2714 | (Optionally) Use Signing Key to Delete Barcode Action |
|---|---|

| 2715 | Support User Pick Up Order at Dispenser or Pick Up Location |
|---|---|

| 2716 | Return and Clean Dispenser Bin |
|---|---|

FIG. 27B

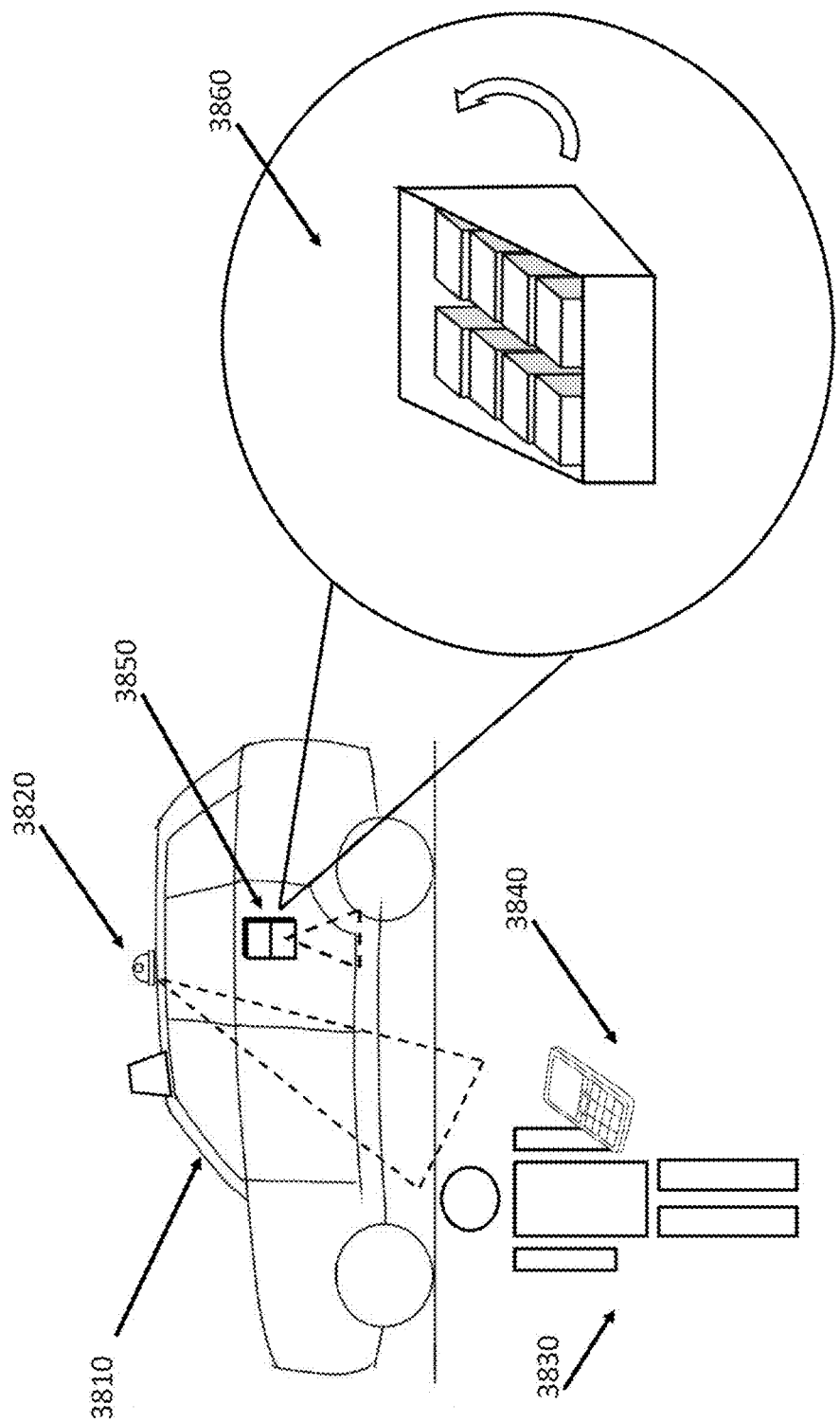

DRIVE-THRU / POINT-OF-SALE AUTOMATED TRANSACTION TECHNOLOGIES AND APPARATUS

CROSS REFERENCE TO RELATED APPLICATIONS

This application claims priority as a continuation in part to the U.S. patent application Ser. No. 15/799,331 filed Oct. 31, 2017 which in turn claims the benefit of the U.S. Provisional Patent Application 62/415,224 filed Oct. 31, 2016. The application Ser. No. 15/799,331 also claims the benefit of the U.S. Provisional Patent Application 62/464,840 filed Feb. 28, 2017. The contents of each are hereby incorporated in their entirety.

FIELD OF THE DISCLOSURE

The present disclosure relates to methods and apparatus for the automated provision of goods. More specifically, the present invention provides a method, through the use of scanning systems, for automatically conveying which goods are being ordered, processing the order at a point of sale location, such as a drive-thru, where the goods will be picked up when using location based mobile ordering, matching the customer to their order at a pick-up location, and an associated method of payment. In preferred embodiments, the present invention is applied to the automated ordering and pick-up of food items at a fast food restaurant.

BACKGROUND OF THE DISCLOSURE

Many situations involving the provision of goods in today's marketplace, such as the provision of fast food meals, are predicated on the ability of a customer to efficiently place an order and receive the meal (or other goods) with the correct food items in a quick and accurate manner.

Human interaction between the customer and the employee leaves room for time-costly mistakes due to either user error or misinterpretation through language barriers, speech impediments or the hard of hearing, inaudible conversation due to faulty drive-thru speakers, etc. These mistakes can lead to fewer return customers due to lower satisfaction ratings stemming from either poor customer service, processing incorrect orders, lengthy wait times, interruptions from implementing new technologies, and so on.

In addition, a point-of-sale/drive-thru transaction is limited in its ability to receive orders and deliver goods by the human factors involved, i.e. the process may only move as fast as the employee can physically work. For example, timing for processing an order is limited by how quickly the employee is able to take the customer's order, listen to the customer's order, record the order, confirm the order, prepare the order, process the payment manually, and deliver the ordered items to the customer. This process is not only taxing on both the employee and the customer but is also costly for the fast food retailer.

Barcodes or other unique identifiers today aren't dynamic and don't change or generate specific to a customer's order. Identifiers scanned at a fast food restaurant today only link to profiles and a method of payment (scanned at checkout by an employee) only after an order has been placed. The customer still has to communicate their order within the store, at a drive-thru, or preselect a specific store online and preorder ahead of time through the restaurant's mobile application. Orders also cannot be shared, consolidated, or placed in a single, electronic process. Payments also cannot be automatically or electronically split amongst customers.

SUMMARY OF THE DISCLOSURE

Accordingly, the present invention provides automated apparatus and methods for performing an efficient transaction involving the placement of an order for goods, assembly of items ordered, confirming payment for the items and provision of the items to the customer.

The present invention, Point-of-Sale/Drive-Thru Automated Transaction Technologies (ATT) is predicated on an ordering, transacting, filing, and pick-up process at commercial fast food retailers. With the modernization of automated-technologies, ATT looks to bring a single (or minimal) step ordering process to the point-of-sale or drive-thru with limited human interaction.

The number of point-of-sale or drive-thru transactions are herein alleviated of many of the limitations resulting from the human work process, which operates unilaterally in nature. ATT addresses the aforementioned issues and provides methods and apparatus for proving faster and more accurate service to a customer and saving a fast food retailer time and money.

In some embodiments, an ATT system may be integrated with existing applications or order processing equipment, thereby leveraging, and taking advantage of the existing, proprietary technologies and applications that fast food retailers may have expended significant resources developing.

Embodiments of ATT therefore provide new techniques and the use of technologies to provide automatic fast food orders (or other merchandise order), transactions, and item pick-up from either remote, onsite point-of-sale, or drive-thru locations, via a mobile device or other apparatus.

A number of fast food customers order fast food on a whim. They have predetermined meals in mind, their "go-to" so to speak; however, customers often don't have a predetermined fast food location selected. In most cases, people don't know which fast food location they will eat at. Choosing a fast food restaurant is often driven by convenience. Factors that determine a convenient method of obtaining food items include: customer control of the order, minimal wait time, order accuracy, restaurant/staff responsiveness, a relative location of a customer to a restaurant, the ability to combine multiple meals into a single order, the ability to charge separate customers for only their ordered items, and aggregate payments for combined items/orders. Customers often order on the go, when they travel, when multiple customers are in a single vehicle, and when it's most convenient. It also becomes a headache when a driver has several orders to place at a drive-thru. ATT will seek to render these inefficiencies obsolete.

Embodiments may consider a complexity of multiple orders wherein generally the more orders placed and the more complex an order, the more susceptible any given order is to mistakes from either user error or miscommunication.

The present invention also addresses the difficulty involved in splitting payments within a group of purchasers. It overcomes the difficulties of most of the fast food technologies or applications today, which require customers to preselect a restaurant, preorder a meal, and come inside to pick-up the order by, implementing scan-to-order features, allowing one or more customers to aggregate multiple meals into a single order, and combine payment for items ordered at any participating location. ATT largely renders the shortcomings and inefficiencies of present systems obsolete. ATT is adaptable to existing franchise systems, at the franchises discretion, a loyalty program or sign-in may or may not be required, such that any customer may place an order, pay, and subsequently pick-up their items all through the mobile application or with no human interaction.

One general aspect includes a system for delivery of a prepared food item, the system including: a computer server including a processor in logical communication with a digital storage storing executable code; and a transmitter in logical communication with a digital communication network. The executable code is operative with the processor to cause the server to receive from a scanner located on site of a food preparation facility an encoded barcode including a unique transaction code with encoded information including a user identification. The server may also receive an order description and a payment status portrayed upon a display of a mobile device of a user. In an example, action may be taken based upon receipt of the encoded barcode to remotely operate a dispenser, wherein the dispenser includes a plurality of bins configured for storage of food items, to dispense one or more stored food items to a user presenting the mobile device with the encoded barcode.

One general aspect includes a method for delivery of a food product, the method including receiving an order description and a payment status portrayed with a barcode upon a display of a mobile device of a user or by other means such as a printed image on a receipt. In an example, action may be taken based upon receipt of the encoded barcode to remotely operate a dispenser, wherein the dispenser includes a plurality of bins configured for storage of food items, to dispense one or more stored food items to a user presenting the mobile device with the encoded barcode. Each food item stored in a bin of the dispenser may be controlled at one of ambient temperature, less than ambient temperature and greater than ambient temperature. The method also includes configuring executable code to include a first touchscreen activated function, where the first touchscreen activated function activates a group order protocol. The method also includes receiving an activation function response from a first user. The method also includes receiving a list of a plurality of users which may participate in forming a food product order. The method also includes communicating with the plurality of users, where the communication offers an ordering session to two or more of the plurality of users. The method also includes receiving orders from two or more of the plurality of users. The method also includes communicating an order status to the first user. The method also includes placing food products in a first bin of the dispenser, where the food products include portions of the food order from the two or more of the plurality of users. The method also includes communicating a barcode image to the first user, where the barcode provides the necessary information for the user to interact with the dispenser and receive the food products of the group order. The method also includes dispensing the food products to the first user conditioned upon the first user providing the barcode image to a scanner associated with a dispenser.

One general aspect includes a method of dispensing food items prepared for consumption by a customer, the method including the step of receiving programmable code for execution on a customer smart device. The method of dispensing food items also includes entering into the customer smart device an identification of the customer. The method of dispensing food items also includes entering into the customer smart device multiple preferred restaurants. The method of dispensing food items also includes generating a geographic position of the customer smart device based upon global positioning coordinates. The method of dispensing food items also includes displaying a selected preferred restaurant on a screen on the customer smart device, the selected preferred restaurant including one of the multiple preferred restaurants. The method of dispensing food items also includes displaying a travel time to the selected preferred restaurant. The method of dispensing food items also includes displaying a travel path to the selected preferred restaurant. The method of dispensing food items also includes generating an order including food items and food preparation into a customer interface on the customer smart device. The method of dispensing food items also includes transmitting the order including food items and food preparation to the selected preferred restaurant. The method of dispensing food items also includes displaying on the customer smart device a direction of travel based upon the geographic position of the customer smart device and a geographic position of the selected preferred restaurant. The method of dispensing food items also includes transmitting payment information for an amount based upon the food items and food preparation. The method of dispensing food items also includes displaying a unique identifier associated with the order for food items and food preparation. The method of dispensing food items also includes conveying the unique identifier associated with the order for food items and food preparation to an automated dispenser. The method of dispensing food items also includes based upon conveyance of the unique identifier and the transmitted payment information, causing the automated dispenser to dispense the order for food items prepared for consumption by a customer according to the order for food preparation.

Implementations may include one or more of the following features. The method for dispensing food items prepared for consumption by a customer additionally including the step of periodically updating the geographic position and transmitting the updated geographic position to the selected preferred restaurant. The method for dispensing food items prepared for consumption by a customer additionally including the step of periodically updating the geographic position and updating the direction of travel based upon the updated geographic position. The method for dispensing food items prepared for consumption by a customer additionally including the step of generating an indication of completion of the order for food and food preparation. The method for dispensing food items prepared for consumption by a customer additionally including the steps of receiving a list of a plurality of users which may participate in forming a food product order. The method may also include communicating with the plurality of users, where the communication offers an ordering session to two or more of the plurality of users. The method may also include receiving orders from two or more of the plurality of users. The method may also include combining the orders received from the two or more of the plurality of users with an order on the customer smart device to generate the order including food items and food preparation that is transmitted to the selected preferred restaurant.

The method for dispensing food items prepared for consumption by a customer may additionally include the steps of receiving payment information from each of the plurality of users from which orders are received and transmitting the payment information to the selected preferred restaurant. The method for dispensing food items prepared for consumption by a customer may additionally include inputting a threshold of travel time. The method may also include inputting a route of travel. The method may also include inputting a permissible travel deviation. The method may also include generating a list of food vendors with automated dispensers within the threshold of travel time and along the route of travel and permissible travel deviation.

The method for dispensing food items prepared for consumption by a customer may additionally include scanning a license plate number with an image capture device. The method may also include identifying the order for food and food preparation based upon the scanned license plate number. The method for dispensing food items prepared for consumption by a customer additionally including the steps of scanning a face of a customer with an image capture device to generate a facial image. The method may also include performing facial recognition on the facial image. The method may also include identifying the order for food and food preparation via the facial recognition. The method for dispensing food items prepared for consumption by a customer may additionally include the step of transmitting the unique identifier from the customer smart device to the automated dispenser via a near field communication protocol. One general aspect includes an automated food dispenser dispensing food prepared for consumption by a human, the dispenser including: a container including multiple disparate bins, each bin suitable for storing prepared food and including thermal insulation from atmospheric temperature ambient to the respective bins; at least one cup holder within at least one bin, said cup holder shaped to maintain cup containing fluid in an upright position while the cup is in the cup holder; a digital input device for receiving a unique order identifier from a customer; a receiver for receiving digital information via a distributed network; a processor in communication with a storage device storing executable code for causing the processor to: receive an order including food items and food preparation; associate the order with a customer and the unique order identifier; verify payment status associated with a customer order; display on a user interface the food items and food preparation; associate the container to receive food items including the order; register placement of the food items including the order into the container; receive into a digital input device a user input into the digital input device, the user input including the unique identifier; and transmit a command to make contents of the container available to the user; and automation for providing bin movement within the dispenser to facilitate loading of the ordered food items into the bins and pickup of the ordered food items based upon input of the unique order identifier.

Implementations may include one or more of the following features. The automated food dispenser where each ordered food item is prepared based upon the order and assigned a designated dispenser bin and placed inside an insulated area of the designated bin. The automated food dispenser where a dispenser container storing the food items prepared according to the ordered food preparation is matched to the unique order identifier and made available for automated order pickup based upon user input of the unique order identifier.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure:

FIG. 16 illustrates operational flows related to order processing at a kiosk.

FIG. 18 illustrates operational flows with license plate scanning and dispensing apparatus.

FIG. 19 illustrates operational flows not involving mobile application processing.

FIG. 20 illustrates operational flows with drive-thru point of sale kiosk scan.

FIG. 21A illustrates generation of one-time identifier for shared orders.

FIG. 23 illustrates operational flows for remote location dispensing.

FIG. 24 illustrates operational flows for remote location dispensing and drone replenishment.

FIGS. 25A-B illustrate operational flows for ordering with the application.

FIGS. 27A-B illustrate operational flows for remote ordering.

FIG. 38 illustrates aspects of an autonomous vehicle customer pickup.

DETAILED DESCRIPTION

Figure 1:
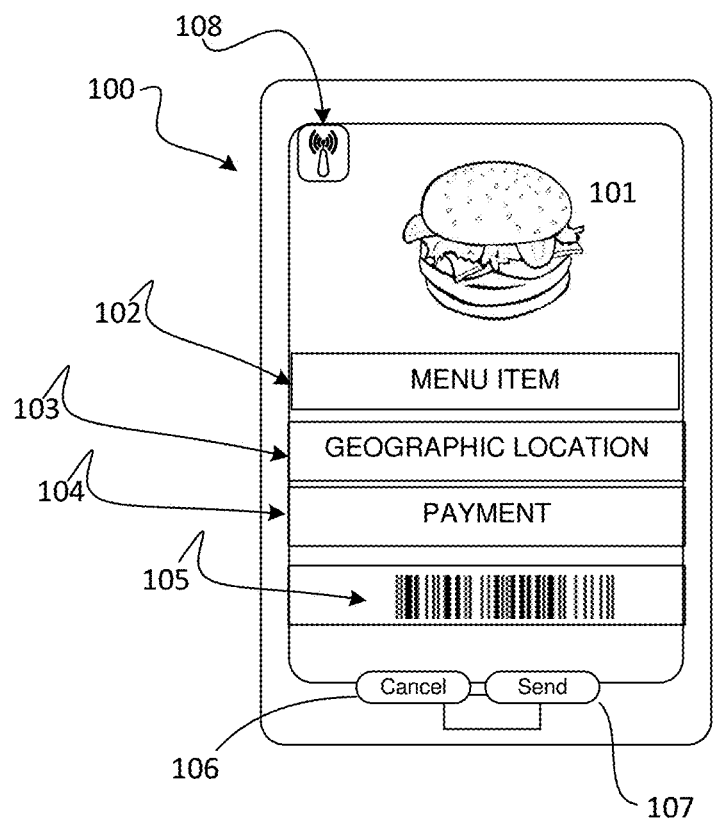
FIG. 1 illustrates an exemplary customer device according some implementations of the present invention.

The present disclosure provides generally for apparatus and methods for a customer to preselect food items for purchase, process an order through scanning systems at a point of sale or drive-thru, and subsequently pay for the order either through traditional means or through the use of scanning systems. The integrated system may also track the customer's location so that the food items are available for pick-up at a pick-up point as the customer arrives at said pick-up point. The system may automatically identify the customer through scanning systems, match the customer's order with the customer, and deliver the food items. The system may also confirm a payment mechanism and process payment for the food items that will be delivered. Options to pay upon order or pick-up are also available.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

In general, a customer that is in a vehicle has a pre-loaded mobile application in which they have the ability to pre-select a food franchise and the food items they desire to purchase. The customer is able to select items from the food provider's menu within the mobile application and proceed with submitting the order, which will produce a unique barcode or other unique identifier generated within the application. The unique barcode or identifier is populated on the user's device and combines a variety of information not limited to, order details (items, quantity, options, size, etc.), user location, store details, user profile, if multiple users are involved or share in the order, payment splitting, promotional details, custom requests, etc. The customer may also have the option to select from saved food favorites that are pre-selected and with a unique barcode or identifier, which corresponds to said food favorite, ready at the customer's fingertips. Usually these are the customer's "go-to" orders that are often purchased. A number of favorites are able to be saved and named under the user's profile. Saved favorites can also be traded or shared amongst users.

A customer can separate their orders by order numbers or profile if more than one person is included and paying for an order. Since a user's profile can be shared or stored, their favorites or "one-time" orders can also be transferred to a single user and combined into one order. A "two-way" option may be enabled, where both users may elect to participate in allowing one user to always place the other user's shared, favorite, or other specific order. A barcode is populated based on an algorithm that calculates a combination of user profile ID, order quantity, size, combo meals, sides, extras, respective unit prices, payment methods, promotions, or other details. A dynamic, unique identifier or barcode is generated for every order and is based on a software algorithm that calculates a combination of but not limited to user profile ID, order quantity, size, combo meals, sides, extras, respective unit prices, shared orders, and split payments.

A link to the customer's reward program account, reward points, or debit/credit card on file (dependent on user agreement) is also available. A user is able to link their form of payment to their purchase. This enables a quicker transaction at the point-of-sale/drive-thru and can also include the accruement of more reward points or perks such as sweepstakes, reward program coupons, double point promotions, or reward program discounts. Reward and payment integration can be added to multiple users.

Orders and payments can also be requested or shared amongst users, not just through any "friends" option within the application, but also by sending and receiving order or payment requests through phone number, email, or other means of wireless transfer of information such as Bluetooth, near field communication, etc. Once the user has finished selecting their desired order and arrives at any point-of-sale or drive-thru kiosk, the user then presents the unique barcode or unique identifier within the application to a scanning system. Upon doing so, the order is then processed and subsequently paid for if the user has opted to use such payment systems that are linked within the application (traditional payment options still apply). Such an order may be prepaid if the user has processed the ordered from the location based mobile application feature or if the user has selected to connect to the restaurant remotely. The selections and functions within the mobile application can also be controlled through voice recognition.

Throughout the document, reference may be made to a "scan" or "scanning". It is understood that the use of the word "scan" can be interpreted as varying methods to read, capture, scan, identify, decode, or process a barcode or representative image to subsequently unlock, decode, translate, transmit, or process said barcode and the information it contains.

In some embodiments, after an order has been paid for, an order number and a corresponding barcode or unique identifier are generated. Those skilled in the art will understand that the unique identifier may be generated prior to order generation without violating the spirit of the invention. If traditional order or payment methods are made, a receipt will be printed with a corresponding order number and a unique barcode or identifier for that customer's order. In some cases, the customer will once again present and scan the same unique barcode or identifier to an automatic dispenser at a pick-up location. At a pick-up location, the customer will be notified that the order is ready for pick-up, either through the mobile application, over an intercom, display, or through additional methods. An operating system that tracks the uniquely generated barcode or other unique identifier on the user's device will communicate with all systems and translate all order information to the wait and kitchen staff.

After the order is initially placed by the customer, the kitchen staff will receive a printout of the same barcode or unique identifier that is specific to and matches the customer's identifier. Such application is that the operating system can print the same unique barcode or identifier for use in item management, such as the kitchen staff placing the barcode or identifier onto the food item that will be scanned after the order is made. The wait or kitchen staff will place the barcode on one of the items in the order and proceed to scan and place the item into a storage/container bin within a mechanized apparatus or turntable, which interacts and matches the user's barcode or other unique identifier at the pick-up location. This mechanism may contain boxes or bins, which are insulated or temperature controlled, and contain designated places for drinks and other food items.

Based upon the kitchen staff scanning an item at the mechanism, the mechanism will dispense a carrier, box, or bin in which to put and store the item. When the customer is ready to pick-up their order, either inside or outside, the customer will scan their unique identifier or barcode at the pick-up point, the mechanism will match the user provided barcode or identifier to the order, and then proceed to automatically dispense the carrier, box, or bin to the customer for order pick-up.

The bins may store orders processed remotely and awaiting pick-up or order places onsite at a point-of-sale/drive-thru kiosk. Customers who preorder or order remotely can bypass the order kiosks and head directly to the pick-up point. The bins also are capable of rotating individually so that no one order is holding-up the line. When the user scans their barcode or uniquely generated identifier at an indoor or outdoor kiosk, not only is a receipt stored within the application, but an order number and the same barcode or identifier may populate. The user may then scan at the pick-up point, that corresponds to the point-of-sale or drive-thru locations. When at the pick-up point, the restaurant staff may be notified that the order is ready for pick-up when the barcode is scanned again. Although the description provided describes bins and kiosks, other automation, such as pick and place, storage trays, thermal insulated containers, mechanized belts, and the like are also within the scope of the invention to be used to store and deliver an order to a customer.

If the automatic dispenser is not used, uses of the scanning systems may also be used to identify the customer and the customer's order so that the employee may take advantage of the software to instead deliver the customer their order in lieu of the automatic dispenser and maintain a more effective and efficient customer query or queue. Remote pick-up locations may also be available, whether onsite or offsite, where the customer may elect to scan at a pick-up location disconnected from the restaurant. Upon arrival at a remote pick-up location, the customer may scan their unique barcode or identifier after the order has been processed and paid for, and a remote drone, motorized track, delivery driver, third party vendor, or other mechanism to transport a food item or food bin, is then sent to the remote location, which may dock the food bin to be dispensed to the customer, and then returned to the kitchen staff after the order is picked up or simply place the food item into a corresponding dispenser bin upon item identifier scan. Ordering and payment options are also available to the customer at a remote pick-up location or dispenser through the use of scanning systems.

In some embodiments, a vehicle license plate, tag, or other vehicular apparatus may be used as a method of identifying and/or inventorying customers. A license plate tracking system may be utilized to minimize the adaption and implementation of ATT, while also removing the system's reliance on a customer to download the application or purchase a car mounted barcode. This process can be completed by: a car approaching the drive-thru terminal or kiosk and an image scanner renders the license plate in real time, comparing the number to the fast food provider's database. If it is a first-time customer, the terminal will track the customer's purchase and save the selection to the fast food provider's server for future reference. In some embodiments, a return customer may be determined via license plate recognition and customer profile data in one or both of a mobile application and back room controller functionality. A user may also save a license plate number to the user profile, therefore associating all user preferences to the license plate number such as order favorites, automatic "go-to" orders, reward programs, payment details, and the like. When a user returns to any location of the food franchise, the drive-thru kiosk will remember the customer and tailor the options to the user based on their license plate. This can include recent orders, pending orders, suggested items, gift card balances, rewards/profile information, etc. The license plate scanner may also be used to query users, automatically order, and pay for meals upon driving up to the drive-thru kiosk based on either saved selections/preferences or recently submitted orders, and also track users when they arrive at a certain pick-up point or the automatic dispenser for order pick-up identification. The automatic order feature connected with the license plate scanner also gives the user the option to instantly order their default "go-to" order upon arriving at any location or process a recently submitted order instead. Instant payment processing may be applied. The license plate scanner can also queue the user to the system and when the user is at the pick-up window, the system will match the ordered item to the customer's license plate and profile to subsequently dispense the item automatically. Traditional means of payment, such as paying with a credit card, will be done at either the order kiosk or the pick-up point if the user has not enrolled in automatic pay. An order receipt containing a unique, algorithmically generated barcode or identifier, corresponding to the user's order, may be printed for user identification purposes upon scan at an automatic dispenser. In some cases, this ensures the user doesn't need a mobile device for the scanning systems to successfully receive and dispense a user's order. Upon license plate scan and user identification, the user may confirm or edit their order at the kiosk. The system may make order suggestions at the kiosk such as recent orders, order favorites, popular orders, new items, promotions, and the like. Geofencing and the like may supplement the license plate scanner to further improve its effectiveness and efficiency.

Some implementations may include a pre-existing, pre-order application integration wherein as most fast food providers have some form of pre-paid or pre-order process in which the customer can pick-up an order, at a predestinated location, paid or unpaid for, inside the store upon arrival. The present invention may also cut down wait times and may boost sales. The current order delivery process when the customer is ready to pick-up their order not also disrupts the customer queue, but it also removes kitchen staff from preparing meals since they have to stop taking or preparing orders, find the preordered meal that was set aside, and then hand deliver these items to the customer. This is an inefficient preorder process that franchises won't be able to rely on as the user base grows under their recent mobile applications. Customers also have to plan around their schedule to go to a specific, predetermined store. In most cases, customers do not plan their fast food purchases around their schedule and at a certain location.

Fast food drive-thru purchases may be on a whim of a customer, while the customer is traveling. Pre-selecting a location when on the go or traveling can be a hassle and eliminates the freedom to drive to any desired fast food location at will, when on the go. A map feature populates nearby restaurants and, in some embodiments, may render wait times at the restaurants based on the order traffic and activity measured by the operating system and scanning systems. The user can connect to the store via the map feature and place an order remotely. If a customer were to proceed with a mobile pre-order, the application will simply queue the user in the cloud, notify the user of nearby restaurants, connect the user to their restaurant of choice, provide the customer with the order's barcode and order number after the customer has selected the items and submitted their order, and the user will then present the barcode through the use of scanning systems at either the drive-thru or other point-of-sale pick-up locations. Mobile preorder applications can also include a store auto-detecting the user, either thru Bluetooth, GPS-location services, or other wireless connection options, with the user accepting to connect to either the store's indoor or drive-thru lines. Features also exist where the user can place an order and have the order processed at a qualifying store and sent to pick-up upon arrival, when the user is detected.

Additional methods of placing an order remotely or scanning onsite may include communicating via one or more of: a smart watch, an integrated home system such as Amazon Echo or Google Home, car dashboard-based applications, or other applications.

The point-of-sale and drive-thru kiosks are responsible for translating the order to the kitchen staff once the unique barcode or identifier has been scanned. Bluetooth transmittable sequence of characters can also be sent via the mobile application to the kiosks. The kiosks are touchscreen and voice recognition enabled. The drive-thru kiosk can remember the customer through license plate scanning, ask the customer upon arrival to confirm a pending order, or continue with either favorite, suggested, or new orders. Both kiosks are responsible for handling payments, either continuing with auto-pay during the order or handling traditional means of payment such as insert/slide credit card, near field communication, bill acceptor/dispenser, or other means of payment. Receipts containing a uniquely generated barcode or identifier may also be printed if the user elected to not use the app scan-to-order feature or has paid through traditional means. At any time, the customer can ask for human assistance via the kiosk.

In still other aspects, for example, if a customer is unaware of the aforementioned methods of automated transactions or doesn't opt into any of the above methods, then the customer has the ability to input or speak into a kiosk (or into an app provided on a mobile device) a user id and items ordered. A user ID may include, for example in single digits an assigned numerical or alphanumerical user ID or the customer can press or say "help," to proceed with guided human interaction or avatar interaction. These methods may be communicated to the customer/driver upon arriving at the kiosk.

Referring now to FIG. 1 a mobile device 100 is shown with an interactive user interface. The mobile device may include a wireless mechanism 108 for wirelessly communicating with another mechanism with wireless capability, such as, for example a base unit in a restaurant or other establishment engaged in commerce. The interface may include an identifier of an item 101 to be purchased. The identifier of an item 101 may include an image, an alphanumeric string, a barcode, a hash code, or other unique identifier. The mobile device 100 may also include a list 102 of choices of items that may be purchased.

In another aspect the mobile device may include a mechanism for determining a geographic location 103. The mechanism to determine a geographic location may be compared with stored data descriptive of locations of vendors from which the mobile device 100 may order items 101. A calculation may be made based upon location and a direction of travel to determine vendors proximate to the mobile device 100 from which the user may conveniently order items 101. An order may be generated and a payment mechanism 104 may be engaged to make payment for the item purchased. Processed payment may include, for example, known forms of electronic payment, including, without limitation, a process for payment involving one or more of: a credit card; a debit card, ACH system, or other mechanism.

According to the present invention, a unique identifier 105, such as a barcode or a hash code may be generated on the mobile device 100 to identify one or more of: the order, the user, items ordered, time of order, date of order and other details of the order. In some embodiments, one or more of the items described in the identifier 105, and/or the identifier itself may be transmitted via wireless transmission.

Transmission may be to a vendor or to another user. In some preferred embodiments, another user may wirelessly receive details of an order, and retransmit the order to a vendor of its choice. One or both users may also store the order and the identifier 105 for future use. Other controls may include, for example a cancel mechanism 106, a send mechanism 107, and a mechanism to access the user's profile.

Figure 2:
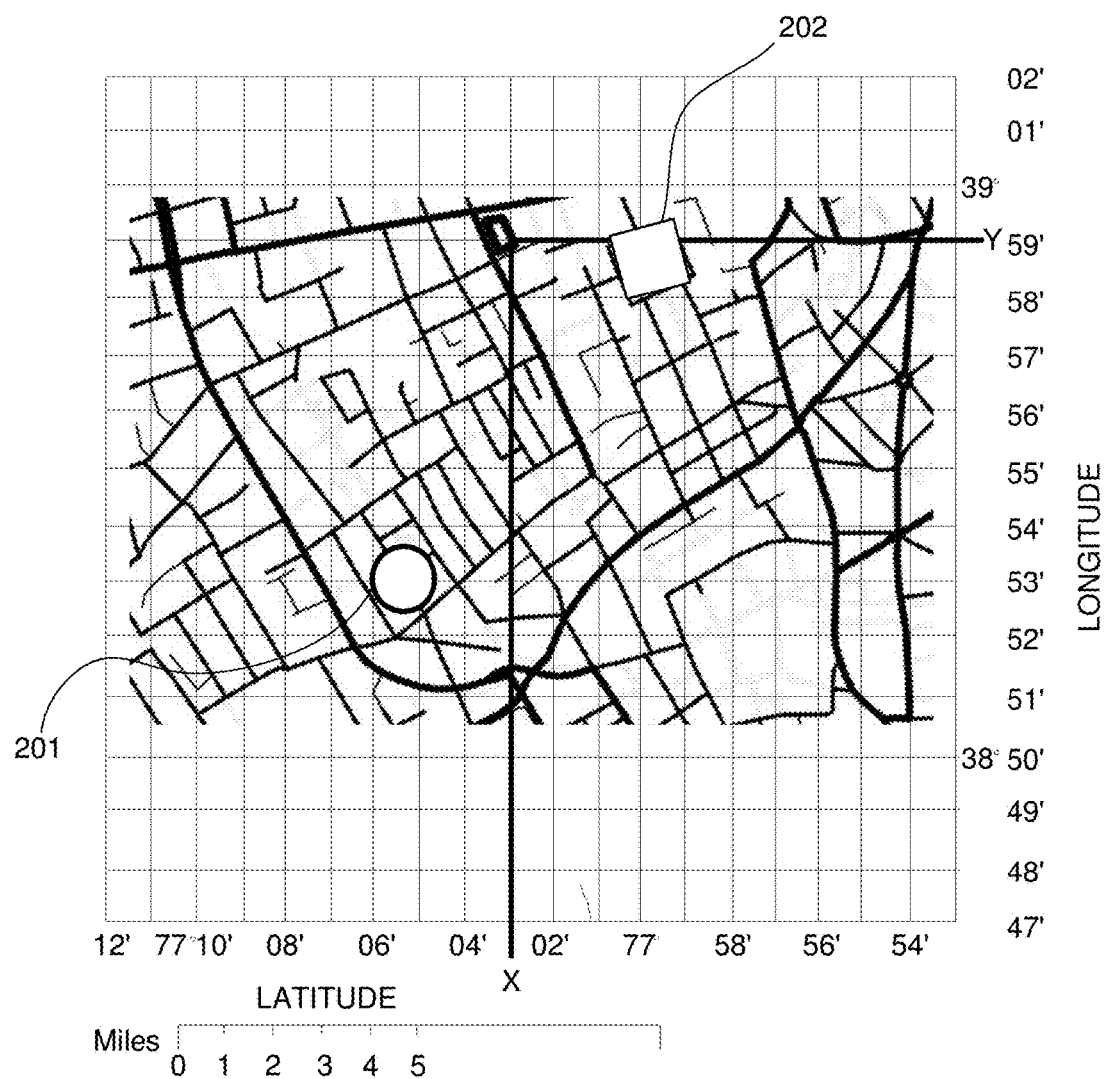
FIG. 2 illustrates a view of a customer in relation to a restaurant of choice.

Referring now to FIG. 2, in another aspect, a GPS or other geospatial locating device may calculate a location based upon a location associated with a Cartesian Coordinate, such as, for example Latitude and Longitude. A User location 201 and a vendor location 202 may be calculated and designated on a pictorial representation, such as a map. IN some preferred embodiments, a time of travel from a user location 201 to the vendor location 202 may be calculated and a time of pick-up for an order may be calculated based upon the time of travel. Wait time or status of vendor location 202 may be displayed.

Figure 3:
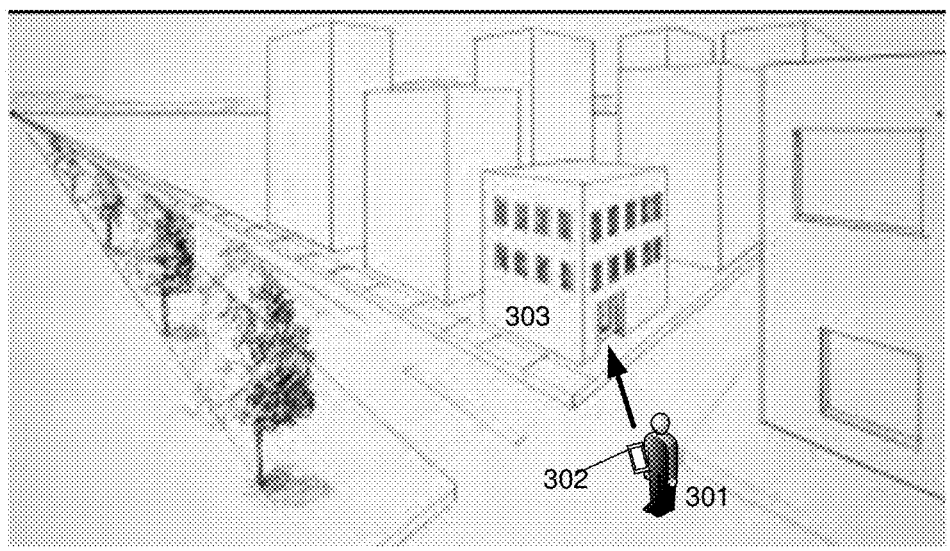
FIG. 3 illustrates an exemplary embodiment of a user with a customer device in proximity to restaurant.

Referring now to FIG. 3, in still another aspect, a User 301 walking on a street may use a handheld mobile device 302 to locate a suitable vendor 303 and place an order. The user may then walk into the vendor 303 and present a barcode to pick-up an order placed. In some specific implementations, an order may be placed while the user is on line at the vendor 303 and the order may be picked up as the line progresses with the purchase transaction already completed. Such embodiments may take advantage of the identification of the user and a purchasing history associated with the user to suggest "favored" items to order. It may also utilize the user's location information to time an order for pick-up as soon as available.

Figure 4:
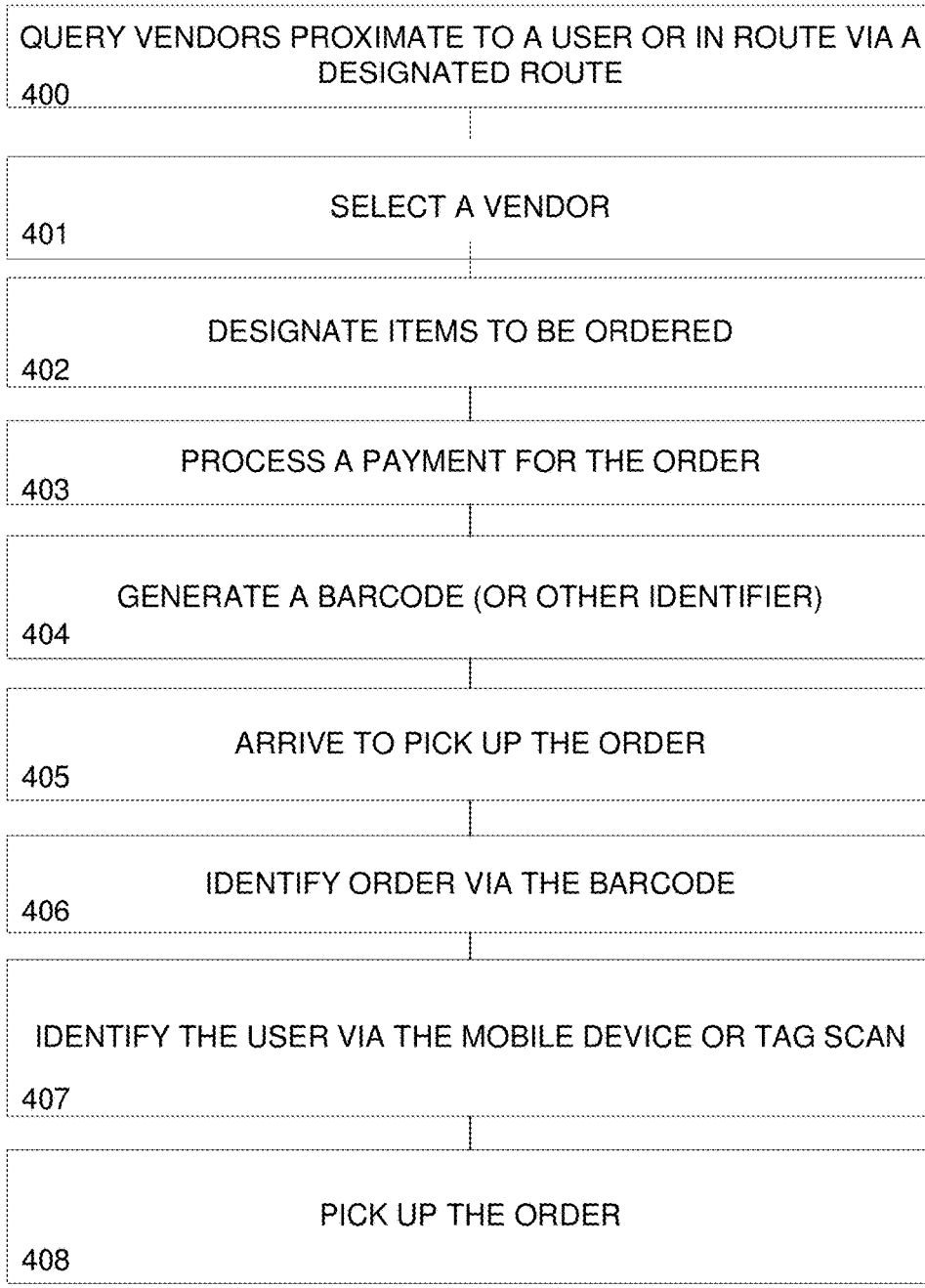
FIG. 4 illustrates exemplary method steps that may be performed in some implementations of the present invention.
Figure 5:
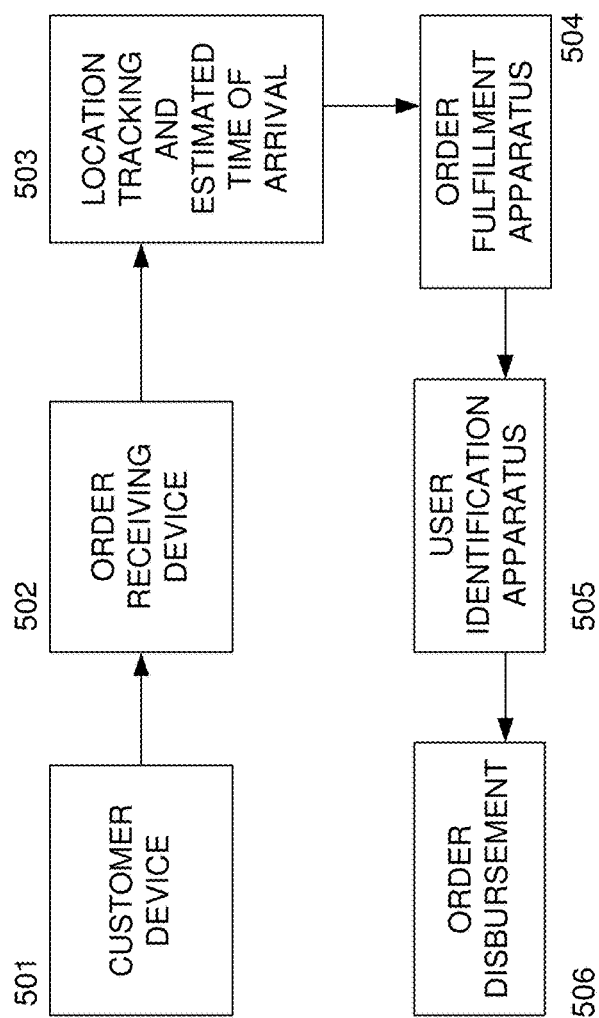
FIG. 5 illustrates a block diagram of apparatus that may be used in some implementations of the present invention.

Referring now to FIG. 4 steps 400-408 and FIG. 5 steps 501-506, method steps that may be used to implement the present invention in various embodiments. Additional aspects may include:

Barcode scanner that processes the app-derived barcode and sends it to a reciprocating terminal to process the order.

An automated voice that expresses to the customer the options of either ordering via barcode, payment options, confirming order via license plate scan, recent orders/favorites, user loyalty ID, or by stating "help" to have an employee assist with the order.

A license plate scanner that is capable of rendering a license plate in real-time to either track the customer's order history, reconcile the license plate number against a user's profile and preferences of the mobile application, place an order, or identify user at pick-up point and automatic dispenser.

Technology/operating system for the receiving terminal that is responsible for processing, pricing, and delivering the order to the fast food employee.

In some embodiments, an automated customer Identifier may be combined with designated items to order contained in a customer Profile. The automated customer Identifier may include for example a license plate (or another vehicle identifier, such as a barcode sticker). An automated scanner may scan the vehicle and generate a default "go-to" order associated with the customer identified via the scan. The customer may have the option to modify the order, such as for example, to change the items ordered or to change payment options. The customer may also transmit a preference for inside or drive-thru pick-up of the order. As the customer arrives at a designated pick-up location, at license plate scan may be used to process payment and deliver items ordered.

In additional embodiments, a customer may arrive at a drive-thru kiosk and be identified via an automated scan. Based upon the automated scan, the customer may be presented with an interactive interface that includes customer specific favorites, suggested items, and prior orders. The User operates the interactive interface to place an order. Payment may be made up front, upon arrival or based upon actual pick-up of the ordered items.

As described herein, aspects of automated: ordering, identification of a customer, payment and pick-up are discussed within the context of prepared food items and restaurants. Those skilled in the art will understand that similar processes and automation may be implemented for items other than prepared food items and may therefore include one or more of: groceries, pharmacy items, dry goods, or other items of commerce.

Figure 6:
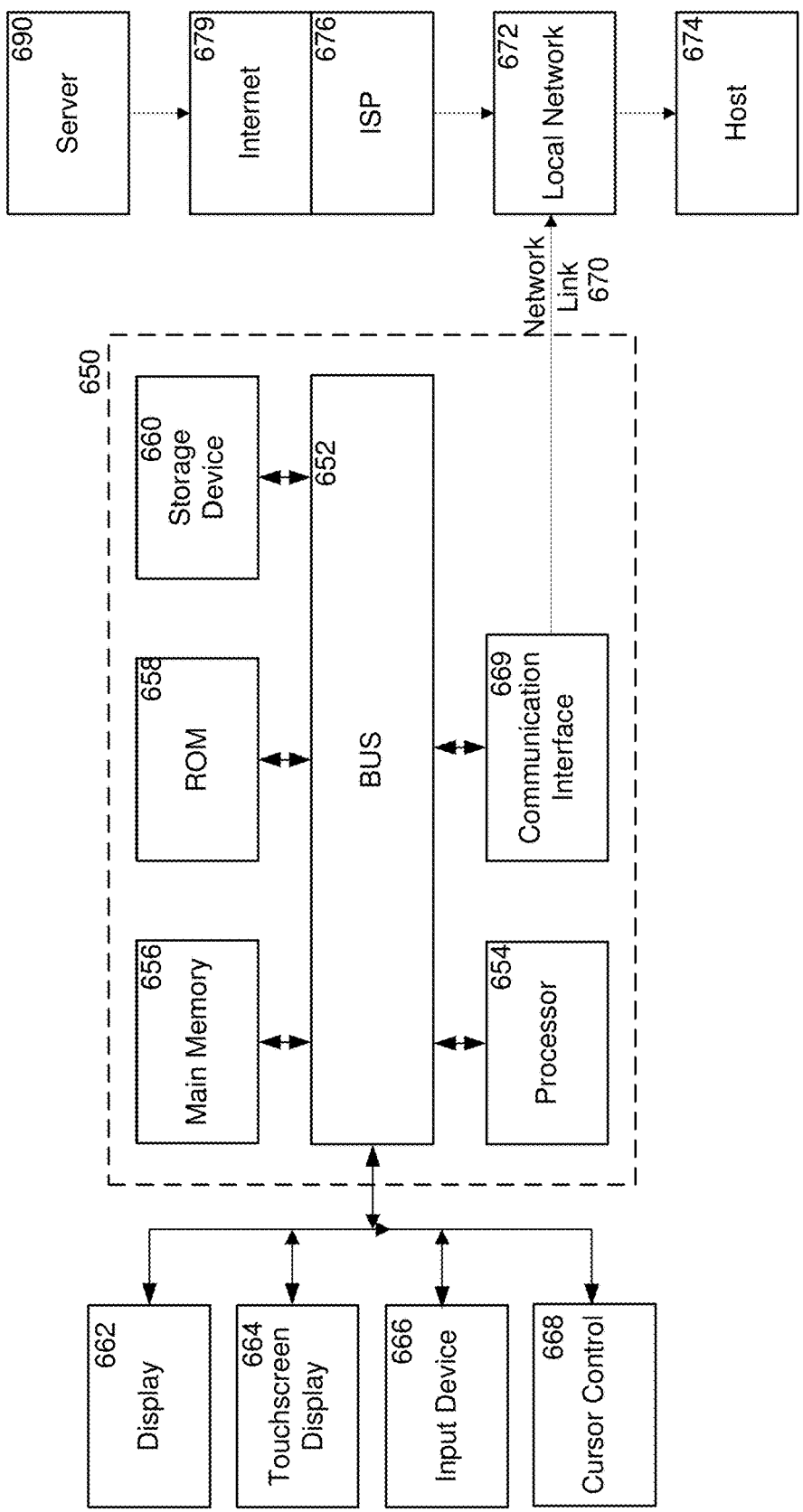
FIG. 6 illustrates aspects of controller hardware useful for implementing the present invention as a block diagram.

Referring now to FIG. 6, additional aspects of printer controller hardware useful for implementing the present invention are illustrated as a block diagram that includes a controller 650 upon which an embodiment of the invention may be implemented. Controller 650 includes a bus 652 or other communication mechanism for communicating information, and a processor 654 coupled with bus 652 for processing information.

In still other aspects, such as, for example, if a customer is unaware of the aforementioned methods of automated transactions or doesn't opt into any of the above methods, then the customer has the ability to input or speak into a terminal (or into a app provided on a mobile device) a user id and items ordered. A user ID may include, for example in single digits an assigned numerical or alphanumerical user ID or the customer can press or say "help," to proceed with guided human interaction or avatar interaction. These methods may be communicated to the customer/driver upon arriving at the terminal. Some implementations may also include a barcode scanner and barcode generation. Preferred embodiments include a barcode generated on a customer mobile device. Mobile application that converts the fast food order to a barcode or other machine-readable device, such as a hash or Bluetooth transmittable sequence of characters. A terminal or receiver that has the below capabilities:

Controller 650 also includes a main memory 656, such as a random-access memory (RAM) or other dynamic storage device, coupled to bus 652 for storing information and instructions to be executed by processor 654. Main memory 656 may also be used for storing temporary variables or other intermediate information during execution of instructions to be executed by processor 654. Controller 650 further includes a read only memory (ROM) 658 or other static storage device 660.

Controller 650 may be coupled via bus 652 to a display 662, such as a cathode ray tube (CRT), liquid crystal display (LCD), plasma display panel (PDP), organic light-emitting diode (OLED), projector, or heads up display for displaying information to a computer user. An input device 666, including alphanumeric and other keys, may be coupled to bus 652 for communicating information and command selections to processor 654. Another type of user input device is cursor control 668, such as a mouse, a trackball, a touchpad, or cursor direction keys for communicating direction information and command selections to processor 654 and for controlling cursor movement on display 662. Another type of user input device is a touchscreen display 664 where a user may communicate information and command selections to processor 654 by tactile interaction with the display thereby controlling cursor movement or alphanumeric and other keys. This input device typically has two degrees of freedom in two axes, a first axis (e.g., x) and a second axis (e.g., y), that allows the device to specify positions in a plane.

Embodiments of the invention are related to the use of controller 650 for setting operational parameters relating to digital messaging and game playing. According to some embodiment of the invention, layering system parameters are defined and managed by controller 650 in response to processor 654 executing one or more sequences of one or more instructions contained in main memory 656. Such instructions may be read into main memory 656 from another computer-readable medium, such as storage device 660. Execution of the sequences of instructions contained in main memory 656 causes processor 654 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 654 for execution. Such a medium may take many forms, including but not limited to, non-volatile media, volatile media, and transmission media. Non-volatile media includes, for example, optical or magnetic disks, such as storage device 660 and 658. Volatile media includes dynamic memory, such as main memory 656. Transmission media includes coaxial cables, copper wire and fiber optics, including the wires that comprise bus 652. Transmission media may also take the form of acoustic or light waves, such as those generated during radio wave and infrared data communications.

Common forms of computer-readable media include, for example, a memory stick, hard disk or any other magnetic medium, a CD-ROM, any other optical medium, a RAM, a PROM, and EEPROM, any other memory chip or cartridge, or any other medium from which a computer may read.

Various forms of computer readable media may be involved in carrying one or more sequences of one or more instructions to processor 654 for execution. For example, the instructions may initially be carried on a magnetic disk of a remote computer. The remote computer can load the instructions into its dynamic memory and send the instructions over a distributed network such as the Internet. A communication device may receive the data on the telephone line, cable line, or fiber-optic line and use an infrared transmitter to convert the data to an infrared signal. An infrared detector can receive the data carried in the infrared signal and appropriate circuitry can place the data on bus 652. Bus 652 carries the data to main memory 656, from which processor 654 retrieves and executes the instructions. The instructions received by main memory 656 may optionally be stored on storage device 660 either before or after execution by processor 654.

Controller 650 also includes a communication interface 669 coupled to bus 652. Communication interface 669 provides a two-way data communication coupling to a network link 670 that may be connected to a local network 672. For example, communication interface 669 may operate according to the internet protocol. As another example, communication interface 669 may be a local area network (LAN) card allowing a data communication connection to a compatible LAN. Wireless links may also be implemented.

Network link 670 typically provides data communication through one or more networks to other data devices. For example, network link 670 provides a connection through local network 672 to a host computer 674 or to data equipment operated by an Internet Service Provider (ISP) 676. ISP 676 in turn provides data communication services through the worldwide packet data communication network now commonly referred to as the "Internet" 679. Local network 672 and Internet 679 both use electrical, electromagnetic, or optical signals that carry digital data streams. The signals through the various networks and the signals on the network link 670 and through communication interface 669, which carry the digital data to and from controller 650 are exemplary forms of carrier waves transporting the information.

In some embodiments, Controller 650 may send messages and receive data, including program code, through the network(s), network link 670 and communication interface 669. In the Internet example, a server 690 might transmit a requested code for an application program through Internet 679, ISP 676, local network 672 and communication interface 669.

Processor 654 may execute the received code as it is received, and/or stored in storage device 660, or other non-volatile storage for later execution. In this manner, controller 650 may obtain application code in the form of a carrier wave.

Access devices may include any device capable of interacting with controller or other service provider. Some exemplary devices may include a mobile phone, a smart phone, a tablet, a netbook, a notebook computer, a laptop computer, a wearable computing or electronic device, a terminal, a kiosk, or other type of automated apparatus. Additional exemplary devices may include any device with a processor executing programmable commands to accomplish the steps described herein.

A controller may be a programmable board such as an Arduino board, and/or one or more of: personal computers, laptops, pad devices, mobile phone devices and workstations located locally or at remote locations, but in communication with the system. System apparatus can include digital electronic circuitry included within computer hardware, firmware, software, or in combinations thereof. Additionally, aspects of the invention can be implemented manually.

Apparatus of the invention can be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired, and in any case, the language can be a compiled or interpreted language. Suitable processors include, by way of example, both general and special purpose microprocessors.

Generally, a processor will receive instructions and data from a read-only memory and/or a random-access memory. Generally, a computer will include one or more mass storage devices for storing data files; such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EEPROM and flash memory devices; magnetic disks such as, internal hard disks and removable disks; and CD ROM disks. Any of the foregoing can be supplemented by, or incorporated in, ASICs (application-specific integrated circuits).

In some embodiments, implementation of the features of the present invention is accomplished via digital computer utilizing uniquely defined controlling logic, wherein the controller includes an integrated network between and among the various participants in Process Instruments.

The specific hardware configuration used is not particularly critical, as long as the processing power is adequate in terms of memory, information updating, order execution, redemption, and issuance. Any number of commercially available database engines may allow for substantial account coverage and expansion. The controlling logic may use a language and compiler consistent with that on a CPU included in the medical device. These selections will be set according to per se well-known conventions in the software community.

Figure 7:
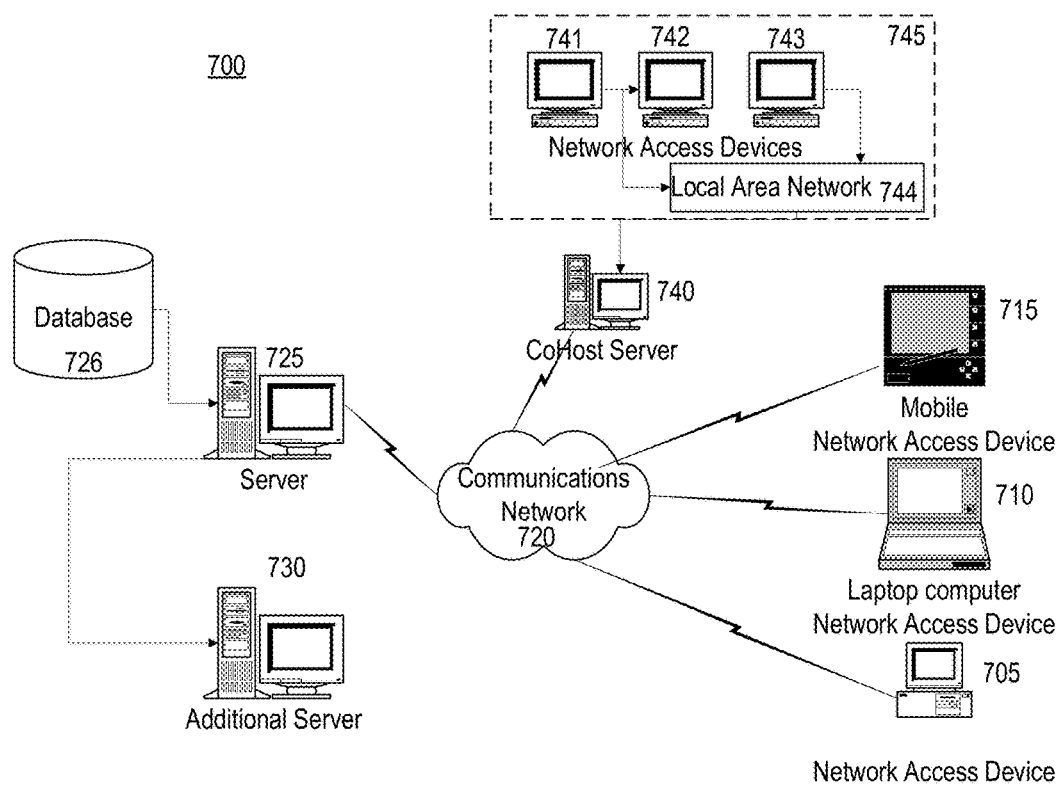
FIG. 7 illustrates an exemplary processing and interface system.

Referring now to FIG. 7, an exemplary processing and interface system 700 is illustrated. In some aspects, access devices 715, 710, 705, such as a mobile device 715 or laptop computer 710 may be able to communicate with an external server 725 though a communications network 720. The external server 725 may be in logical communication with a database 726, which may comprise data related to identification information and associated profile information. In some examples, the server 725 may be in logical communication with an additional server 730, which may comprise supplemental processing capabilities.

In some aspects, the server 725 and access devices 705, 710, 715 may be able to communicate with a cohost server 740 through a communications network 720. The cohost server 740 may be in logical communication with an internal network 745 comprising network access devices 741, 742, 743 and a local area network 744. For example, the cohost server 740 may comprise a payment service, such as PayPal or a social network, such as Facebook or a dating web site.

Figure 8:
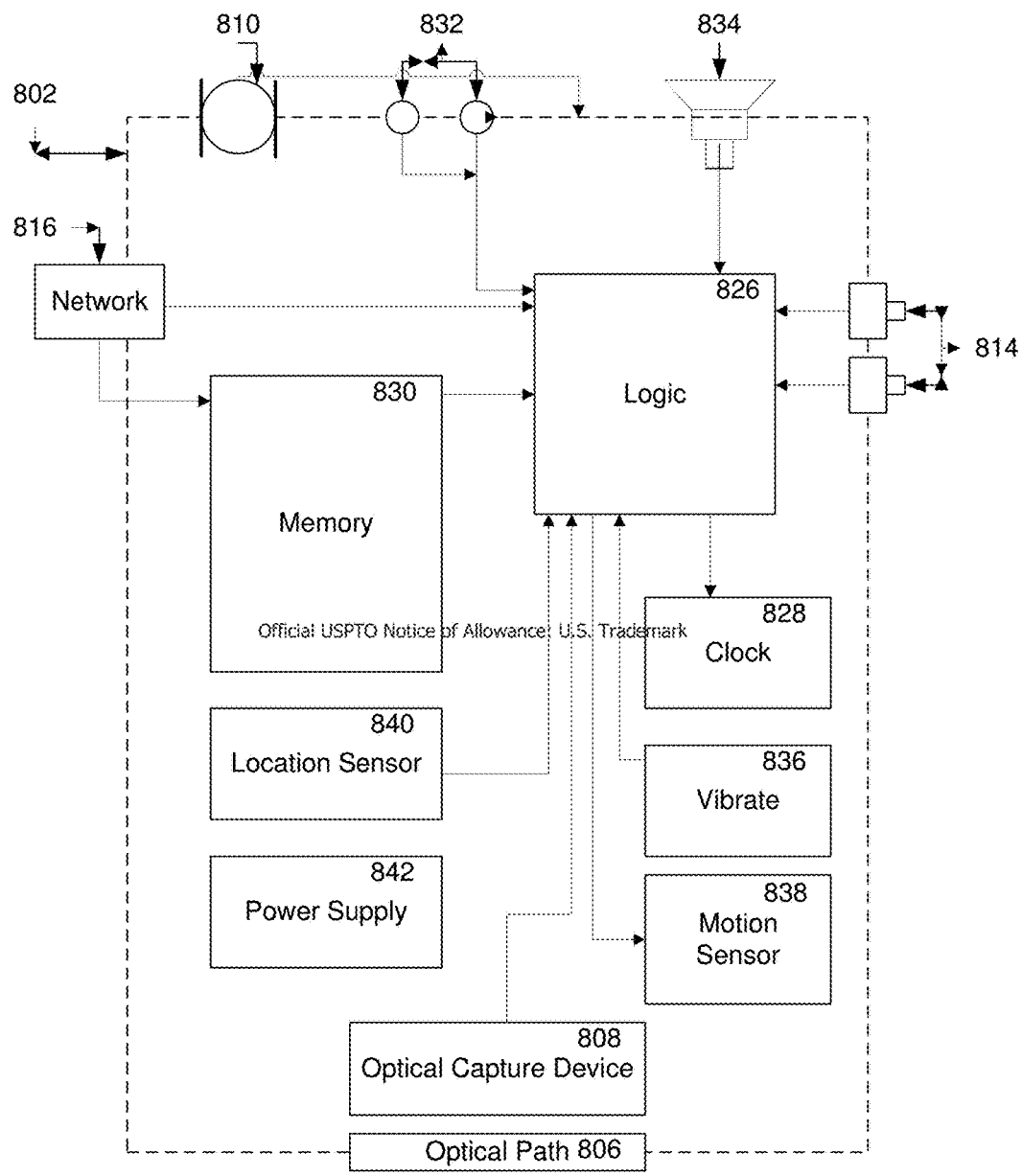
FIG. 8 illustrates a block diagram of an exemplary embodiment of a mobile device.

Referring now to FIG. 8, a block diagram of an exemplary embodiment of a mobile device 802 is illustrated. The mobile device 802 may comprise an optical capture device 808, which may capture an image and convert it to machine-compatible data, and an optical path 806, typically a lens, an aperture, or an image conduit to convey the image from the rendered document to the optical capture device 808. The optical capture device 808 may incorporate a Charge-Coupled Device (CCD), a Complementary Metal Oxide Semiconductor (CMOS) imaging device, or an optical sensor of another type.

In some embodiments, the mobile device 802 may comprise a microphone 810, wherein the microphone 810 and associated circuitry may convert the sound of the environment, including spoken words, into machine-compatible signals. Input facilities 814 may exist in the form of buttons, scroll-wheels, or other tactile sensors such as touch-pads. In some embodiments, input facilities 814 may include a touchscreen display. Visual feedback 832 to the user may occur through a visual display, touchscreen display, or indicator lights. Audible feedback 834 may be transmitted through a loudspeaker or other audio transducer. Tactile feedback may be provided through a vibration module 836.

In some aspects, the mobile device 802 may comprise a motion sensor 838, wherein the motion sensor 838 and associated circuitry may convert the motion of the mobile device 802 into machine-compatible signals. For example, the motion sensor 838 may comprise an accelerometer, which may be used to sense measurable physical acceleration, orientation, vibration, and other movements. In some embodiments, the motion sensor 838 may comprise a gyroscope or other device to sense different motions.

In some implementations, the mobile device 802 may comprise a location sensor 840, wherein the location sensor 840 and associated circuitry may be used to determine the location of the device. The location sensor 840 may detect Global Position System (GPS) radio signals from satellites or may also use assisted GPS where the mobile device may use a cellular network to decrease the time necessary to determine location. In some embodiments, the location sensor 840 may use radio waves to determine the distance from known radio sources such as cellular towers to determine the location of the mobile device 802. In some embodiments these radio signals may be used in addition to and/or in conjunction with GPS.

In some aspects, the mobile device 802 may comprise a logic module 826, which may place the components of the mobile device 802 into electrical and logical communication. The electrical and logical communication may allow the components to interact. Accordingly, in some embodiments, the received signals from the components may be processed into different formats and/or interpretations to allow for the logical communication. The logic module 826 may be operable to read and write data and program instructions stored in associated storage 830, such as RAM, ROM, flash, or other suitable memory. In some aspects, the logic module 826 may read a time signal from the clock unit 828. In some embodiments, the mobile device 802 may comprise an on-board power supply 842. In some embodiments, the mobile device 802 may be powered from a tethered connection to another device, such as a Universal Serial Bus (USB) connection.

In some implementations, the mobile device 802 may comprise a network interface 816, which may allow the mobile device 802 to communicate and/or receive data to a network and/or an associated computing device. The network interface 816 may provide two-way data communication. For example, the network interface 816 may operate according to an internet protocol. As another example, the network interface 816 may comprise a local area network (LAN) card, which may allow a data communication connection to a compatible LAN. As another example, the network interface 816 may comprise a cellular antenna and associated circuitry, which may allow the mobile device to communicate over standard wireless data communication networks. In some implementations, the network interface 816 may comprise a Universal Serial Bus (USB) to supply power or transmit data. In some embodiments, other wireless links known to those skilled in the art may also be implemented.

As an illustrative example of a mobile device 802, a reader may scan some text from a newspaper article with mobile device 802. The text is scanned as a bit-mapped image via the optical capture device 808. Logic 826 causes the bit-mapped image to be stored in memory 830 with an associated time-stamp read from the clock unit 828. Logic 826 may also perform optical character recognition (OCR) or other post-scan processing on the bit-mapped image to convert it to text. Logic 826 may optionally extract a signature from the image, for example by performing a convolution-like process to locate repeating occurrences of characters, symbols, or objects, and determine the distance or number of other characters, symbols, or objects between these repeated elements. The reader may then upload the bit-mapped image (or text or other signature if post-scan processing has been performed by logic 826) to an associated computer via network interface 816.

As an example of another use of mobile device 802, a reader may capture some text from an article as an audio file by using microphone 810 as an acoustic capture port. Logic 826 causes audio file to be stored in memory 830. Logic 826 may also perform voice recognition or other post-scan processing on the audio file to convert it to text. As above, the reader may then upload the audio file (or text produced by post-scan processing performed by logic 826) to an associated computer via network interface 816.

Dispensing Apparatus

Figure 9A:
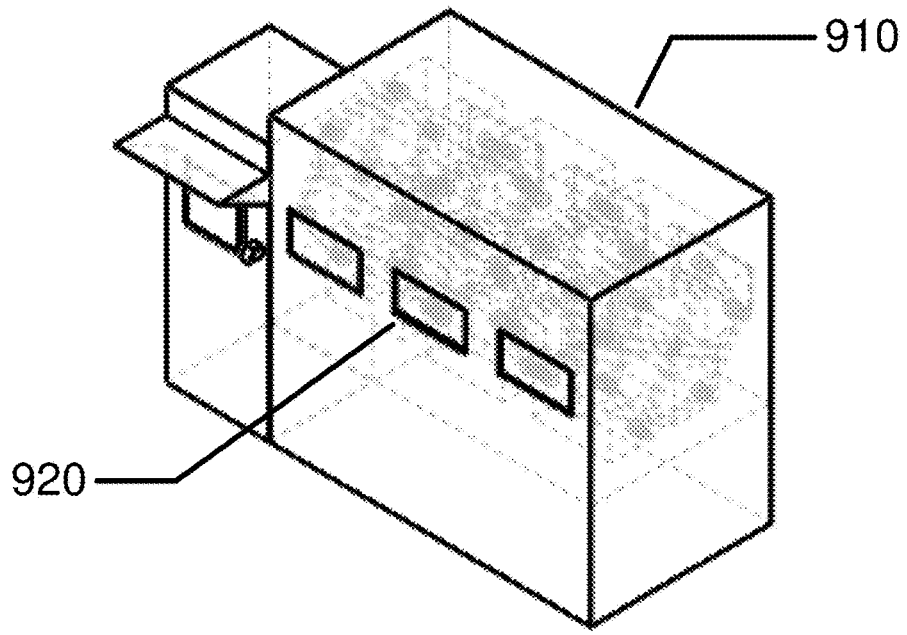
FIGS. 9A-9I illustrate different views of an exemplary dispensing apparatus.
Figure 9B:
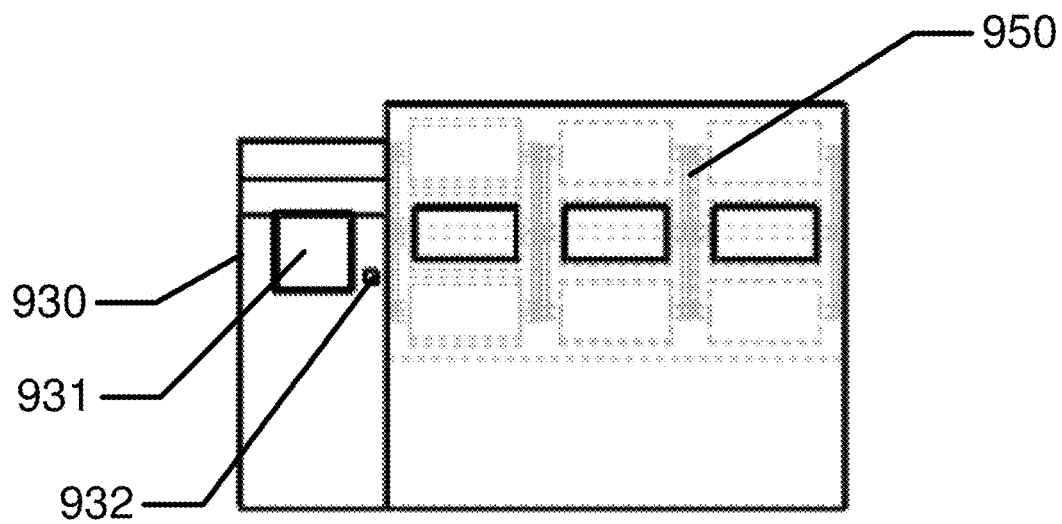
Figure 9C:
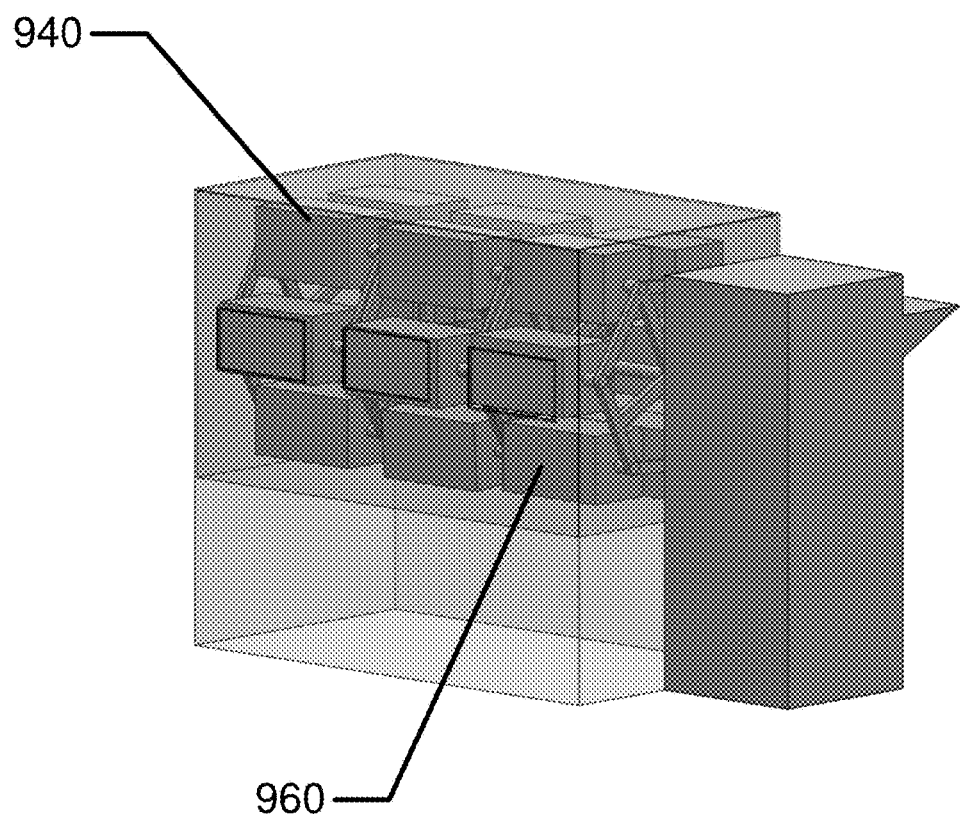

An integral part of the concepts disclosed herein relates to method and apparatus to improve accuracy and effectiveness of fast food restaurant order realization. One of the final steps in order realization is the delivery of prepared food to the customer. Novel apparatus for dispensing may interact with computer systems and servers that organize a variety of operational aspects of food order realization. Referring now to FIG. 9A, FIG. 9B, and FIG. 9C, multiple views of an exemplary dispenser 900 are illustrated. In some examples, a dispenser 900 may be located interior or exterior to a fast food restaurant, with access ports in the rear 910 for employee access to place prepared food. Access ports in the front 920, may function for consumer access to prepared food. In some operational flows, an order is received, a restaurant employee, prepares the order and another restaurant employee places the prepared order into the dispenser. In some examples, a display screen with scanner may be located on both sides of the dispenser so that restaurant staff may control the dispenser and scan food products as they are placed into the dispenser. In some examples, a dispenser may be connected with a license plate scanner and have the ability to dispense items upon a recognized license place scan. In some examples, a license plate scan may be supplemented with biometric data of the occupants, mobile device communication of mobile devices of the occupants or other supplemental information.

In some examples, a dispenser that is located on the exterior of a restaurant may include a user interface 930, with which a consumer may interact for order pick-up and other functions. The user interface 930 may comprise a screen 931, for displaying instructions and information to the consumer. In some embodiments, this screen may be voice activated or feature a touch screen, allowing the consumer to interact with icons and buttons displayed on the screen. In other possible embodiments, this screen may merely display information for the user, who interacts with an application on their mobile device.

Multiple other embodiments and user interface schemes may be possible, with multiple interface methods having importance to allow different users to interact with the dispenser 900 in their preferred method. The user interface may include connections to the internet or to a private network of the restaurant as well as wireless interface connections for various standards include WiFi, Cellular, Near Field Communication, Bluetooth, ZigBee, RFID, and the like. The user interface 930 may also comprise a scanner 932, to scan barcodes, QR codes, or other user-specific codes generated by the application system, for ordering or pick-up purposes. This code may be integral to identify a user who has arrived at the dispenser 900, identify a user's order, or many other significant identifying information that may be important to ensure that a consumer receives their order.

In some examples, the user interface 930 may be located adjacent to the front access ports 920, as shown in FIG. 9B, or separate from the front access ports 920. In some embodiments, the user interface 930 may also be used for placing an order, for consumers who do not wish to use the mobile app ahead of time to place an order, or do not possess a mobile device with which to place an order. In other examples, the customer may typically place an order with a mobile device or at a kiosk. Different operational flows will be discussed in more detail following.

Referring to FIG. 9C, inside the dispenser 900, multiple food conveyance and conditioning pods 940 may be seen. Each of these food conveyance and conditioning pods 940 may be located on a movement apparatus 950 (in FIG. 9B) that changes their location within the dispenser 900. A location change may be important to move a specific food conveyance and conditioning pod 940 to a rear access port 910, front access port 920, or to a possible storage location 960 within the dispenser 900.

Food conveyance and conditioning pods 940 may be tuned to heat or cool the food placed within to a desired temperature, to maintain optimal consumption conditions while they wait in a storage location 960 for pick-up by a consumer. In FIG. 9B, a "Ferris Wheel" type movement apparatus 950 may be seen; this non-limiting movement apparatus 950 example may distribute food conveyance and conditioning pods 940 among front access ports 920, rear access ports 920, and storage locations 960. Such an example, may simultaneously maintain an upright position of the food conveyance and conditioning pod 940 so as to prevent food or beverages from spilling while being moved. In some examples, the pods may have active elements within them that keep the pod upright. For example, gyroscopic elements may be used. In other examples, active devices can monitor the orientation of the pod and make adjustments to weights within the base of the pod to stabilize the pod to a fixed orientation.

Other movement apparatus 950 types may be possible, such as sliding mechanisms that translate, rather than rotate the food conveyance and conditioning pods 940 to different locations within the dispenser 900, as a non-limiting example. Numerous means to create a storage location for food that may be accessed by restaurant personnel for placement of food, that may maintain environments surrounding the food during its storage, and that may dispense the food to a user when control conditions indicate a condition to dispense the food.

Figure 9D:
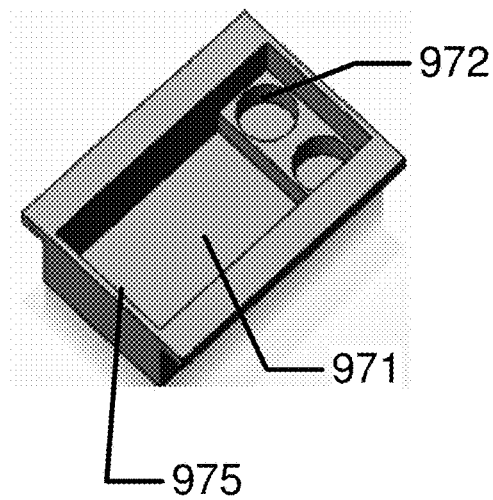
Figure 9E:
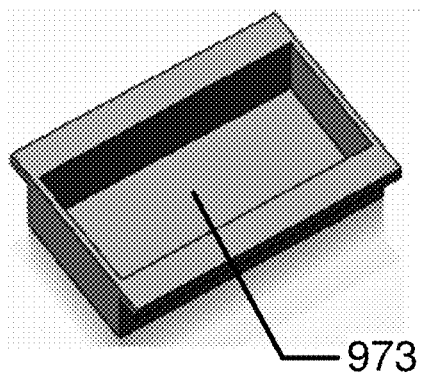
Figure 9F:
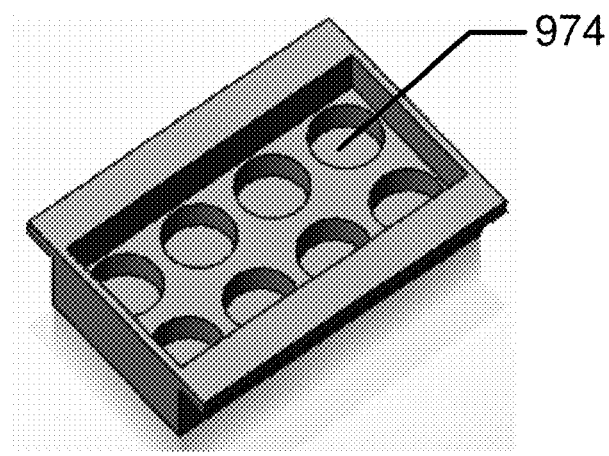

Referring now to FIG. 9D, FIG. 9E, and FIG. 9F, several examples of a food distribution tray may be seen. FIG. 9D may represent a possible standard food distribution tray possessing both a food (or solid and packaged goods) area 971 and beverage (or liquid goods) holders 972. Bags or other possible packaging for food may be placed in the food area 971 of the distribution tray raised sides 975 of the food area 971 of the distribution tray may keep the food from falling out of the tray when it is placed inside of the food conveyance and conditioning pods 940. If a consumer is removing the distribution tray from the food conveyance and conditioning pod 940 to acquire it, or at other points in the process between cooking and consuming the food, there may be jostling actions, shaking, jolting and the like which may dislodge stored products if there is not a sufficient height of the raised sides 975. In some examples, the food distribution tray may have a standard location upon which barcode labels may be affixed. In some other examples, food distribution trays may also include imbedded RFID devices or other devices for tracking and identification.

In an important embodiment, the food products are contained within fixtures within a bin of a dispenser where the fixtures are maintained within the bin when the customer removes their food. Thus, cup holders and food product bins may be opened to the customer where the customer may reach into the bin and remove cups and packages of food without removing the storage fixtures from the bin. Thus, in some embodiments there may be no paper or metal tray utilized to dispense food products to a user.

Similarly, raised sides of the cup holder 972 of the distribution tray may keep drinks from falling out of the distribution tray or falling over inside of the distribution tray when being placed inside of the food conveyance and conditioning pods 940, when a consumer is removing the distribution tray from the food conveyance and conditioning pod 940 to acquire the beverage and/or other items, or at other points in the process between the pouring of and consuming of the beverage, where it may be jostled or otherwise inclined to fall. If an order contains just food or just beverages, an employee may use a distribution tray optimized for food 973 (FIG. 9E) or a distribution tray optimized for beverages 974 (FIG. 9F), respectively.

Figure 9G:
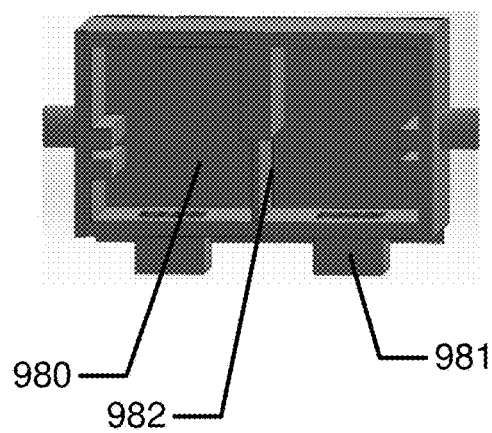
Figure 9H:
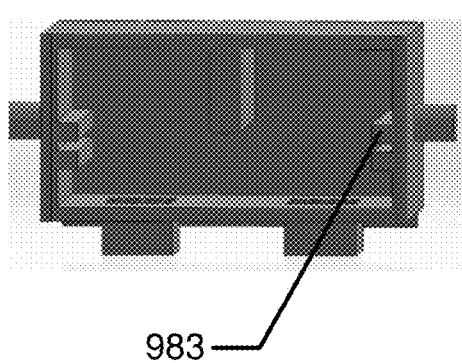
Figure 9I:
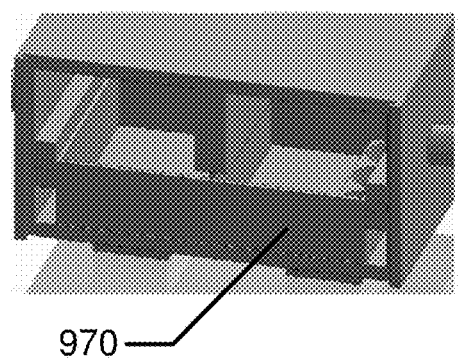

Referring now to FIG. 9G, FIG. 9H, and FIG. 9I, examples of food conveyance and conditioning pods 940 may be seen. Multiple views of this exemplary food conveyance and conditioning pod 940 are shown to demonstrate an embodiment of separable food conditioning areas 980. In this example of a food conveyance and conditioning pod 940, the storage location may be accessed from both the front and the rear of the unit as illustrated. Thus, by opening a set of front doors (shown removed in FIGS. 9G-9I) access may be granted from a single front access port 920. Alternatively, opening doors in the rear of the unit may allow access from a rear access port 920. In some examples each of the front and rear sides of the food conveyance and conditioning pod 940 may have two separate doors for access to a left or right side. The doors of a bin may slide open to grant access to a user when the user is identified with a specific identifier, a barcode receipt, or a mobile device-based barcode or other means of identification. The doors may include composite doors that open the outside environment to the inside of the dispenser, and each bin may have a set of doors which keep the heated and cooled environments controlled. These bid doors may be opened by the user or may automatically open on a verified identification being presented.

There may be two separate food conditioning areas 980 which exist inside a single pod, with individually condition control hardware 981. Thus, in some examples, the environment of the left side portion of the pod may be maintained at a refrigerated condition while the environment of the right-side portion of the pod may be maintained at a heated condition.

In some examples, the separation between the left and right sides of the pod may be achieved by a movable partition door 982, shown in a closed position in FIG. 9G and an open position in FIG. 9H. In some examples, the condition control hardware may comprise fans and thermo-electric heating and cooling modules along with a system controller which may interface with thermocouples or other temperature measuring devices located within the pod. Any heating and cooling systems which may interface with a moving pod may be utilized. In the example mentioned, thermoelectric temperature control modules may either heat or cool the region under the control of electrical flow with minimal vibration, and flow of chemicals and the like. The bins may include insulation to keep thermal environments stable. In some examples, vacuum vessels may be utilized for insulation where a metallic bin component on the inside and a corresponding piece on the outside are welded to thin interface components which keep an inside metallic part predominantly separated from a corresponding metal external piece, where the space between may be evacuated in some examples for good insulating properties.

Referring to FIGS. 9G and 9H, the partition door 982 may move to its open position, as shown in FIG. 9H, to allow a distribution tray to be slid into the food conveyance and conditioning pod 940. The distribution tray may include flanges on its side which may slid into mating slots 983 of the pod. Once a distribution tray is fully situated within the food conveyance and conditioning pod 940, the partition door 982 may move back down to its closed position. Locks may secure the tray in place so that it may not be removed without a proper unlocking device. Pressure sensing hardware may be coordinated with the partition door 982 to ensure that it does not push against any obstacles (food or otherwise) while descending to its closed position. This may prevent the accidental crushing of food or other items, which may be undesirable for the consumer.

In the case where there is an interference of the intermediate door, an employee may be warned of its happening, and prompted to adjust the food or otherwise remove the blockage inside of the food conveyance and conditioning pod 940. The profile of the partition door 982 may have a close fit to the distribution tray allowing the partition door 982 to close down on the distribution tray with minimal resistance or friction, yet to achieve as much of a thermal insulating barrier between the two separate food conditioning areas 980 as possible. This fit may also achieve further stabilization of the distribution tray within the food conveyance and conditioning pod 940 as it is moved around for storage and distribution.

When the food is ready for pick-up, the food conveyance and conditioning pod 940 may open at the front access port 920, and the partition door 982 may move to its open position. This frees the distribution tray to be grasped by a consumer and slid out of the food conveyance and conditioning pod 940. In some examples, the illustrated trays may reside with the bin and provide supportive surfaces to store the food in, where a user will reach into the bin and remove the food products from the bin trays without removing a tray. In some embodiments, separate smaller distribution trays may be placed in each of the separate food conditioning areas 980, or a single smaller distribution tray may be placed in a single food conditioning area 980. In some embodiments, both separate food conditioning areas 980 may be heated to maintain the condition of hot food or other heated items; alternatively, both separate food conditioning areas 980 may be cooled to maintain the condition of cooled beverages, ice creams or other cooled items. As the third possibility already mentioned, one of the separated food conditioning areas 980 may be cooled, while the other is heated.

There may be numerous sensors to monitor temperature, humidity, gas composition and the like. Other sensors may monitor the presence of food products and trays within the device. In some examples, cameras may be located within the pods to allow for remote viewing of the status within the pod. Other examples of sensors may include weight detecting pads or devices located within the bin that can identify when an item is placed or removed from a bin. The resulting signal can support the closing of the bin/pod.

In other examples, a weight range sensor may be used that may identify an approximate weight range of an order placed into a bin. This weight may be compared to a range of weights that may be expected for a particular order. Variation outside of an expected weight range may signify to the kitchen staff a potential with a paired order.

An RFID tracker or other proximity device may be tagged, labeled, placed, or stuck-on an order. In some examples, the device or tracker can be paired or assigned to a bin or dispenser. When the tracker or device is removed along with the order, the bin or dispenser may recognize its removal and close the bin/pod paired when a tracker device is observed to be removed. In a similar manner, laser scanning apparatus may also be used to determine when an item has been removed from its corresponding/paired bin or when the bin contains its order.

In some examples, the application may provide the user with a variety of control options that may be user selectable. For example, a user may request a target time for the placement of food into a food storage bin. In some examples, a GPS based positioning signal of a user may be utilized to determine their proximity and estimated arrival time at a dispense where such an estimate could be used to implement the targeting for placement of food or for heating hot food products shortly before an expected arrival of a user. The location determination may utilize geopositioning/geofencing techniques based on GPS receivers, cell phone location based on cell/repeater location capabilities, or any other technique that supports a determination of a user's location.

In some other examples, the user may choose a customized temperature and/or humidity that a user can request while their food is stored. In some specialized pods, there may be special equipment such as the ability to invoke a microwave function of the specialized pods. Users may request a pod with a microwave and may set a particular setpoint for microwaving their product when they pick-up the order. In some examples, a pod may comprise heat lamps. Hereto, the user may set particular set points for the heat lamp including when to turn on the heat lamp, when to turn off the heat lamp, and what level to set the heat lamp. In some other examples, pods may have specialized features to introduce aromas into the packaging of the stored food upon pick-up. Like the other specialized functions, the user may have optional control over the type of aroma, and quantity of aroma to distribute upon their packaging as the order is picked up.

The interior of the pods may be subject to numerous events that may create a dirty condition. Therefore, in some examples, the internal components may be shielded by covers which may be removable for thorough cleaning. In some other examples, the covers may be formed of removable material which may be disposable. So, a removable portion 970 may be removed and replaced at a frequency while the underlying surfaces may be cleaned between the placement of the removable covers. In other examples, the components may be sufficiently encapsulated so that the entire bin may be washed with vigorous washing flows. In some examples a pod washing apparatus may be located within the base of the dispenser and it may be able to engage a pod while it is stored in the lowest condition. The front and rear doors of the pod may be opened, after checking that the pod is empty. The cleaning unit may interface with the pod to clean, and/or sterilize and/or dry it.

In some examples, a user may connect to a dispenser in route. The choice for which dispenser to connect to may be determined by a variety of influences which may include the path of destination, time duration, selecting a store associated with a dispenser, application integration (i.e. google maps), proximity to current location, or its location near certain destinations.

Application Flow.

Figure 10:
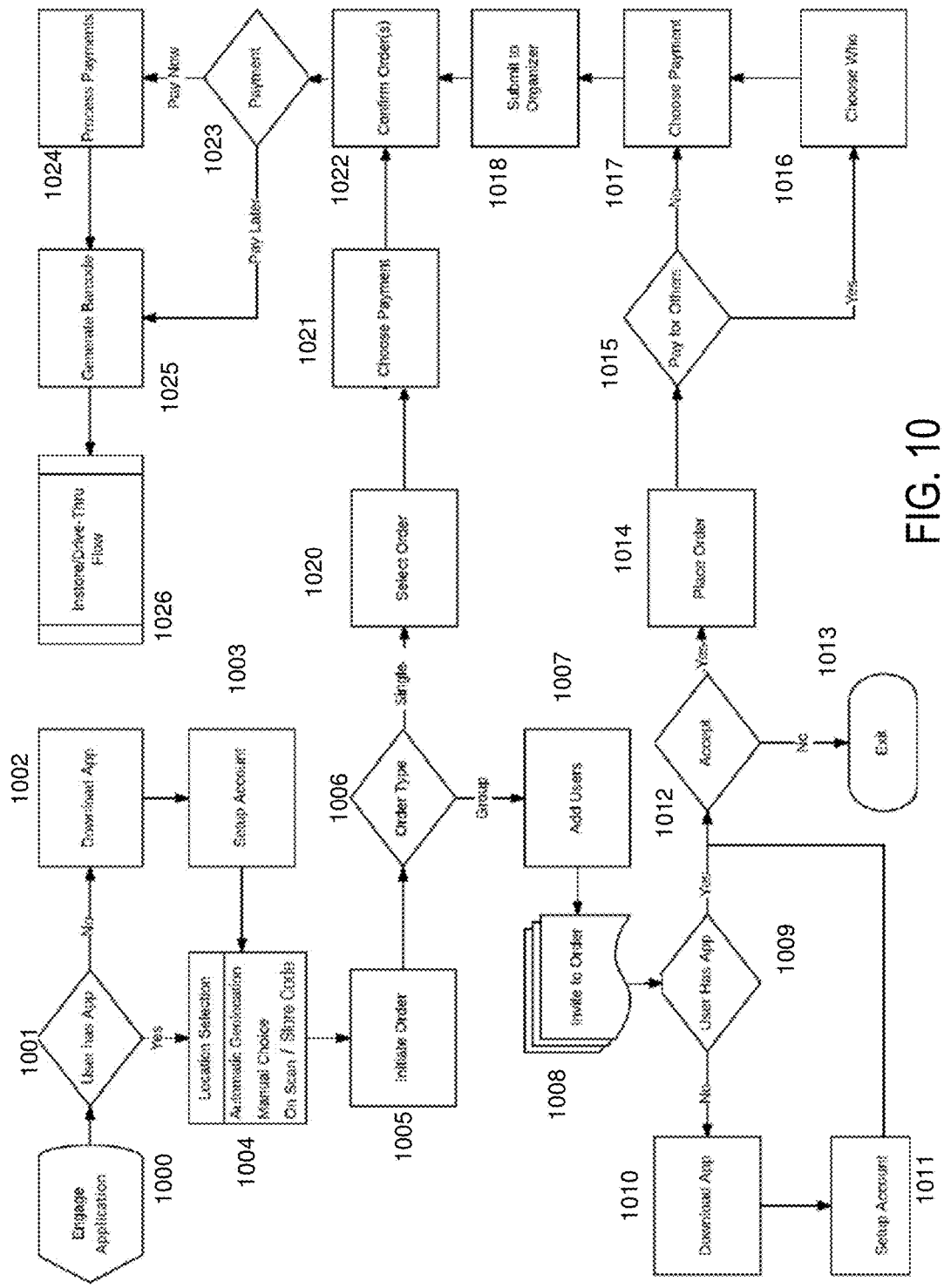
FIG. 10 illustrates an operational flow when an application is utilized.

Referring to FIG. 10, an example flow for the hardware and software elements of the present invention is presented. The intent of the application may be to transform drive-thru ordering of products through a tool which may increase kitchen staff efficiency, reduce errors, and provide alternative ways for consumers to order and pre-order food at a fast food or a quick-service restaurant establishment. The combination of hardware and software may create novel operational flow, novel apparatus for the support of new types of flow and other such improvements.

In some examples, an application form of a software program may be installed on a mobile device. The fast food-based application may be engaged by a user when preparing to order food. At step 1000 a user may attempt to utilize the application. A check may occur at step 1001 on a device that a user is utilizing. If the application is not present on the device, then the application may be downloaded 1002 and an account may be set up 1003. After account setup, the user may use the application at the same point on the flow when the earlier determination would have found that the application was present. The application may be used to select a location for the user to obtain a food product 1004.

In some examples, an automatic location selection process may be used. A GPS or mobile unit-based location may be determined by the application and that location may be compared to a location-based database for food products in the proximity of the user, where such a list of proximate location may be presented to the user. In some examples, other information about the user may be accessible to the application, such as preferences about types of restaurants, specific brands of restaurants and the like which may be used to prioritize lists presented to the user. In other examples, the user may opt to enter a manual selection for a particular restaurant and/or location. The barcodes created by the system can be scanned at numerous restaurant types that support the application, regardless of location. One barcode may be scanned at any franchise location, thus identifying the user's arrival at a specific restaurant upon scan. In some examples, during the ordering process the application may determine the nearest or most appropriate, based on other metrics, restaurant for the user to go to, if the user is open to the system making such a recommendation. The system may interface with other applications to assist the user with directions to such chosen restaurants.

At step 1005, the user may initiate the order process. The applicant may query the user, at step 1006, whether the order processing is for the user alone or for the user and one or more acquaintances. If the order is an order for a group of people, a repetitive loop of steps may occur to determine the identity of the users in the group 1007. The initial user may identify or invite other users by various means including their mobile number, their email address, an identification from various social media applications or other such means. For each of the group of identified users, the application may reach out to them with an invitation 1008. Each of the users may be contacted on a device where the presence of the application may be assessed 1009. If the application is not present on the next user of the group's device, it may be downloaded 1010 and the user's information may be used to set up an account 1011.

The application may receive a response from the user as to whether he wants to participate in the group order 1012. If the user rejects the invitation, then that user is terminated from the group 1013. The process may occur for each of the users identified in the group or until a timing deadline is reached. In some examples, the originator of the group may be asked for a deadline for group members to add their orders. In other examples, the user may obtain a status of the group members in their ordering process and may elect to end a waiting period for any members who have not completed their ordering process.

For users who accept the invitation, the applicant may allow them to place an order 1014. The application may offer to the user the ability to pay for their own order as well as an option to pay for the order of others in the group 1015. In many cases, the first user of the group may opt to pay for the entire group of subsequent users. Nevertheless, flexibility for other payment options may exist where other members of the group may pay for themselves or others. If the user from the group indicates they would like to pay for others, they may be presented with a list of the users in the group that they may pay for. At step 1016, the user may choose which of the group to pay for. At step 1017, the user may choose a manner of payment. For users in the group whose orders have been selected to be paid by another, the user in question may opt whether to accept the payment of another and for other situations the user may choose a method of payment. In some examples, users may have standard forms of payment that they may store on a database that the application interacts with. At step 1018, the first person who initiated all the ordering, who may be considered an organizer, may receive a submission of the orders of the group, the payment status, and the like. The organizer may finalize the ordering preparation process and confirm the orders at step 1022.

If there is no group order, then the ordering process may step from the previous step 1006 to a step where the user can select an order for themselves 1020. At step 1021, the user may make a selection of the manner of payment for the order. The application may default to a user's favorite method of payment. As with the group process, there may be numerous forms of payments that may be stored about a user on a server system associated with the application. In other examples, the user may provide information about a new form of payment, gifting rewards points, sharing store promotions, or other payment methods.

The payment for the order may next be presented to the user at step 1023. In some examples, the user may be given a choice between paying for the order after authorizing the order at step 1024. In which case, the payment will be processed. Alternatively, the user may opt to complete the payment at a later time. Processing may proceed to next generating a code 1025 associated with the order such as a 2-dimensional barcode or other unique identifying code. After the generation of the code, the processing may continue to one or more different flows related to use of the code 1026 in store, at a remote dispenser, or through a drive-thru. The application can generate unique barcodes, for users to place "Quick Orders," making payment, validating orders in-store and drive-thru, and picking up food from dispenser apparatus. Users may choose to receive notifications when an order is placed, when payment is made, when their order is ready for pick-up and other key functions of the operational process.

In some examples, the application may include a feature to "send order by me" command. Capability to send quick order or automatic "go-to" order to a certain restaurant or dispenser. In using the feature, a user may preselect a store, pick store by distance, route, direction, proximity, by landmarks/locations, time, or other methods. In some examples, the user may use voice control in controlling features.

Throughout this description reference is made to the use of "barcodes". It is understood that the use of the word "barcode" can be interpreted as a cryptographic representation or variations of images, codes, or other representations, which can be used to, but not limited to, unlock, decode, translate, transmit, or process a plurality of user information, payment information, order information, or any other information that is pertinent to the operation or use of the systems discussed within.

In-Store Flow.

Figure 11:
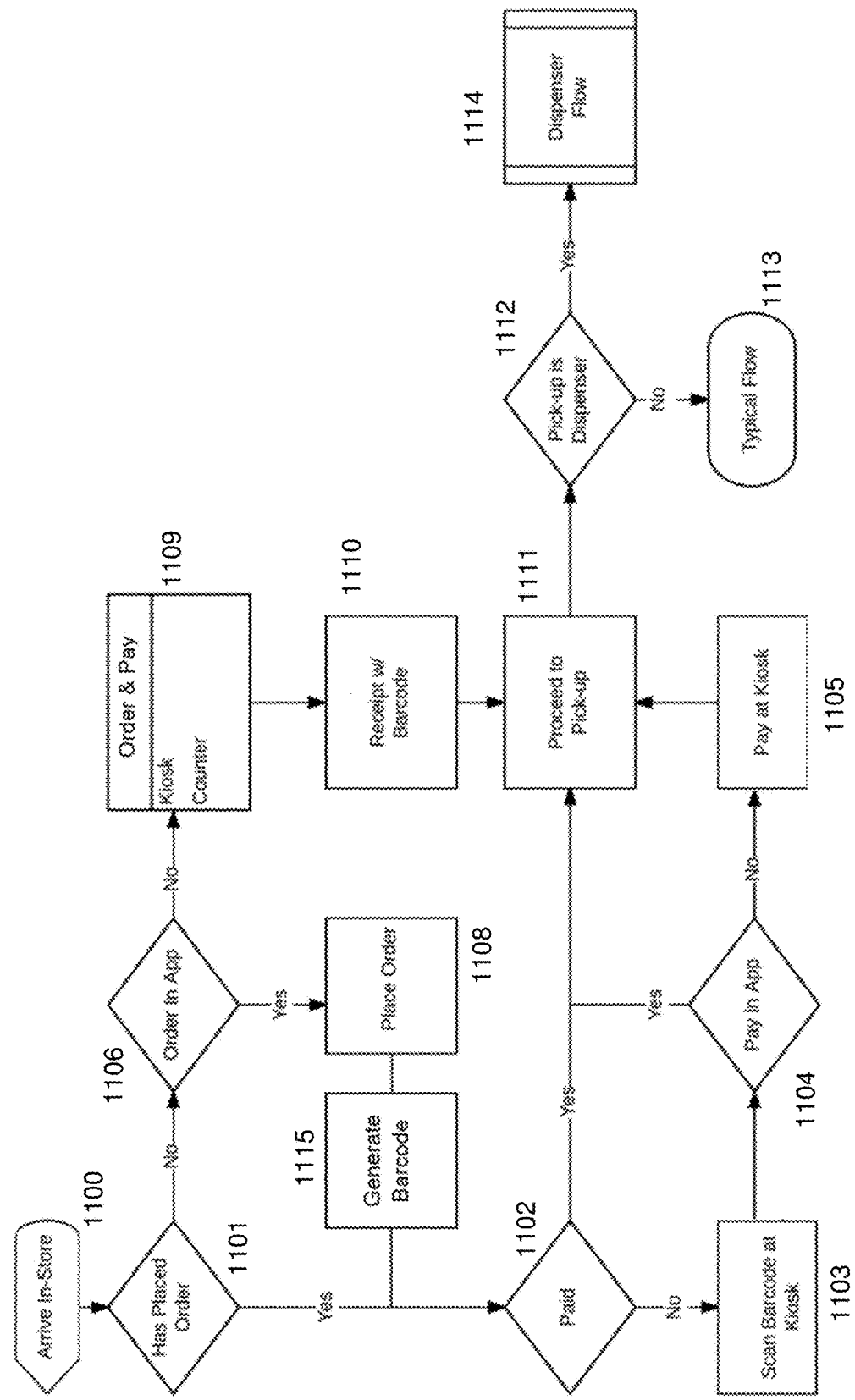
FIG. 11 illustrates an operational flow within a store.

In some examples, an order flow may be initiated with the application flow as described and then completed in the store. In some examples, the steps described with the application flow may occur in-store and then they may naturally be completed in-store. Referring to FIG. 11, the operational flow for in-store completion of an order flow is illustrated. At step 1100, the user may arrive within the confines of a restaurant ("Store"). In some examples, a WiFi system, a Bluetooth system, other NFC systems or other communication systems of mobile devices, may interact with the user's mobile apparatus if the appropriate permissions have been given by the user, and they may be greeted with a notification on their mobile apparatus which may include a status of any orders that may have been placed. The operational flow in FIG. 11 depends up the state of whether an order has been placed already in step 1101. If an order has been placed, the operational flow then depends upon the state of whether the order has already been paid at step 1102. If the order has not been paid, the user may either pay directly within their app within the store or the user may scan a user-specific, generated barcode or unique identifier that they have been provided with by the application related to their order and the other information of relevance to the user. The scanning of the barcode may occur at a kiosk within the store 1103. The kiosk may interact with the user and ask whether the user would like to complete payment within the application at step 1104. If they do, the kiosk may communicate with the application to provide communication of that desire. Alternatively, the user may elect to pay at the kiosk 1105. In some examples the user may provide a credit card, a debit card, cash, or other forms of payment such as bitcoin, rewards points, gift card balances, or other electronic currency. In some other examples, the kiosk may offer to process payment as may be processed within the mobile device app, where a stored form of payment may be accepted at the kiosk. The kiosk may have numerous forms of security to provide validation of such a transaction such as facial recognition, finger print scanning and the like. After payment has concluded the user may proceed to pick-up their order at step 1111.

Referring back to reference step 1101, in an alternative, the user may not have already placed an order and may prefer to use the application to process their order. As discussed previously, such an instore order process may also proceed with a group order processing scheme. At step 1106, the user may proceed to the application and at step 1108, the user may place an order through the application which may result in the generation of a unique barcode 1115. After proceeding through this operational step, the operational flow may proceed to the previously discussed step 1102 for further operation.

In the alternative, at step 1106, the user may opt not to place their order in the application device. Under such circumstances, the user may proceed to order and/or pay at either a kiosk or at a service counter within the restaurant 1109. In some examples, the ordering process may result in the printing of a receipt that includes a unique, barcode pattern 1110 consistent with the other operational aspects discussed herein. In some other examples, a barcode may be provided to the user on a label separate from any receipt that may be provided. In still further examples, the barcode may be electronically provided to a smart device of the user in addition to any receipt. In any of these cases the user may proceed in the operational flow to pick-up their order at step 1111.

During the completion of the ordering process, the pick-up location may be designated to be a dispenser as defined within the present specification. The designation may be made, in some examples at the choice of a user through operation of the mobile application, or through choices made at a kiosk, or with verbal communication with an employee at the counter. In other examples, the restaurant logistics systems may elect to provide the order at a kiosk and this may be communicated to the user. The operational flow depends upon the state of whether the pick-up location is at a dispenser at step 1112. If not, the user may receive their order via a typical flow at step 1113. If the pick-up location is a dispenser, then the operational flow will continue at step 1114 with the operational flow relating to dispenser operations in sections following.

Drive-Thru Flow.

The operational flow aspects of the present invention provide operational aspects for drive-thru operational flows which may expedite the delivery of a pre-order from the app.

The operations may also streamline drive-thru operations for users who do not use the application software and hardware of the present invention.

Locations utilizing the present invention may have the option of implementing a license plate scanner within drive-thru lanes. The automobile license plate may be scanned and associated with a user, either through information provided by users in their application or through previously filled orders of a user with an automobile comprising the license plate. When there is a match to a user, and a match to an existing order, the application will determine the status of the order.

Figure 12:
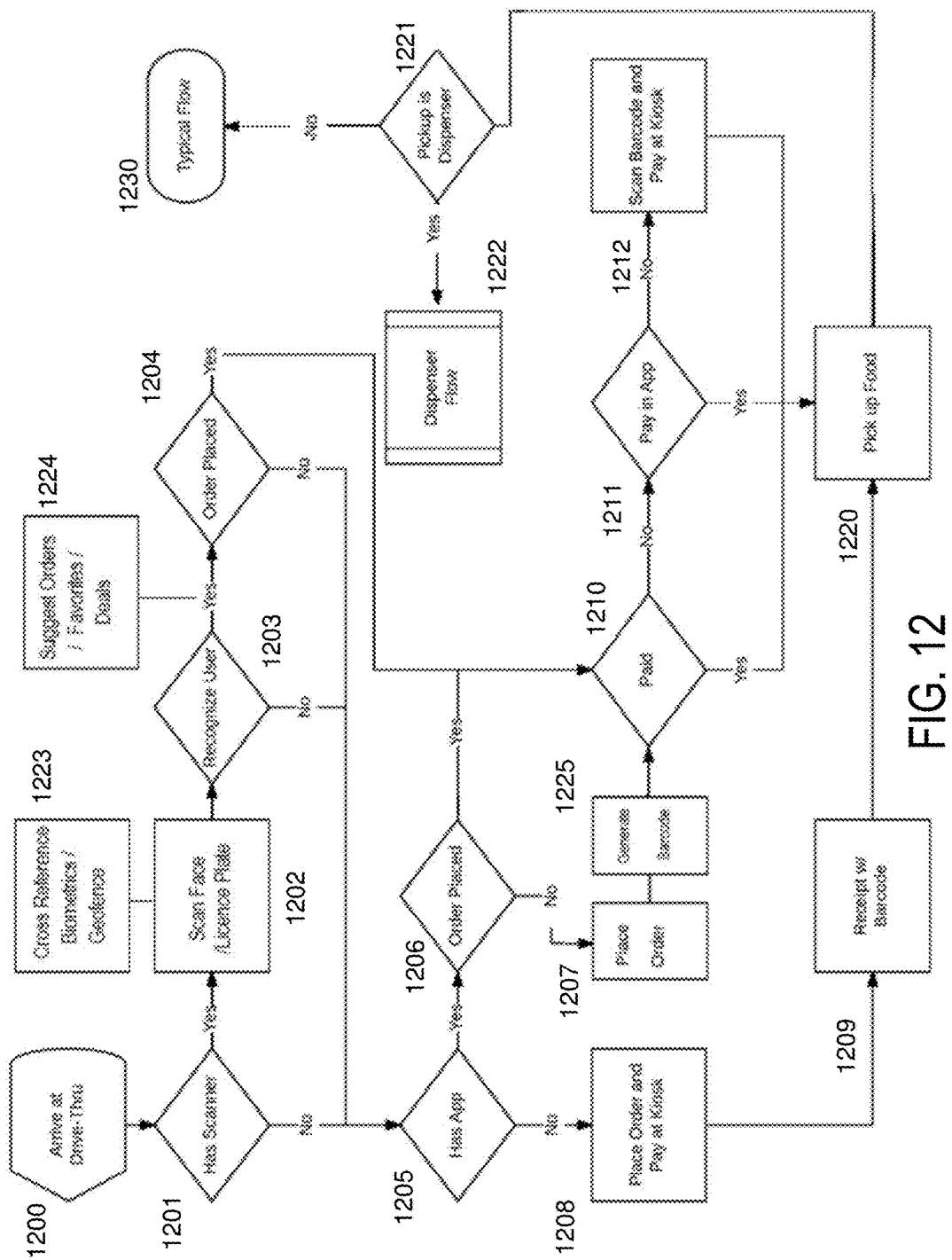
FIG. 12 illustrates an operational flow within a drive-thru.

Referring to FIG. 12, the operational flow aspects related to drive-thrus are illustrated. At step 1200, a user may arrive at a drive-thru. If the establishment has a license plate scanner the operational status at step 1201 may proceed through license plate scanning related operations. At step 1202, the license plate of the arriving vehicle may be scanned, or a user's face may be scanned, or a combination of both or several other identification methods. The system may include cross-reference related data including biometrics and coordination with geofence systems that can indicate the location of an identified user at step 1223. Analysis of data on the license plate may allow the controlling software of the system to determine whether the user is recognized at step 1203. The recognition of the user may allow the system to draw upon configuration aspects of the user 1224 which may include the ability to suggest orders based on previous orders, preferences, favorites, and the like.

There may be other means of identification of the user within a vehicle. In some examples, an automobile may communicate a unique identifier through its electrical systems through a WiFi, Bluetooth or other system broadcast. In some examples, the automobile may maintain a database and itself may be able to interact with communication systems of the restaurant at the drive-thru to understand the identity of the restaurant and communicate a specific identifying code associated with the car at the particular type of establishment. In other examples, the user's mobile device may communicate identifying information to the establishment at the drive-thru. Equivalently, if any of these methods are used, the resulting identification information may be used to determine whether the user is recognized at step 1203.

If the user is recognized, then the status of whether an order has been placed is queried at step 1204. If the order has been placed, then the operational flow proceeds to assessing whether the order has been paid for at step 1210. If any of the status queries, including whether there is a license plate scanner, whether there is a recognized user, or whether an order has been placed has a negative status, then the operational flow may proceed to whether the user at the drive-thru has the application on a mobile device at step 1205. If the user has the app, then the app is used to assess whether an order has been placed at step 1206. If an order has been placed, then the processing flow also proceeds to the step at 1210 of whether the order has been paid.

On the other hand, if the order has not been placed at step 1206, then the operational flow proceeds to step 1207 and the order is placed by the user on the app. The system may process the order and generate a barcode 1225 and processing also proceeds to the step at 1210 of whether the order has been paid for. If it has been paid, then the flow will proceed to allow the user to pick-up the food 1220. If the bill has not been paid, then the user may pay in an app 1211 after the user has scanned the unique barcode at the kiosk. If the user opts not to pay in the app, then the processing may proceed to the user proceeding to a kiosk, and then scan their barcode to order and pay 1212. The payment may proceed by a credit card charge, bill payment, or through using payment mechanisms set up in the account of the user on the application which may be accessible at the kiosk.

If at step 1205 the user is found not to have an application installed on a mobile device, the application flow may proceed to step 1208 where the driver may proceed to a kiosk where the user may place an order and pay for it. After the payment is completed, the user may receive a receipt with a unique barcode identifier thereupon 1209. The user may take the receipt to pick-up the food 1220.

When the processing proceeds to step, to pick-up the food 1220, a state may be resolved relating to whether the pick-up processing has been sent to a dispensing apparatus. 1221. If the processing has been sent to the dispensing apparatus, then processing proceeds to the operational flow for automatic dispensing, as mentioned in following sections 1222. If the dispensing is not sent to a dispensing apparatus, then processing proceeds to normal operations 1230 such as an employee dispensing a food order to the user.

Dispenser Flow.

The operational flow aspects of the present invention include steps related to the utilization of unique dispenser apparatuses. In some examples, a single type of dispenser is utilized in a number of locations of a store/restaurant. In others there may be tailored types of dispensers depending on the location of the apparatus within the store. A dispenser is a point-of-sale food pick-up device for orders placed using the application related flows as have been described. After marking the order with a unique barcode or identifier, kitchen staff can place the food order into the dispenser for easy retrieval by the user. The order can be scan, cataloged, and traced by matching the user-specific code with the said unique identifier from the kitchen.

In the various operational states as mentioned previously an order for food is placed with the restaurant. Upon receipt of the order, the store prepares and packages the food. Barcodes are used to identify the orders and placed on order containers. Barcodes are scanned prior to the order being placed in a dispenser bin to track the location of order and guide the customer to their order for automated pick-up. Upon scan, a dispenser pod is matched or paired to the item, which will then correspond with the customer's uniquely generated identifier scanned at pick-up.

Figure 13:
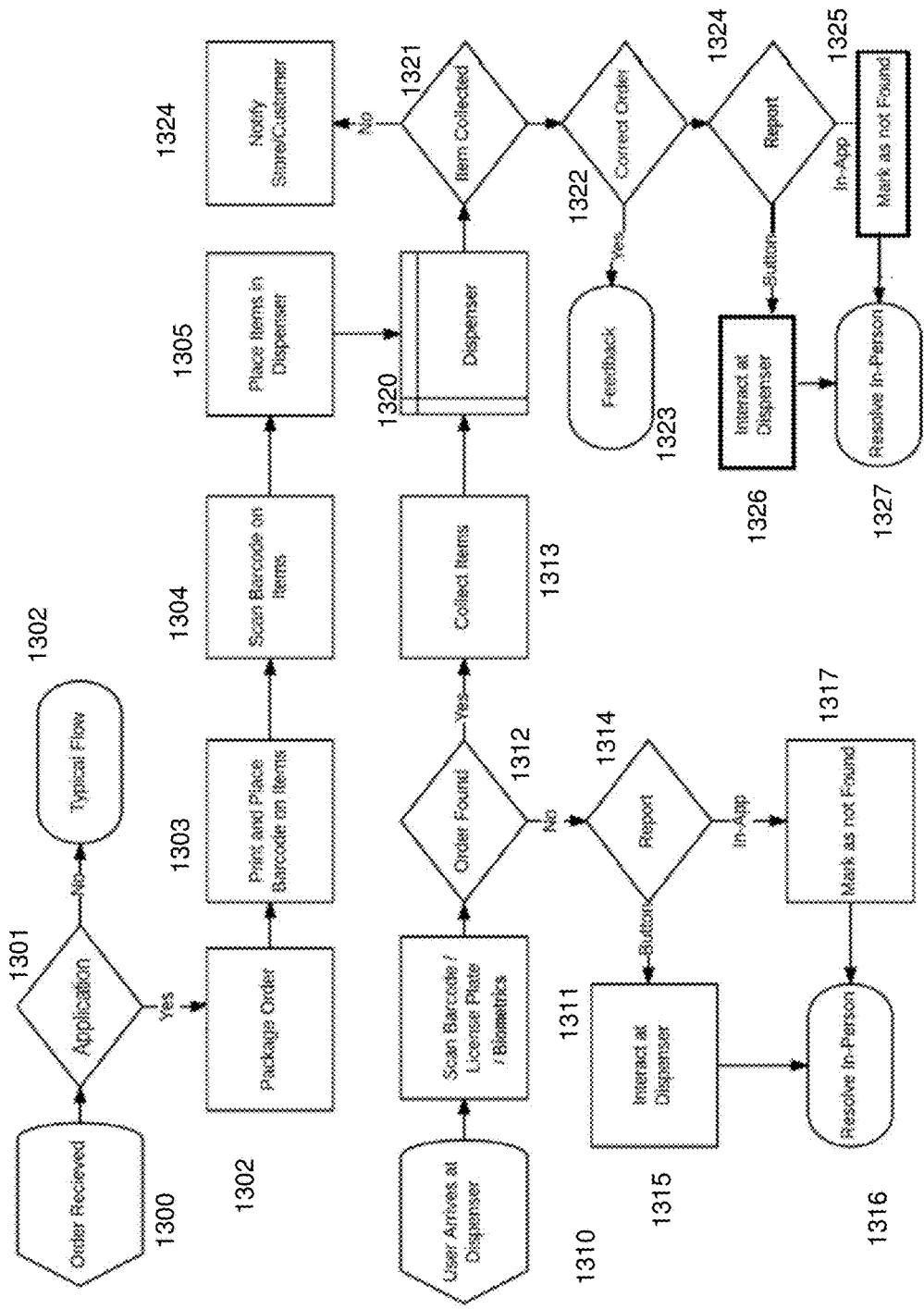
FIG. 13 illustrates operational flows relating to dispensing apparatus.

Proceeding to FIG. 13, exemplary operational flows related to the food dispenser are illustrated. At step 1300, a food order is received at the restaurant. At step 1301 a state variable is ascertained as to whether the food order has been placed through the application processes, which considers the use of printed receipts containing unique identifiers, as have been described. If the state is resolved that the order has not been placed through the application flows, then a typical form of dispensing at the restaurant is performed at step 1302. However, if the state is resolved that the order was placed through the application then a packaging flow step 1302 specific to the application is commenced. The food order will be labeled with a barcode that is printed for the order 1303. The processing may continue with a scan of the barcode immediately upon placing the label to ensure that the systems will be able to read the barcode properly 1304. Next, the food order may be placed within the automated dispenser 1305, which deploys an appropriate receptacle designated to the unique identifier upon scan. As mentioned previously in relationship to examples of the dispenser, the food order may be stored under conditions which may allow the warm items to be kept warm and the cool items to be kept cool at step 1320.

Continuing with FIG. 13, a user may arrive at a dispenser 1310. As mentioned, there may be numerous locations for a dispenser, however three standard locations may include a dispenser that is located within the order room of a restaurant such that the front of the dispenser faces the customers on one side of a wall and the rear faces the kitchen on the other side of the wall. In another example, the dispenser may also be located within a wall where one side faces a drive-thru lane and the other faces the kitchen of the restaurant. The third standard location may be remote from the restaurant in a standalone location. Restaurant staff may fill the dispenser from one side while customers access from the other in some examples.

As the user interacts with the dispenser they may provide information about themselves by scanning their barcode 1311 with a barcode scanner of the dispenser. In some other examples, the dispensing system may also be able to read a facial scan or license plate on a vehicle of the user for identification. Other biometrics may be obtained for identification purposes or cross-referenced with other identification methods. Methods as such may be paired with scanning systems at the time of order to assist in the identification of users who may or may not have used a mobile application or device. Next, the system may investigate whether the order related to the barcode/license plate is located in the dispenser at step 1312. If the order is not located in the dispenser, a report condition is flagged at step 1314. The report may be passed on to restaurant or other staff of the restaurant. The staff may interact with the customer 1315 at the dispenser. This may be through two-way communication devices at the dispenser, which may include an audio/video session through the kiosk of the dispenser. In other examples, a staff may resolve the discrepancy in person at step 1316. In other examples, the report of the missing order may be reported to the user through the application at step 1317. Hereto, staff of the restaurant may interact with the client in person to resolve the issue at step 1316.

When the order is found at step 1312, the processing will continue to support the collection of the items for the order 1313. In some examples, the processing at step 1320 may proceed to move a food conveyance and conditioning pod from a storage location to a location which may open up to the verified customer. Then the customer may collect their order at step 1321. In some examples sensors in the dispenser may sense whether the order has been fully collected and warn the user if not. If the item remains uncollected, communication to both the store and the customer may be made at step 1324 using the application and various communication means. If the item is collected, the system may query the user as to whether the order was the correct order at step 1322. In some examples, in addition to the answer of whether the order was correct, the customer may be given the chance to provide feedback 1323 about the order, quality and process to fulfill the order. If the order is incorrect, a report condition is flagged at step 1324. The report may be passed on to restaurant or other staff of the restaurant. The staff may interact with the customer 1326 at the dispenser. This may be through two-way communication devices at the dispenser, which may include an audio/video session through the kiosk of the dispenser. In other examples, a staff may resolve the discrepancy in person at step 1327. In other examples, the report of the missing order may be reported to the user through the application at step 1325. Hereto, staff of the restaurant may interact with the client in person to resolve the issue at step 1327.

Identification

There may be numerous types of codes that may be used to provide identification and operational information. In some examples herein, barcodes may be used including one dimensional barcodes, two dimensional barcodes and more sophisticated barcodes where color or holographically encoded information may be accessed. In some examples, 2D barcodes may be used in various steps throughout the ordering and pick-up process. Examples of the 2D barcodes may include those that use JSON Web Token (JWT) technology (such as may be found in reference to the web page https://jwt.io/) to encode data pertinent to a transaction.

Figure 14:
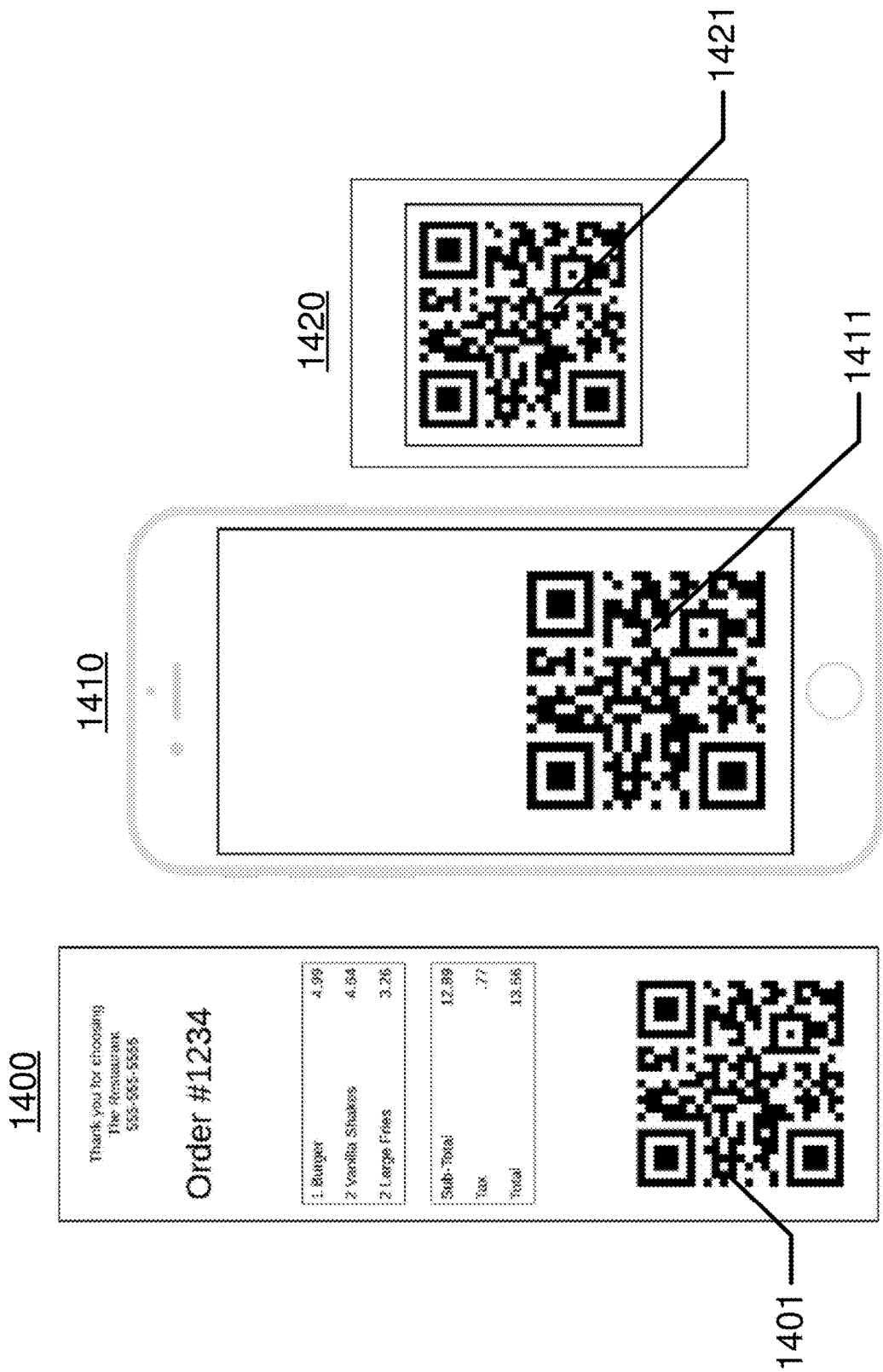
FIG. 14 illustrates exemplary forms of 2d barcodes.

The "Operating System" or application will decode and validate the tokens, and then process transactions. Referring to FIG. 14, the codes may be generated or read in various aspects of the operations discussed herein including on mobile devices with operating systems such as iOS and Android 1410 where the barcode may be a 2D code displayed on a screen 1411. In some other examples, the code may be generated on a receipt 1400 where the code is printed on the receipt 1401. In still further examples, the code may simply be printed upon a label at step 1420. In some examples, a label may be a tag which includes an embedded identification device 1421 such as an RFID, where an electronical representation of the barcode pattern may be stored and transmitted. The tag may also act as a proximity tool that pairs with a dispenser or dispenser bin, and may identify when an item is placed, present, or removed from said dispenser or dispenser bin. As shown a tag may have both a printed code and an embedded identification device 1421 or it may merely have the embedded identification device.

The barcode may contain numerous forms and values of information relating to the customer, the order, and other operational aspects. In an example, the information contained in the code may include the following data: data for transaction validation; a transaction type identifier; an order number; a location identifier; financial information such as the total cost of an order, and a signing key which may include the means to identify dispensing locations and storage bins and the information to unlock dispensing apparatus for an order with security. A signing key may be a unique identifier that is generated each time a barcode is requested and provides a secure manner to control the integrity of barcodes to users, orders and produced food products. This may ensure that a new, uniquely generated barcode may not be duplicated or copied, is user-specific, may only be used within the application, or is newly generated at the start of every order process, thus enhancing user security and order fidelity. Upon dispenser scan, the user-specific, uniquely generated barcode with signing key functionality may be encrypted, erased, locked, or any other method may be used in disabling the barcode and rendering it unusable or incompatible for future use.

"Quick Orders"

A user of the applicant may build an experience history as they utilize the application for purchasing orders. The overall operational flow may be controlled by software algorithms that operate on servers that may be located in a restaurant or remote from a restaurant. The user's identity may cause algorithms to pull up the order history of a user and display a set of "Quick Orders" which the user may select in as little as a single finger stroke. There may be numerous ways that the system choses and provides choices for the quick order scheme. In a first example, the system may look at order history and choose from the highest frequency orders that a user has made and provide the top ones as quick order options. In some examples, the frequency of orders may be time weighted so that the most frequently order most recent orders are dominant as choices for quick orders. In a different vein, in some examples the system may have access to other information related to the user and his environment where factors such as the temperature of the environment that the user is located in may influence the types of orders that are provided as quick orders. In some other examples, the recent history of orders of all users not just the user himself may provide a "socially" influenced list of quick orders. If the user has linked the application with social media systems, choices across "friends" of the user may be provided as a quick order for the user. In other examples, the system may have access to marketing promotions of a particular restaurant that a user is in proximity to and some of these may be provided to the user as a quick order. Saved favorites may also be categorized and stored for later use so the user only has a single button request to generate a favorite order to be scanned and paid for at kiosk arrival.

A quick order may function as a list of graphical options that is displayed to the user through a mobile device using the application or through a kiosk where the kiosk has been initialized to the user's identity for an interaction session. The user may touch one or more of the quick order options to get more information about the option, and ultimately as the user drills down to the information about the option, they may be able to touch a button to activate an order process of the button. The quick order process may create a barcode in much the same manner as has been described with information contained in the code such as a transaction type identifier, a particular quick order identifier, a user identifier, payment identifiers and the like.

Order/Package Label Logistics

When a kitchen utilizing the applications as discussed herein receives an order, the system may communicate a unique order label to apparatus in the kitchen which may be used to identify and track an order process. Said label may match or correspond to the user's unique identifier. At each step in the process of preparing the food order, assembling the food order, and placing the food order into dispensers a unique order label(s) will be scanned to allow the order and its associated status to be tracked, logged, and matched to a dispenser and corresponding user-specific, unique identifier. The printed label may include transaction type identifier, order numbers, location identifiers, financial information including total cost, a signing key, and the like.

Infrastructure Architecture

Figure 15:
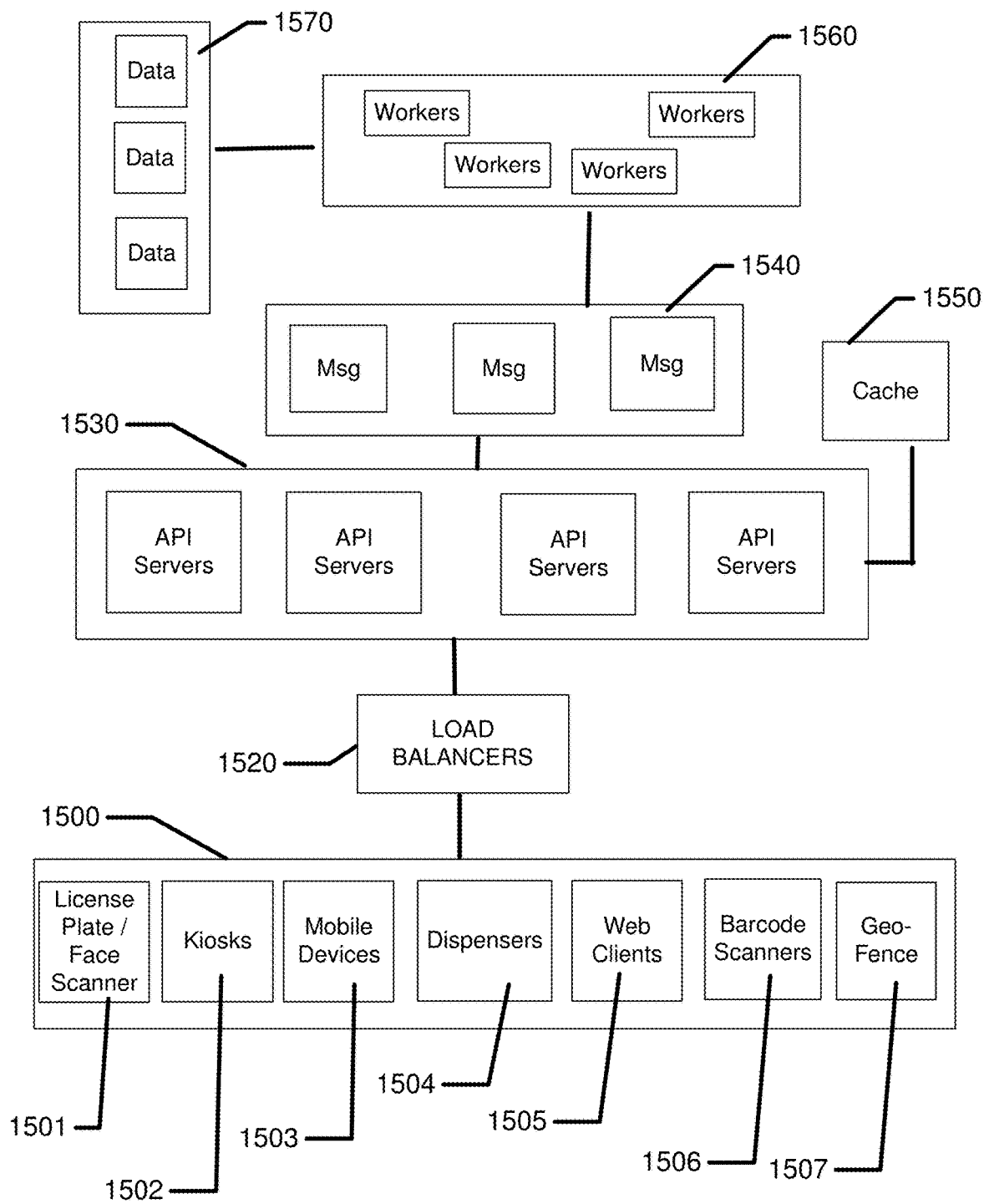
FIG. 15 illustrates an exemplary infrastructure architecture for operations.

A core aspect of the various operational improvements disclosed herein is the supporting information technology architecture and its associated software. In some examples, the infrastructure architecture platform makes use of a Service Oriented Architecture pattern. Referring to FIG. 15, an illustration of an exemplary platform shows the interconnection of various components. A collection of interfaces 1500 includes the devices that users will interact with across the platform. The collection of interfaces 1500 includes applications which drive various devices such as license plate scanners or facial scanners 1501, kiosks 1502, mobile devices 1503, dispensers 1504, web clients 1505, barcode/unique identifier scanners 1506, and geofencing infrastructure 1507 as non-limiting examples. The architecture may also include a load balancer 1520 which routes traffic to the "workers" 1560 based on the traffic load experienced by the servers 1530. The "workers" 1560 may include each service that may be managed by independent applications. Some examples of services which may be managed by a work include payment, ordering, unique code generation, receipt generation and the like.

Given the distributed nature of the service, as well as the possible scale of use, this exemplary architecture may be built to scale horizontally. As services receive higher amounts of usage, more servers may be added to a "pool" to handle the increased load. The API Servers 1530 provide the resource for processing transactions in the system. Requests will be routed to a Message Queue and distributed to other workers within the system. To make the system fault-tolerant, the architecture may use message queues 1540 to communicate between services and ensure that transactions are resent and processed in case of failure. Continuing with the architecture, various caching mechanisms 1550 may be used to ensure application speed is maintained at a high level. As well, various data stores 1570 may be implemented to hold application data.

Physical Architecture.

Various physical devices support the operational flows as have been defined. The physical architecture may include various hardware devices and software applications throughout the ordering and pickup process. Some of the physical devices may include barcode scanners, browser-based applications, dispensers, food preparation and packaging devices, kiosks, facial scanners, license plate scanners, communication devices such as routers, WiFi nodes, near field communication hubs, mobile applicant platforms, receipt, and label printers as non-limiting examples. Each of these elements may work with one another in various ways throughout the process.

Different combinations of these different device types may be used in the store versus at the drive-thru and in other external locations. A user who engages with the system in-store may interact with the system with numerous exemplary devices. For example, a mobile device may be used in-store to place an order, invite users for group orders, and generate barcodes for various activities with the application on their mobile device. Another example may include a kiosk with barcode scanners which may enable a user to place an order in various manners. The kiosk with barcode scanner may interface with a user's mobile device, or it may be used to manually place an order. The kiosk with barcode scanner may enable the user to pay with their mobile device or pay directly through the kiosk. A barcode printer made be used in cases that the user does not use the other aspects of the application; in which case they will receive a receipt with printed, use-specific barcode to interact with the rest of the operational flow. Dispensers may be located in store to dispense from the kitchen to the customers in the restaurant hall.

The drive-thru operations of the system may use some of the same physical architecture as is used in store but in different ways, and it may have additional devices. For example, the external drive-thru may have a combination of license plate scanners that may identify a customer as they approach the restaurant and drive-thru and another set of scanners when they pick-up their food at a dispenser. There may be two types of dispenser related to drive-thru operations. In a first example, a dispenser may be located at a wall of the restaurant, so the restaurant staff may load from the kitchen and the user may pick-up thru the drive-thru lane. In another type of external operation, a standalone dispense may be used where the dispenser does not pass thru a wall and a car may pull up to an isolated dispenser device. Remote orders placed ahead of time may come to a designated dispenser as well. The user may engage the system through use of their mobile device. The use may employ the mobile device to place an order, invite users for group orders, and generate barcodes for various activities with the application on their mobile device. The external physical architecture may include a kiosk with a barcode scanner which may allow a user to place an order with their mobile device, manually place an order at the kiosk, pay with their mobile device, and pay through the kiosk. The kiosk may also include a barcode printer for users to print a barcode receipt if they are interacting with the system without a mobile device application. The dispenser itself may include a hardware component with functionality similar to a kiosk.

Another set of operations which include a physical architecture may be within the kitchen. Employees who are preparing the food and performing operations may receive information and directions from browser-based applications displaying information on terminals to process orders, print labels for food items or containers, and track orders. Barcode and label printers may be used to create the user-specific, barcode labels to organize logistics and ensure food location and correct order placement into dispensers. A number of types of dispensers will physically interact with the kitchen where employees may load food packages with barcodes thereupon. A track system, belt, mechanized item container, or other means of transporting, automatically labeling, scanning, pairing with a dispenser bin, or loading items into a dispenser or dispenser bin may be used. This may aid kitchen staff in item queue management, tracking, scanning, or delivery into the dispenser. Scanners in the kitchen and at the dispenser may be used to track food products as they are processed and in their storage locations within dispensers. Said user-specific barcodes, may match the same one-time, user-specific generated barcode given to a customer.

Specific Examples

Ordering Process at a Kiosk

The methods, apparatus, and application software as have been described may be used in some examples to enable use of kiosks in the ordering process. Referring to FIG. 16, at step 1600 the ordering process may optionally commence with a facial scan. At Step 1601, a user may be allowed to place an order at a kiosk, or on a mobile device first and then scan a resulting order barcode at the kiosk. At step 1602, the system devices may communicate the order, identification and other data to servers/cloud and receive information back to a mobile device to constitute a barcode. At step 1603, the process may continue with the issuing of an order to a restaurant to create a logistics order in kitchen and signals to a label printer to print a barcode. At step 1604, the kitchen of the restaurant may prepare the order and affix the label to a tray, cup, or other packaging. At step 1605, a member of the restaurant staff may place the prepared food order into a dispenser and optionally scan barcode with a barcode scanner to ensure that the system has recorded the correct location of a specific order. At step 1606, communicate progress of order to customer. At step 1607, initiate a communication process at the dispenser where the customer presents their mobile device with barcode to scanner at the dispenser. At step 1608, the system may issue commands to move the dispenser positions to open the pod with the order to the customer where they pick out the order. Variations of this specific example are well within the intent of the present disclosure.

License Plate Scanning and Ordering

Figure 17:
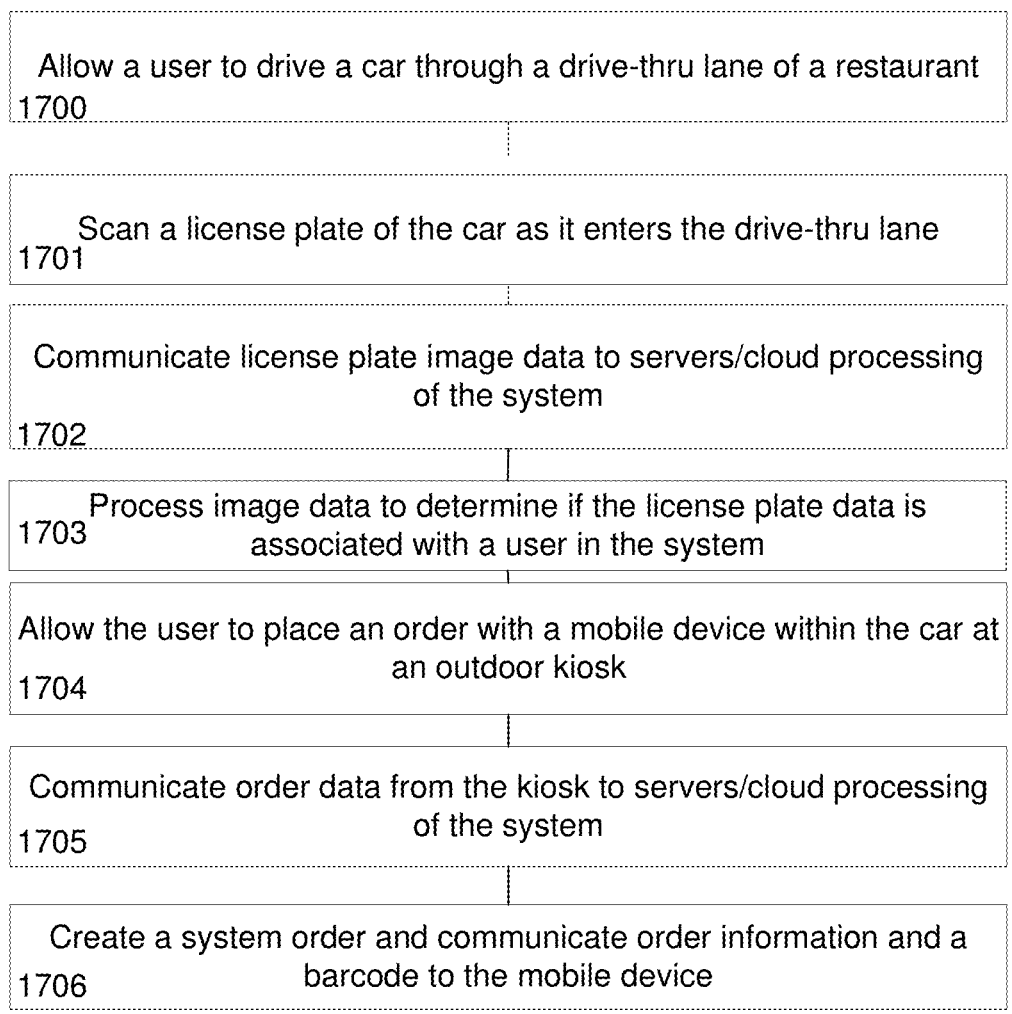
FIG. 17 illustrates operational flows related to license plate scanning and ordering.

The methods, apparatus, and application software as have been described may be used in some examples to enable license plate scanning techniques in the ordering process. Referring to FIG. 17, at step 1700, allow a user to drive a car through a drive-thru lane of a restaurant. At step 1701, a license plate scanner may be used to scan a license plate of the car as it enters the drive-thru lane. At step 1702, the system may communicate license plate image data to servers/cloud processing of the system. At step 1703, servers or cloud-based processing devices may be used to process the image data of the license plate to determine if the license plate data is associated with a user in the system. This may be cross-referenced with facial scanning, biometrics, geo-positioning, geofencing, and the like to improve user identification effectiveness. At step 1704, the system may allow the user to place an order with a mobile device within the car at an outdoor kiosk. In some cases, the user may have already placed an order or have an automatic "go-to" order placed and charged upon scan. The user may confirm or edit the order upon identification at the kiosk, as well as have order suggestions presented. In some cases, if the user elects to edit the order, the user may be charged or credited with a change in price, either through the application or through the kiosk's pay functionality. At step 1705, the system may communicate order data from the kiosk to servers/cloud processing of the system. At Step 1706 a system order may be created and communicated. As well, the system may communicate a barcode to the mobile device of the user. Variations of this specific example are well within the intent of the present disclosure.

License Plate Scanning and Dispensing Apparatus

The methods, apparatus, and application software as have been described may be used in some examples to enable license plate scanning techniques in the order dispensing process. Referring to FIG. 18, at step 1800, the system may allow a user to place an order via any accepted process to a restaurant that associates the order with the user of the system application. At step 1801, the system may allow a user to drive a vehicle through a drive-thru lane to a dispenser. At step 1802, the system may use a license plate scanner at the dispenser location to scan the license plate of the car. At step 1803, the system may send image data related to the license plate scan to servers/cloud and determine if the user is in the system. This may be cross-referenced with facial scanning, biometrics, geo-positioning, geofencing, and the like to improve user identification effectiveness. At step 1804, if the user is in the system and an order is ready for pick-up at the dispenser move a related food product to a pick-up location of the dispenser. At step 1805, the system may optionally send a barcode or code to a mobile device of the user and request the user enter the code or scan the barcode to a barcode scanning device associated with the dispenser to authorize dispensing. In the alternative, the system may authorize the dispensing based solely on recognizing they user based on the license plate scan and recognizing an order associated with the user at the location of the dispenser. At step 1806, the system may dispense the product to the customer of the vehicle at a dispenser. Variations of this specific example are well within the intent of the present disclosure.

Operational Flows not Involving Mobile Application Processing

The methods, apparatus, and application software as have been described may be used in some examples to enable ordering and dispensing flows that do not involve mobile application processing. Referring to FIG. 19, at step 1900, the system may allow a user to approach a kiosk within a restaurant without a mobile device. At step 1901, the system allows a user to place an order at a kiosk without a mobile device. The user may log onto the system with a password to provide identification aspects. And, in some examples, the kiosk may use facial or other biometric means, which may be supplemented by geofencing and the like, to identify the user. In some other examples, a user may log on as a guest user without identification to the server, so long as a local means of payment are enabled. At step 1902, the system may communicate the order, identification and other data to servers/cloud and receive information back from the system to the kiosk. A receipt may be printed with a unique barcode at the kiosk and distributed to the user. At step 1903, the system may issue an order to the restaurant to create a logistics order in kitchen. The communication may include signals to a label printer to print a barcode in the kitchen. At step 1904, employees of the restaurant may prepare the order and affix the label to a tray, cup, or other packaging. At step 1905, staff of the restaurant may place the order into a dispenser and optionally scan barcode with a barcode scanner to ensure the integrity of the identification and location of the food product. At step 1906, the system may communicate progress of the order to the user. At step 1907, the system may initiate a communication process at the dispenser where the customer may present their receipt with the barcode to a scanner at the dispenser. At step 1908, the dispenser may verify the barcode presented to it and find the appropriate bin location of the order. The bin may be moved to a position where it can be opened to a user, so they may receive their order. Sensors within the bin may verify that the bin is empty after the user receives their order and may automatically close the bin. Variations of this specific example are well within the intent of the present disclosure.

Operational Flows with Drive-thru Point of Sale Kiosk Scan

The methods, apparatus, and application software as have been described may be used in some examples to enable ordering and dispensing flows that do not involve mobile application processing. Referring to FIG. 20, at step 2000 the system may allow a user to drive a vehicle to a restaurant and engage the system even if they do not have a mobile device. At step 2001, the system may allow the user to drive the vehicle through a drive-thru lane at the restaurant. At step 2002, the system may utilize a license plate scanner to scan an image of the license plate. In some examples, the license plate scanner may include system aspect that convert the image it collects to a textual value for the identity on the license plate. Either the image or such textual identity may be passed to the system at step 2003. At step 2004, if the license plate scanner does not process the image itself, the system may process the image data to determine if the license plate data is associated with a user in the system. Additional identification methods, such as geofencing and the like, may be used to supplement license plate scanning. Such a determination may also occur with textual data passed from the license plate scanner. At step 2005, the system may allow the user to place an order without a mobile device at an outdoor kiosk. In some examples, the user may engage the kiosk with verbal communication. In some other examples, the system may allow the user to engage the kiosk with touch screen interface. At step 2006, the system may print a receipt for the order with a unique barcode and distribute it to the user. Variations of this specific example are well within the intent of the present disclosure.

License Plate Scan for Dispensing without Mobile Application Processing

Figure 21:
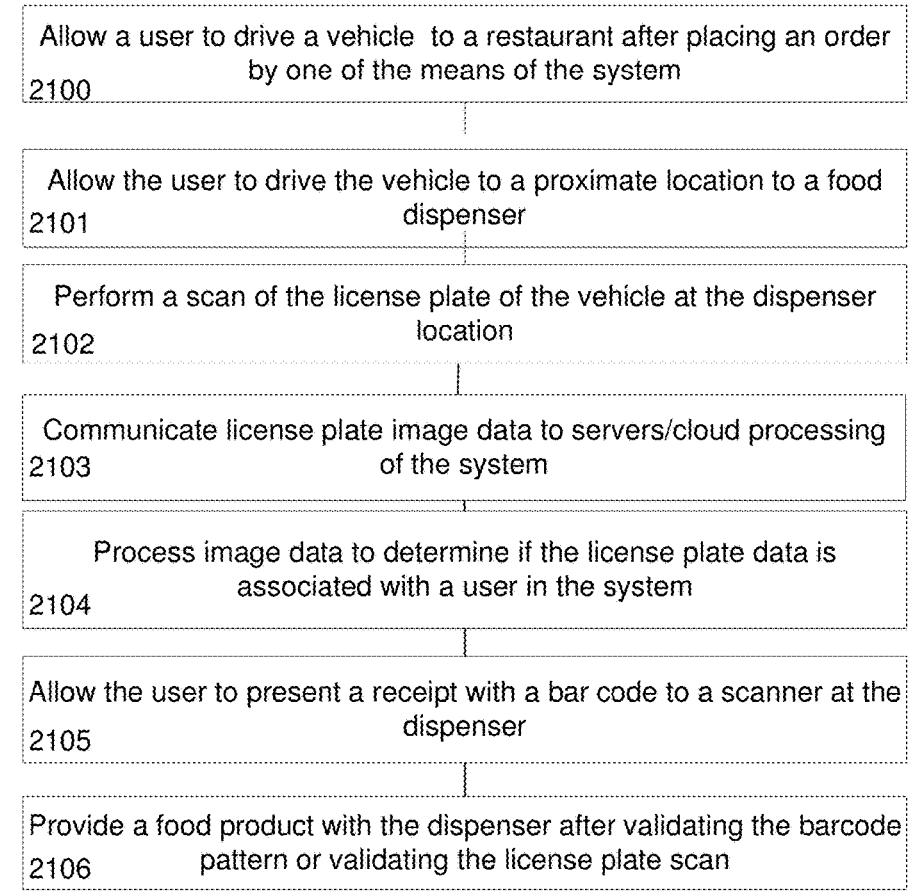
FIG. 21 illustrates operational flows for license plate scanning and dispensing apparatus without mobile application processing.

The methods, apparatus, and application software as have been described may be used in some examples to enable ordering and dispensing flows that do not involve mobile application processing. Referring to FIG. 21, the system may allow the user to drive a vehicle to a restaurant after placing an order 2100 by one of the means identified in various sections of this specification. At step 2101, the system may allow the user to drive the vehicle to a location that is close to a food dispensing device. At step 2102, the system may use a license plate scanner to scan the license plate of the user at the dispenser location. At step 2103, the system may communicate the license plate image data to servers or cloud processing devices of the system. Alternatively, the license plate scanner may interpret the image and provide a textual license plate indicator. At step 2104, if the scanner has not provided the textual license plate information, data processing systems may process the image data to determine if the license plate data is associated with a user in the system. Additional identification methods, such as geofencing and the like, may be used to supplement license plate scanning. At step 2105, the system may allow the user to present a receipt with a barcode to a scanner at the dispenser. At step 2106, the system may provide the food product to the user with the dispenser after validating the barcode pattern or user upon license plate scan. Variations of this specific example are well within the intent of the present disclosure.

Generation of One Time Identifiers for Shared Orders

The methods, apparatus, and application software as have been described may be used in some examples to enable ordering and dispensing flows for groups of users. Referring to FIG. 21A, at step 2110 the system may display menu options for a restaurant with an application on a mobile device to a user on the mobile application. At step 2111, the system may allow a first user to initiate a group ordering process on a mobile device. The group ordering process may be found as a touch screen accessible function on the application or may be invoked in other manners from the application. Continuing at step 2112, the system may collect a number of group users and identification of users from the first user. The first user may invite members of the group by sending an invitation from within the application to contact information from the mobile application device. In other examples, the first user may search for members of the system application and choose these individuals for communication by the system to invite them to join a group order. In some examples, the first user may communicate a group order session identification that interested user may enter into versions of their mobile application of the system to elect to join a group ordering session. At step 2113 the system may repeat an ordering process with each group user that has been joined to the group ordering. The repeated process may comprise the steps of inviting the user to present an order. The system may present menu options, may collect user selections if made, and may confirm selections with each user. As the process continues, some users may elect to offer to pay for themselves and one or more other users and for the other users, the system may inform other users if others have offered to pay. During the course of the group ordering process, at step 2114 the system may communicate the status of each group user's order to the first user. In some examples a screen may include a list of the user names along with a status as a non-limiting example. Depending on the amount of time the first user may wish the group ordering process to complete in, the first user may allow the group order process to complete regardless of the amount of time that it takes, or the first user may elect to impose a completion status on the order regardless of whether each user has completed an order in the group process at step 2115. Continuing at step 2116, the system may process the group order details, the payment information of each of the group users, the customer information for each user including whether they are a registered user of the system, merchant information related to the restaurant where the purchase will occur, and menu identification information for what has been ordered. The result of the system processing the information may be the generation of an order and a unique barcode identifier for the first user to use for operation purposes of the system. At step 2117, the system may communicate the unique barcode information to a mobile device of the first user. The user may elect to send the group order to a designated pick-up location, which may be selected before the user sends an order invite or may elect to arrive at any location to scan the unique barcode, which will process the order onsite. Variations of this specific example are well within the intent of the present disclosure.

Example of Layout of Physical Elements

Figure 22:
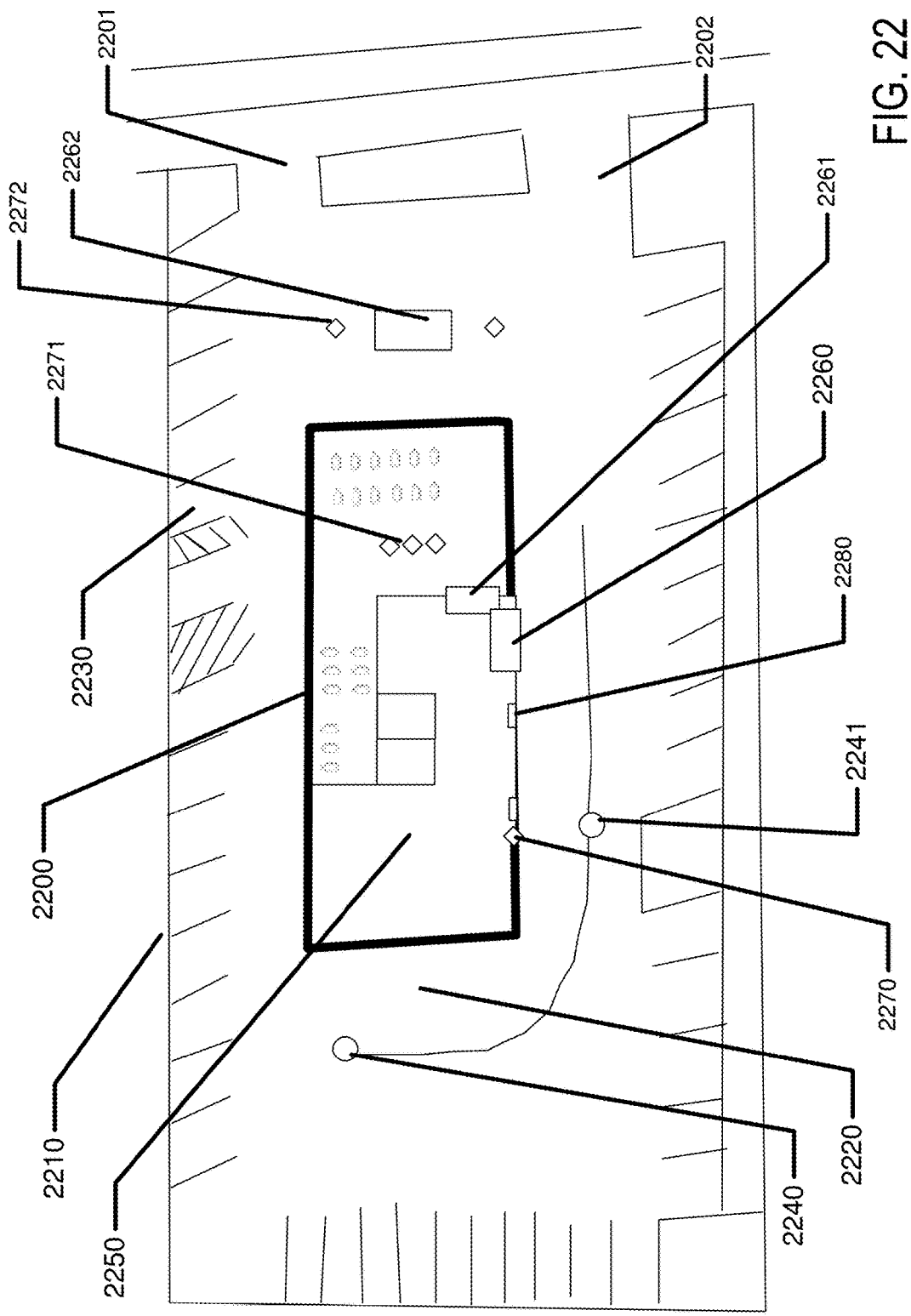
FIG. 22 illustrates a schematic map view of a fast food restaurant with elements of the present invention incorporated.

Referring to FIG. 22, an example map-view illustration of the order may be found. A fast food restaurant 2200 may be located on a drive in facilitated lot 2210. The lot may have an entrance for cars 2201 and an exit 2202. Therefore, flow of the cars may generally be from right to left on the top and from left to right on the bottom of the illustration. There may be numerous parking spots along the perimeter of the lot including handicap parking 2230. The lot may have a drive-thru lane 2220. In some examples, the drive-thru lane may have a license plate scanner 2240 at the entrance of the drive-thru lane and another license plate scanner 2241 proximate to the end of the drive-thru and where food may be picked up. The restaurant may have various kiosks including some kiosks 2270 along the drive-thru lane, some within the lobby of the restaurant such as kiosks 2271 and others at external remote locations 2272. Delivery window 2280 may deliver food or help users in typical fashion, outside of dispenser flow. There may be food dispensing apparatus including a food dispenser within the restaurant 2261 which abuts the lobby and the kitchen area 2250. Another food dispenser 2260 may provide access to cars in the drive-thru lane and abut the kitchen area 2250. An external dispenser 2262 may provide access remote from the restaurant and be filled by staff walking from the kitchen, or other delivery methods. There may be numerous layouts that are possible with some or all of the physical elements as have been shown in FIG. 22 and/or describe in this specification. Other technology not mentioned may be incorporated to fulfill some of the functions as described or additional function. The illustration in FIG. 22 may illustrate how various elements may be spatially related.

Remote Location Dispensing.

The methods, apparatus, and application software as have been described may be used in some examples to enable ordering and dispensing flows for groups of users. Referring to FIG. 23, at step 2300 the system may optionally commence an ordering process with a facial or license plate scan to determine the identity of a user. Combinations of scanning methods, or the use of geofencing and the like, may supplement identification from scan. Such a scan may occur at a kiosk, or at a computer or mobile device comprising a camera. At step 2301, the system may allow a user to place an order on a mobile device or other device capable of running the operation. The system may also allow the user to request the order to be delivered to a remote location dispenser. Alternatively, the user may place an order at a kiosk, with barcode receipt printing capability, adjacent to the dispenser. At step 2302, the system may communicate the order, identification, and other data to servers and/or cloud processing. The system may use the information to determine an appropriate restaurant to notify about the order as well as the nature of the request for the restaurant to deliver the order to a remote dispenser. Continuing at step 2303, the system may receive an approval by the restaurant to accept the order and to accept the delivery to a remote dispensing device. The system may then operate with the kitchen of the restaurant to initiate processing of the order and to create the control signals to create a label with a printer in the kitchen operation. At step 2304, staff of the restaurant may prepare the order and affix the label to a tray, cup, or other packaging related to the order. At step 2305, the operations of the system may deliver the order into the remote dispenser along with an optional scan of the identification barcode on the food product. At step 2306, the system may communicate process status of the order to the customer along with a unique barcode for the user to use for order pick-up. At step 2307, the system may initiate a communication process at the remote dispenser where the customer presents their receipt or mobile device which is displaying the barcode to a scanner at the dispenser. At step 2308, the system may validate a presented barcode and move the dispenser position to open the pod containing the order to the customer for them to pick it up. Variations of this specific example are well within the intent of the present disclosure.

Remote Location Dispensing and Drone Replenishment.

The methods, apparatus, and application software as have been described may be used in some examples to enable ordering and dispensing flows for groups of users. Referring to FIG. 24, at step 2400, the system may allow a user to place an order on a mobile device or other device capable of running the operation. The system may also allow the user to request the order to be delivered to a remote location dispenser. Alternatively, the user may place an order at a kiosk, with barcode receipt printing capability, adjacent to the dispenser. At step 2401, the system may communicate the order, identification, and other data to servers and/or cloud processing. The system may use the information to determine an appropriate restaurant to notify about the order as well as the nature of the request for the restaurant to deliver the order to a remote dispenser. Continuing at step 2402, the system may receive an approval by the restaurant to accept the order and to accept the delivery to a remote dispensing device. The system may then operate with the kitchen of the restaurant to initiate processing of the order and to create the control signals to create a label with a printer in the kitchen operation. At step 2403, staff of the restaurant may prepare the order and affix the label to a tray, cup, or other packaging related to the order. At step 2404, the system may dispatch a drone to the restaurant. In some example, the dispatch may occur well before the preparation of the food is completed. The drone may carry a transportable pod that may contain the order and keep it at a regulated temperature or temperatures. The restaurant staff may affix a portable pod containing the order to the drone. At step 2405, restaurant staff may dispatch the drone from the restaurant. The system may coordinate the flight of the drone to go to the remote dispenser. At step 2406, the system may engage a transfer process to load the transportable pod into the remote dispenser. In some examples, the drone will pick-up an empty transportable pod from the dispenser and travel back to a base location with it. At step 2407, the system may communicate process status of the order to the customer along with a unique barcode for the user to use for order pick-up. At step 2408, the system may initiate a communication process at the remote dispenser where the customer presents their receipt or mobile device which is displaying the barcode to a scanner at the dispenser. At step 2409, the system may validate a presented barcode and move the dispenser position to open the pod containing the order to the customer for them to pick it up. Variations of this specific example are well within the intent of the present disclosure.

Ordering with the Application

Figure 25B:
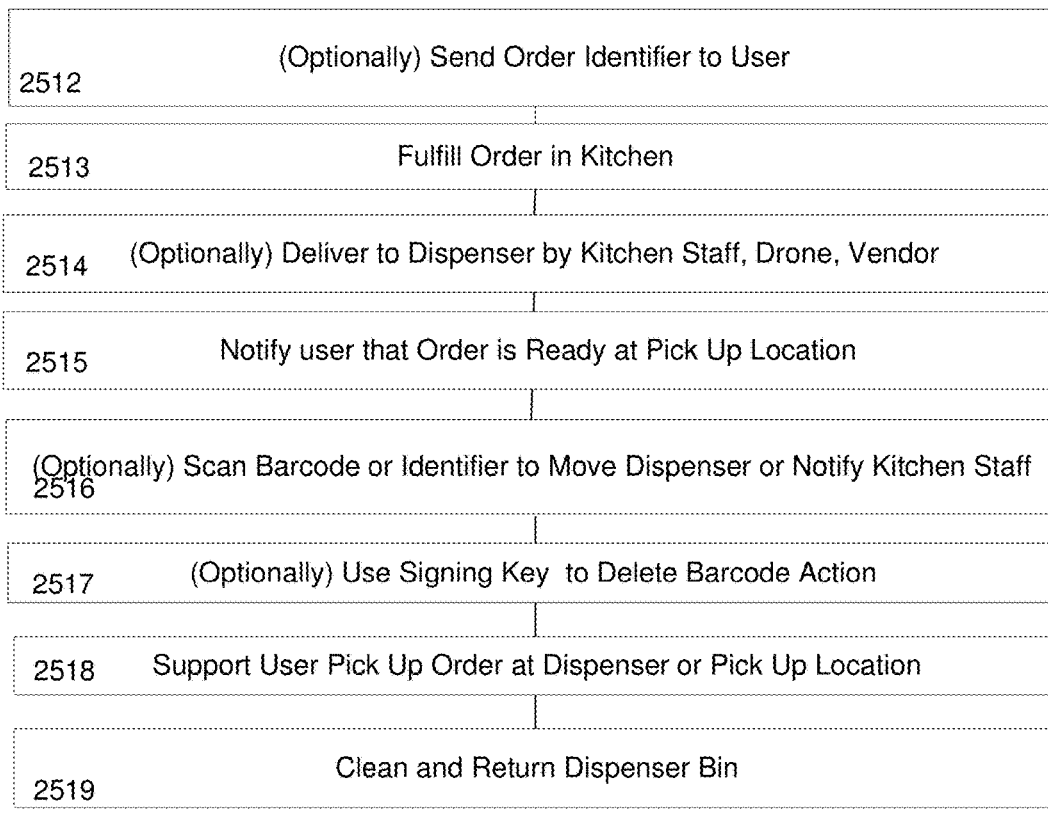

The methods, apparatus, and application software as have been described may be used in some examples to enable ordering and dispensing flows for groups of users. Referring to FIG. 25A, at step 2500, the system may facilitate user selection of a store or a dispenser to receive an order in the application. There may be various methods to communication such as through scans, on voice command, through app, and the like. At step 2501, the system may optionally facilitate the user to send an order request to other users and combine request. At step 2502, the system may facilitate the user to select their order and to configure or confirm payment options. At step 2503, the system may ready a queue for the order. At step 2504, the various processes may be coordinated by the system. At step 2505, the system may generate a unique barcode. At 2506, the system may await the arrival of the user to the store or to the dispenser. At step 2507, the system may utilize a license plate scanner or a facial scanner to recognize the user. In some examples, at step 2508 the user may be facilitated to place an order through a scan at a kiosk. In some examples, at step 2509 a process such as a signing key process may be used to delete the barcode or render the barcode useless. At step 2510, the system may offer means to pay contingent on whether payment has already been made with the application. At step 2511, the system may coordinate processes of the kitchen to realize the order. Referring now to FIG. 25B, at step 2512, the system may optionally send an order identifier to the user which may in some examples, involve a unique barcode. At step 2513, the order may be processed in the kitchen. At step 2514, the system may optionally coordinate deliver of the order to a dispenser by kitchen staff. At step 2515, the system may notify the user that their order is ready for pick-up. At step 2516, the system may optionally scan a barcode or other identifier to move a dispenser location for pick-up. At step 2517, the system may optionally delete the activity of the barcode or render it useless. At step 2518, the system may support the user to pick-up their order either at a dispenser or a pick-up location. At step 2519, in examples where a dispenser has been used the system may clean a used dispenser and return it into operation. Variations of this specific example are well within the intent of the present disclosure.

Ordering without the Application

Figure 26A:
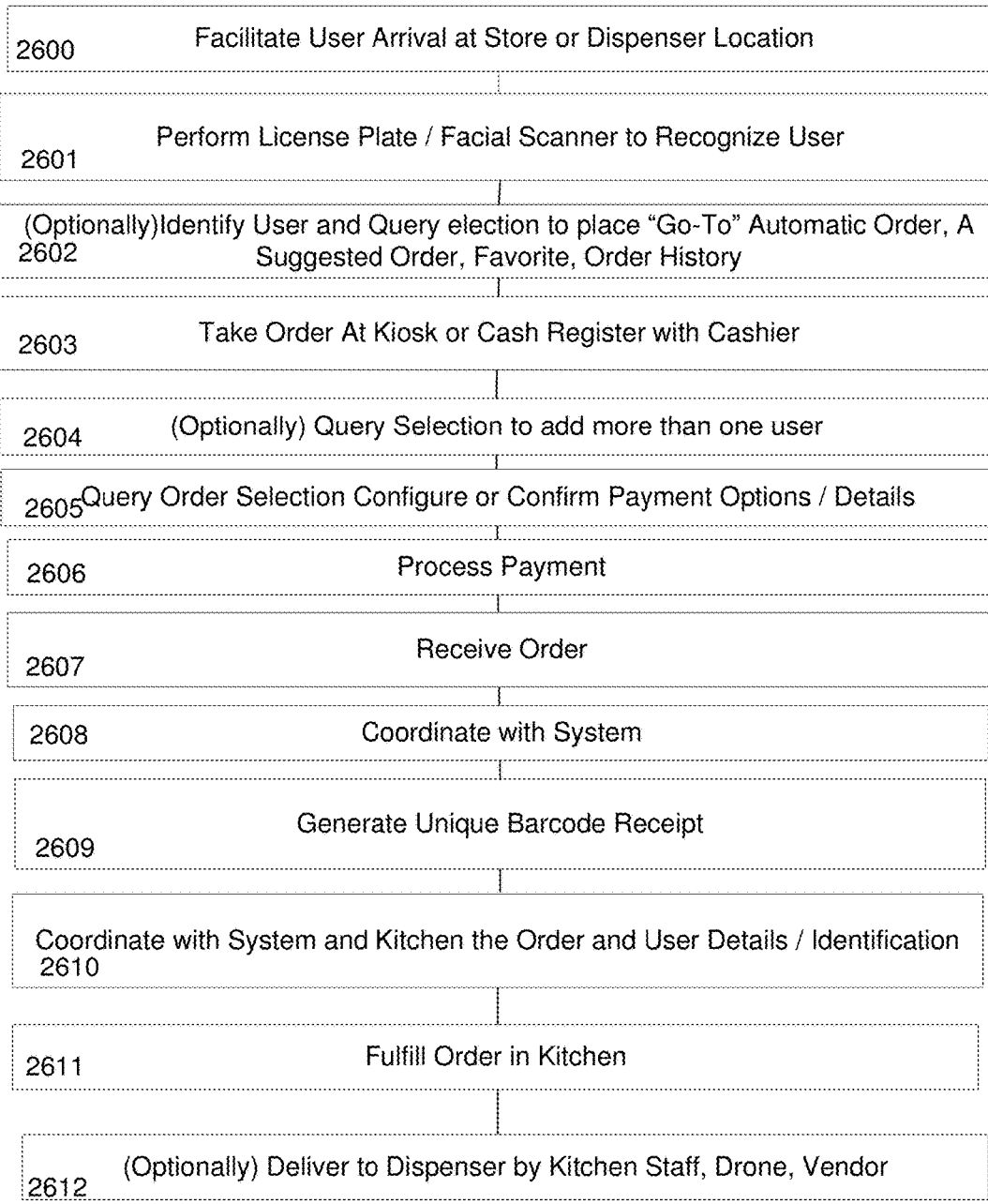
FIGS. 26A-B illustrate operational flows for ordering without the application.
Figure 26B:
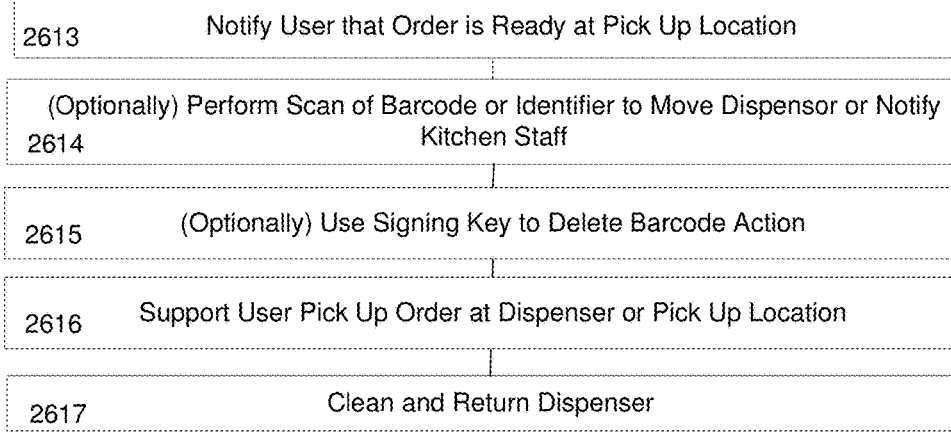

The methods, apparatus, and application software as have been described may be used in some examples to enable ordering and dispensing flows. Referring to FIG. 26A, at step 2600, the system may facilitate a user to arrive at a store or a dispenser location where they may place an order to the system without the use of a mobile device and its application. At step 2601, the system may perform a license plate or facial scan to recognize the user. At step 2602, on recognition of the user, various system functions may optionally be used such as automatic ordering, favorite suggestions, order suggestion, order history and the like. At step 2603, the system may take an order at a kiosk or cash register. At step 2604, the system may optionally ask the user whether they want to invoke a group process as has been defined. At step 2605, the system may confirm the details of the order and payment options. At 2606, the system may be used to process payment. At step 2607, the system may finalize a fully paid order. In some examples, at step 2608 the system may coordinate the user details, the order, and the payment details. At step 2609, the system may generate a unique barcode and provide a copy of it to the user in the form of a receipt. At step 2610, the system may coordinate the details of the order with the kitchen. At step 2611, order may be fulfilled in the kitchen. At step 2612, the system may optionally deliver the order via a third-party vendor or deliverer. As has been discussed there may be various means to deliver to a dispenser including by staff of the kitchen, through a drone, or through a vendor an order identifier to the user which may in some examples, involve a unique barcode. Referring now to FIG. 26B, at step 2613, the system may be used to notify the user that an order is ready at a pick-up location. At step 2614, the system may optionally scan a barcode or other identifier to move a dispenser location for pick-up. At step 2615, the system may optionally delete the activity of the barcode. At step 2616, the system may support the user to pick-up their order either at a dispenser or a pick-up location. At step 2617, in examples where a dispenser has been used the system may clean a used dispenser and return it into operation. Variations of this specific example are well within the intent of the present disclosure.

Frequency of facial, license plate, or barcode scan at a kiosk or dispenser may be analyzed and provide restaurant activity statistics, order statistics, wait status, or a plurality of other pertinent user or order statistics valuable to a restaurant or user, which may be communicated via the application.

Remote Ordering

The methods, apparatus, and application software as have been described may be used in some examples to enable remote ordering and dispensing flows. Referring to FIG. 27A, at step 2700, the system may receive a request from a user to select a store or a dispenser location to receive an order in the application. There may be various methods to communication such as through scans, on voice command, through app, and the like. At step 2701, the system may optionally facilitate the user to send an order request to other users and combine request. At step 2702, the system may facilitate the user to select their order and to configure or confirm payment options. At step 2703, the system may ready a queue for the order. At step 2704, the various processes may be coordinated by the system. At step 2705, the system may receive an order and subsequently process payment. At step 2706, the system may generate a unique barcode. At 2707, the system may coordinate with the kitchen for the order and dispensing selections. At step 2708 the order may be fulfilled in the kitchen. At step 2709, the system may optionally deliver the order to a dispenser by the various means as have been discussed. At step 2710, the system may notify the user that the order is ready for pick-up at the designated location. At step 2711, the system may facilitate the user's arrival at the store or dispenser location as selected and coordinate the pick-up of the order. Referring now to FIG. 27B, at step 2712, the system may optionally recognize the user who placed the remote order. In some examples, the recognition may occur with scanning of the user's license plate or with a facial scan of the user. The resulting recognition may cause a dispenser to move a food order into location for pick-up. At step 2713, there may be an optional scan made of a barcode on a receipt or a mobile device of the user in order to cause the dispenser to move to a location for pick-up. At step 2714, the system may optionally delete the barcode. At step 2715, the system may support user pick-up of the order at the dispenser or as appropriate at a conventional pick-up location. And, at step 2716, the system may clean the dispenser and return it to use. In some examples, the cleaning may be performed in a dispenser itself. Variations of this specific example are well within the intent of the present disclosure.

Automatic Ordering

Figure 28A:
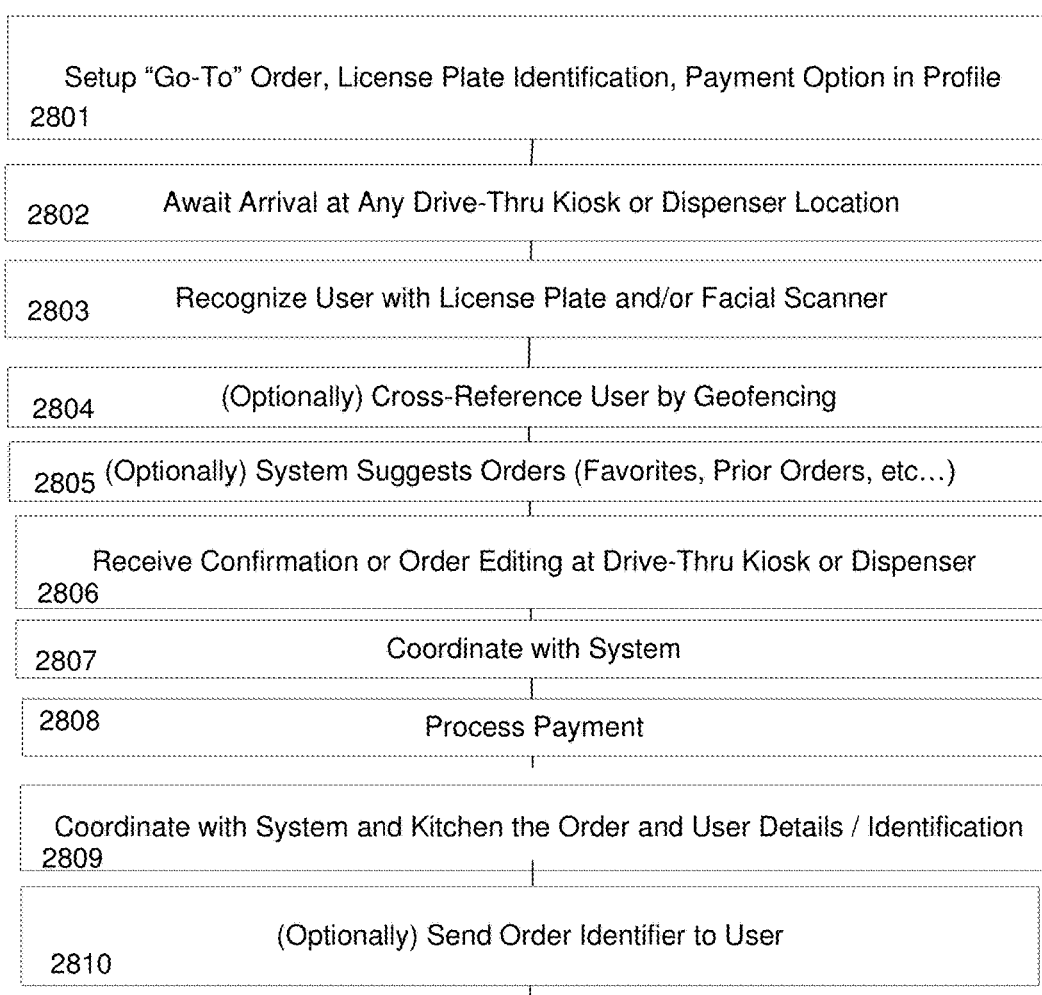
FIGS. 28A-B illustrate operational flows for automatic ordering.
Figure 28B:

The methods, apparatus, and application software as have been described may be used in some examples to enable automatic ordering and dispensing flows. Referring to FIG. 28A, at step 2801, the system may enable a user to set up various profiles associated with the identification such as "go-to" orders, license plate identification, biometric data, payment options and the like. At step 2802, the system may await arrival at any drive-thru kiosk or dispenser. At step 2803, the system may recognize the user with a facial scan, license plate scan, or combination of both, to ready a queue for the order. At step 2804, the system may optionally cross-reference the user by geofencing and the like. At step 2805, the system may optionally suggest orders to the user such as favorites, prior orders and the like. At step 2806, the system may receive confirmation of an existing order or accept edits to the order at a drive-thru kiosk or at a dispenser. At step 2807, the system control coordination of the various elements related to ordering so that at step 2808 payment may be realized. At step 2809 the system may coordinate the order details with the kitchen. At step 2810, the system may optionally send an order identifier to the user, such as a dispenser code. In some examples, the order identifier may include a barcode image to a mobile device. Referring now to FIG. 28B, at step 2811, the system may coordinate processes of the kitchen to realize the order. At step 2812, the system may optionally coordinate deliver of the order to a dispenser by kitchen staff. At step 2813, the system may notify the user that their order is ready for pick-up. At step 2814, the system may perform a license plate scan or a facial scan at a pick-up location and coordinate the status for pick-up. At step 2815, the system may optionally cross reference the identity of the user using geofencing and the like. At step 2816, the system may support a user to pick-up an order at a dispenser or a pick-up location. In some examples, the support may include scanning a barcode or other identifier of a completed order to move a dispenser location for pick-up. At step 2817, in examples where a dispenser has been used the system may clean a used dispenser and return it into operation. Variations of this specific example are well within the intent of the present disclosure.

Order Preparation

Employee Terminal to Operate Dispenser, Manage Order Flow

Figure 29A:
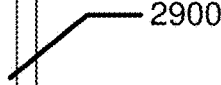
FIGS. 29A-C illustrate aspects of an employee terminal.
Figure 29B:
Figure 29C:
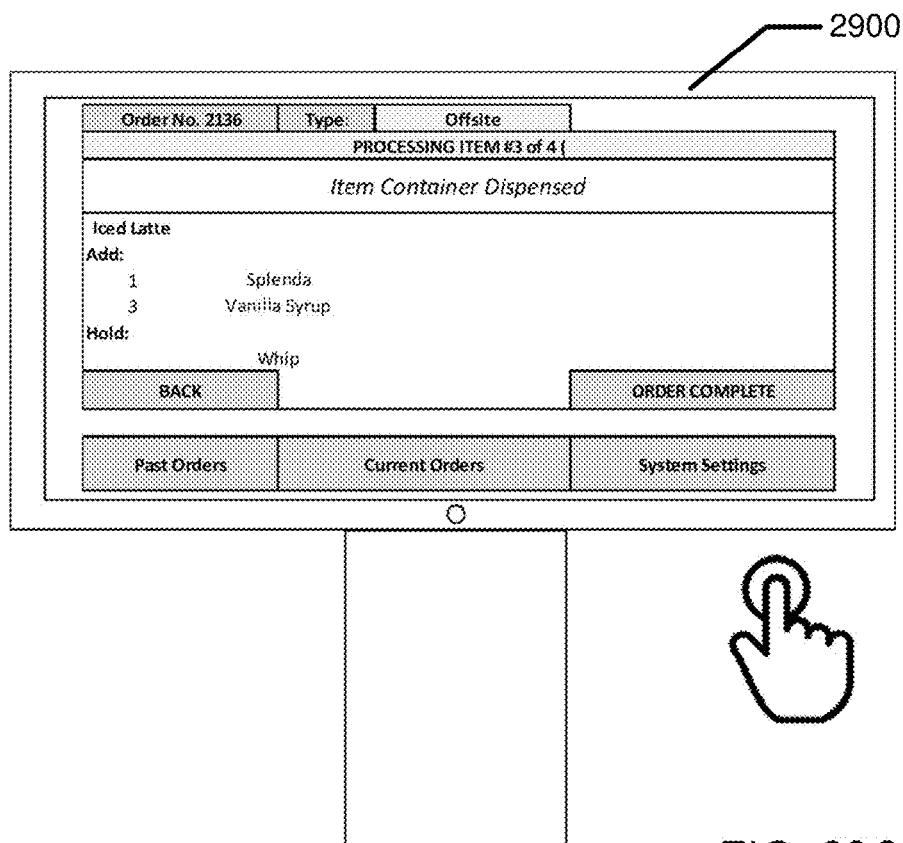

Referring to FIGS. 29A, 29B and 29C, an employee terminal 2900 may be used to sort through customer orders and operate an automated dispenser or other food delivery devices. In some examples, this terminal may be used inside the kitchen or at a remote dispenser location by a remote operator. The terminal may display order information to an employee such as, but not limited to, order price, order size, estimated order preparation or fulfillment time, estimated order delivery time, estimated time of user arrival, single or combined order, or distinguishing location of an order such as remote (offsite or preorder), onsite (takeout or dine-in), or delivery order. Orders may populate on a screen containing the aforementioned details. The employee may connect to a centralized or decentralized server database to recall said information. Orders may be sent to and compiled within said database based on remote preorder, remote third-party preorder such as an Uber Eats order, onsite order at counter, onsite order by scan, onsite order upon automatic user identification, remote scan order, order by GPS identification or geofencing user, and the like.

At an exemplary step in FIG. 29A, the employee may then select which order to prepare. The system's algorithms may offer a suggested list of user orders to complete first based on weighing the aforementioned order details to prioritize total estimated completion time, which may maximize orders fulfilled within a certain or given time period. The order selection and bin dispensing process may also be done autonomously and a status may be display such as the example of FIG. 29C. A bin that has been prepared or filled and is ready to be sent to an associated dispenser for order delivery or user pick up, may be subsequently submitted via the terminal by the employee or may be autonomously sent once the system has recognized all orders have been fulfilled and placed in the appropriate bin. A subsequent order's bin or food item containers may be automatically selected and dispensed to an employee for loading based on the system's prioritized or projected fulfillment time of said order when compared to existing orders in the order queue.

The employee may recall a dispenser's bin or pod via the terminal such as in the exemplary FIG. 29C. This allows for the employee to rectify an incorrect order, malfunctioning bin, and the like. The employee may also choose to engage a system or bin clean. The employee terminal may also be able to send or recall a delivery drone, possibly to or from a remote/offsite dispenser. A drone may be autonomously sent from or recalled to a drone housing station upon dispenser bin retrieval or delivery. This process may also be manually done so by an employee.

Loading of Dispenser Mechanized Loader, Track for Bins/Pods

Figure 30A:
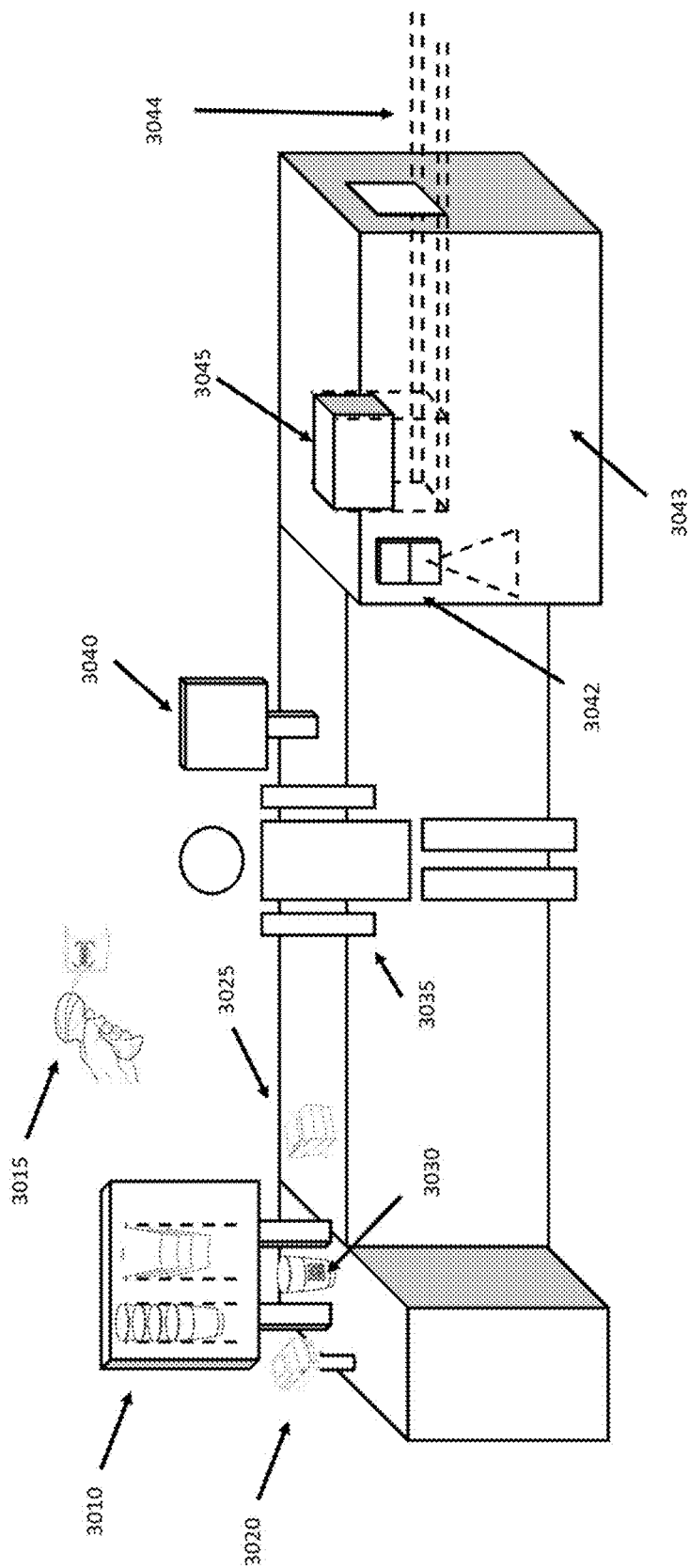
FIGS. 30A-B illustrate aspects of food preparation.

In some examples, as depicted in FIG. 30A, a mechanized arm or track loader 3044 may exist, which guides a dispenser bin 3045 or pod to or from a dispenser onsite or remote to a food preparation facility 3010. In terms of the kitchen used for order fulfillment, a dispenser bin 3045 may be called or recalled out of a dispenser for item placement, order matching, order correction, cleaning, replacement, maintenance, and the like. A bin, once paired with an order, may be sent back to the dispenser for customer pickup or order delivery. A bin may be sent to a remote or preorder pickup dispenser onsite or sent to an offsite dispenser via delivery drone, autonomous vehicle, or human transferal for remote (offsite) order delivery. The delivery track 3044 may be exposed or contained within a shell. The delivery track may extend at varying lengths to or from a combination or single instance of dispenser location, order preparation site, employee location, employee terminal location, order counter, and the like. A six-axis robotic arm, pick and place mechanism, or other automated function may be utilized to place prepared food items within a bin before being stored within a dispenser. In some examples, a handheld laser scanner 3015 may be used to scan bar codes or other identification information on food item containers to call a matching dispenser bin for food item placement and pair said food item to a user's order for subsequent user order pickup identification.

This loading system may lead to and from a bin or pod housing unit 3043, which may store empty bins for use of food preparation, fulfilment, order matching, dispenser matching, maintenance, cleaning, and delivery to an onsite or offsite dispenser. A bin/pod housing station may exist internal or external to a food preparation facility, which may contain a multitude of dispensers or several dispenser bins or pods. From said bin housing station, a bin may be sent to an onsite or remote (offsite) dispenser, or to a drone delivery and receiving station. An order preparation station 3020 may be where bins or pods are deployed to or sent from for quick interaction with employee order fulfillment. Multiple order preparation stations may exist. A preparation station may adjoin with employee terminals 3040. An employee 3035 may also manually pair and place dispenser bins or pods within a dispenser, loading track, or into a loader device adjacent to the dispenser or preparation station after the order is fulfilled. Each bin or pod may be automatically assigned to or paired with different dispensers based on order type. For instance, a preorder may be sent to a standalone dispenser located onsite of a food preparation facility's parking lot designated specifically for preorder pickups. A bin may also be assigned or paired with a dispenser based on an initial food item scan at the order preparation station. Scanning equipment 3042 may be used to track dispenser bins 3045 during the flow or queue and match a dispenser bin to a food item by scanning said food item. An initial food item selection at the order preparation station may also commence an order fulfillment process, such as automatically ejecting and filling a drink cup 3030 and the subsequent labeling 3025 of said drink cup to be used in a scanning process to identify, track, match, and automatically place the drink cup, or similar order, to a called bin stored for later customer pickup.

Bin Preparation and Loading Station

Figure 30B:
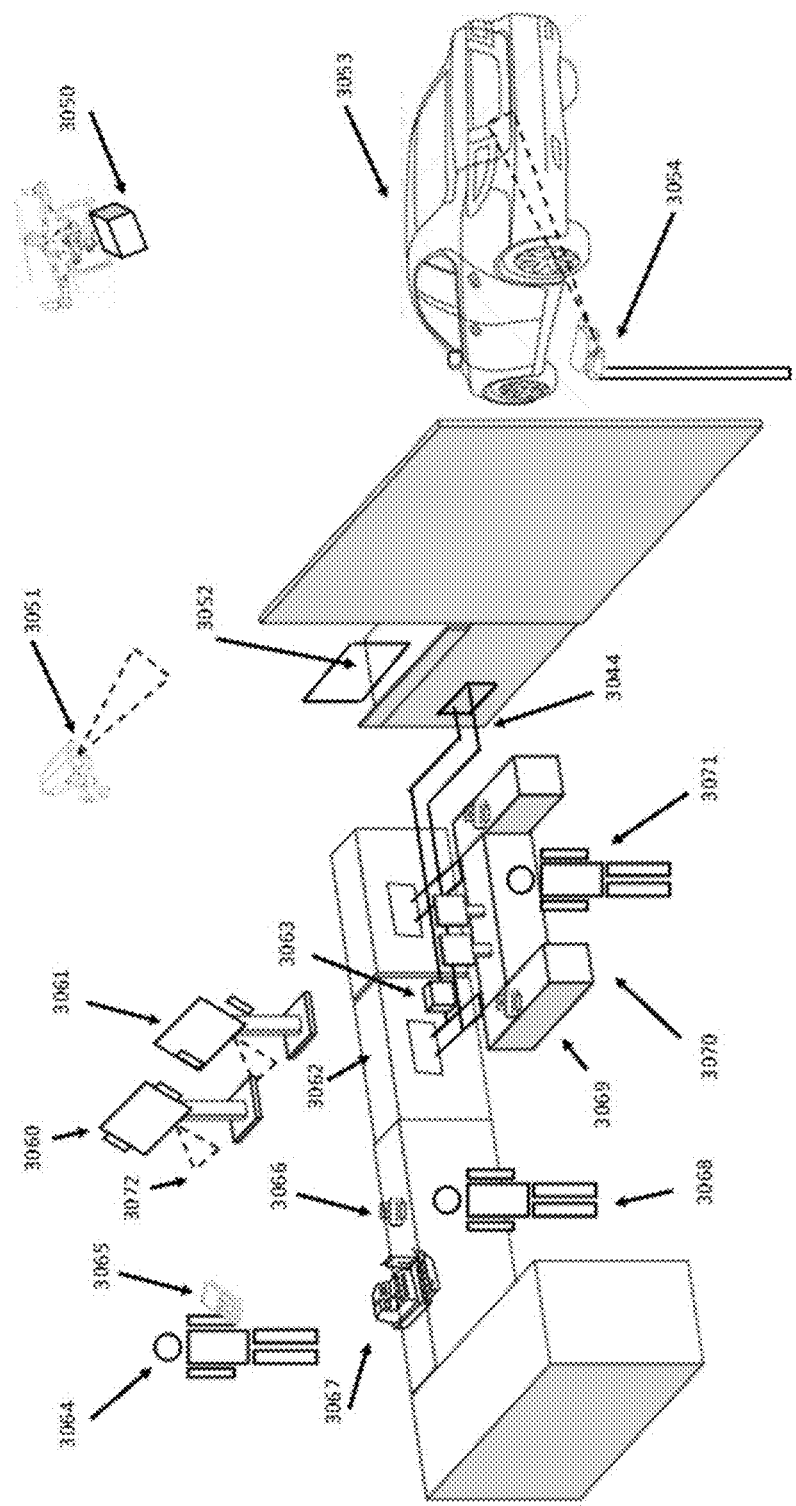

Referring now to FIG. 30B, a bin preparation station may exist that one or several employees 3068, 3071 may use in a food preparation facility's kitchen or remote of a food preparation facility 3067. Once a customer's order 3072, chosen by a customer 3064, with an exemplary ordering application 3065 is received, for example, from interaction at a kiosk 3060,3061, several order preparation and fulfillment options may exist. A preparation station 3067 or a multitude of preparation stations may scan, mark, print 3066, or stamp a unique identifier on a food item container such as a cup 3030, fry holder, burger holder, and the like. Said food item container may match, associate, or pair said customer's order with the food item container's unique identifier. Food item container's may be scanned, marked, printed 3066, or stamped with said unique identifier among different locations of the order fulfillment process.

The food item container's may be passed, manually or autonomously, to an employee 3071 loading a bin 3063 and subsequently matched to one or combination of said bin, dispenser 3062, pickup point, customer, and the like. Food item containers may also be filled, processed, marked, stamped, scanned, matched, or placed within a bin at separate order preparation stations and subsequently sent to the next necessary order preparation station until the order fulfillment process was complete and the bin ready to be sent to a pickup, delivery, or dispenser location. A bin 3063 may be summoned by a multitude of methods such as an item being scanned by an employee, or by a request to start order from an employee terminal, and the like and may be transported from location to location by tracks 3044, conveyor belts, six-axis robotic arms, pick and place functions, other automated devices, and/or drones 3050 or other autonomous deliver devices.

A centralized fulfillment or loading station 3069, 3070 may exist where individual order items are processed, scanned or, placed in bins at the station. Order fulfillment status may be displayed at an employee terminal where said employee is identified with whether the order status is complete and ready to be sent to corresponding delivery, pickup, or dispenser location. Said order fulfillment status may be determined by one of many methods such as tracking individual food item container's scanned, approximate order weight, sequencing of food items automatically ejected at different preparation stations, visual reference by an employee, and the like.

As mentioned, individual bins may be summoned or requested to start the order preparation and fulfillment process. Additional methods may include but are not limited to a centralized loading or fulfillment station, an assembly line fashion of loading a bin as items are prepared at multiple fulfillment locations, a preparation, loading, and fulfillment station attached to a specific dispenser or delivery location that corresponds to a specific order, and the like. Several employee terminals may exist that correspond only to certain dispensers. For example, an employee terminal may only correspond and handle a combination of remote and drive-through orders whilst another terminal may only handle pre-order, carryout, and onsite orders. In some examples, a customer 3053 may receive an order at an external dispenser 3052 where authentication of the customer identity may be performed by various means such as license plate scanning 3054 in a non-limiting example. A camera 3051 may identify an appropriate position to automatically move or level a bin toward a user inside of a vehicle at a drive-thru dispenser pickup so that said user may easily remove their prepared order.

Single Loading and Exit Points for Dispenser.

A single entrance and exit point may exist on various locations of the dispenser. These points may or may not be mutually exclusive based on function. For instance, a dispenser may contain one point for employee interactions with dispenser bin or pods such as loading, retrieving, and the like, and single, separate point for customer, third-party deliverer, drone, or autonomous vehicle interactions. The same dispenser may also include single or multiple points for employee interaction and separate single or multiple points for customer, third-party deliverer, drone, or autonomous vehicle interactions. In addition, a dispenser may contain one or multiple points for both employee and customer, third-party deliverer, drone, or autonomous vehicle interactions.

Remote Designated Pick Up Lane with Dispenser or Pick Up Box.

Figure 31:
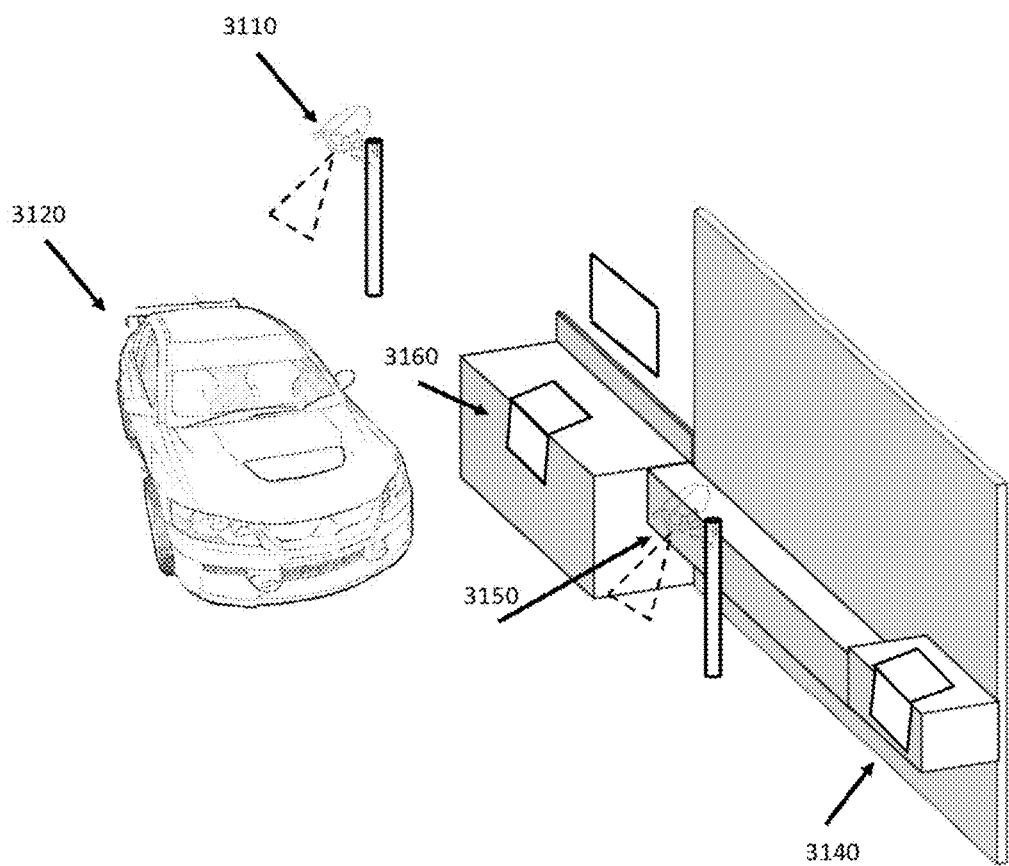
FIG. 31 illustrates aspects of an exemplary remote pre-order pickup station.

Referring to FIG. 31, a dispenser 3160 located at a drive-through of a food preparation facility, onsite of a food preparation facility, or remote (offsite) of a food preparation facility may include an auto-leveling arm, pick and place arm, extender, swivel, track, bin container, and the like at the exit or customer 3120, deliverer, autonomous vehicle, or drone interaction point. Upon customer, deliverer, autonomous vehicle, or drone arriving at a dispenser or drive-through dispenser, a facial recognition system, tracking system, camera identification system 3110, license plate scanner system 3150, laser scanning system, or other recognition, identification, measuring, or approximation system may move or adjust the leveler or control device of an arm or container, which holds the dispenser bin or pod containing the customer, deliverer, autonomous vehicle, or drone order. For example, a system may detect a window, window frame, door frame, track system, bin acceptor/receptor, depository, facial features, and the like or of a customer vehicle, delivery drone, deliverer, or autonomous vehicle. Said systems may tilt the bin in the direction of the pickup in order to allow easier and more accessible pickup to occur. A designated pick up lane or station may exist that may exclusively contain the remote or mobile order pickup dispenser, box, or station for customer use. In some examples, a bin or pod that is sent to the remote/mobile order pick up station, box, or dispenser, may be conveyed on a mechanized track, slider, pick and place arm, and the like, which may be adjacent to, above, or below a food preparation facility. A human, delivery drone, autonomous vehicle, or other means of delivery may be used to fill or remove items from the designated remote preorder pick up dispenser or box. An employee terminal inside the kitchen may activate the remote box, station, or dispenser, by recalling an order, receiving a bin or pod for order fulfillment, sending the bin or pod containing the prepared order, and the like.

Upon first order delivery or customer, drone, deliver, or autonomous vehicle exit, the auto-leveling arm, pick and place arm, extender, swivel, track, bin container, and the like may readjust to its prior set placement to receive a new bin for next order delivery for current or subsequent customer, deliverer, autonomous vehicle, drone, and the like. If a large order exists, multiple bins may be paired with and used to dispense said order to corresponding customer, customer vehicle, delivery drone, deliverer, or autonomous vehicle. In some examples, multiple delivery points, such as a second delivery point 3140 may be used. Said second delivery point 3140 may serve as a designated dispenser for remote or preorder pickups so pickup may occur outside of a typical onsite order flow. Delivery point 3140 may also exist adjacent to a second drive-thru lane or within the confines of a food preparation facility such as a parking lot and the like.

Combined Order and Third-Party Delivery

Combined Order Detail

Figure 32:
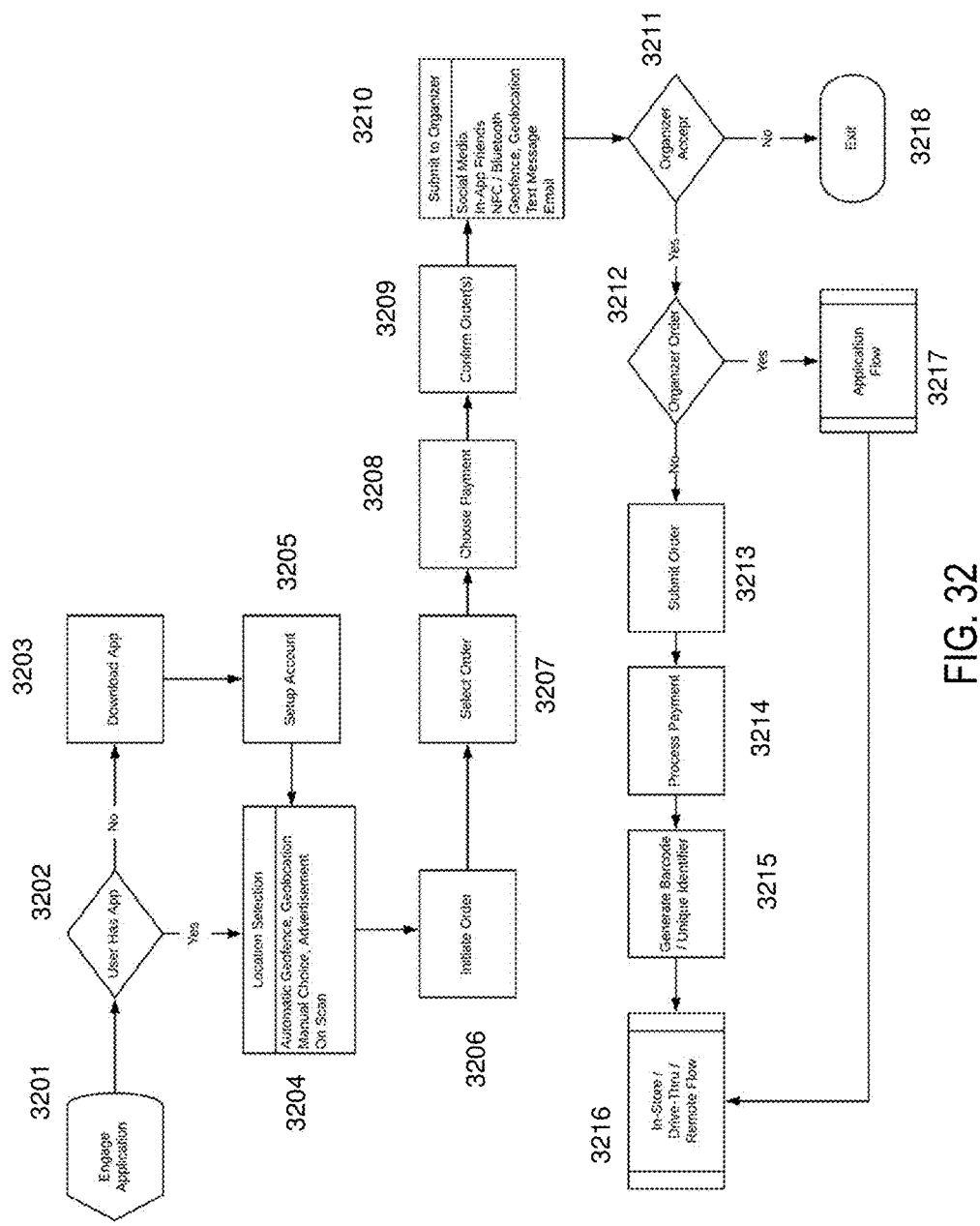
FIG. 32 illustrates aspects of a send order flow.

Many methods may exist to combined order desires from multiple users into a combined order feature. Each method may be used simultaneously, jointly, or exclusively. FIG. 32 illustrates operational flows involving mobile application processing aspects submitted by multiple users with one person as an organizer. The fast a user may engage food-based application when preparing to order food. At step 3201, a user may engage the application. At step 3202, a check that the user has the application on a device that the user is utilizing occurs. If the application is not present on the device, then the application may be downloaded at step 3203, and an account may be set up at step 3205. After account setup, the user may use the application at the same point on the flow when the earlier determination would have found that the application was present. The application may be used to select a location for the user to obtain a food product at step 3204. The user may bypass location selection if order is to be placed by interfacing with the onsite mobile application ordering process, such as scan-to-order, or by automatic user identification upon arrival onsite such as geofence or GPS locating features. At step 3206, the user may initiate the order process. At step 3207, the user may select their order. Proceeding to step 3208, the user may select the manner of payment for the order. The application may default to a user's favorite method of payment and confirm the order(s) at step 3209.

At step 3210 combined orders may either be activated by an organizer or submitted to an organizer. In an example of an alternative, a combined order may be activated by an order first being sent to an organizer from a contact listing, a mobile application's designated friend, a participant, and the like. The method of sending an order to an organizer or starting a combined order by an organizer may be done by geofence, global positioning systems, near field communications, Bluetooth, text, email, social network, in application, and other such communication means. In some examples, encryption features may be applied to the aforementioned methods of communication. At step 3211, the first person who initiated all the ordering, may be considered an organizer or an actual defined organizer receiving an order may accept a combined order process to begin a combined order flow. At step 3218, the operation may exit operation for users when an organizer does not accept the invitation. At step 3212, the organizer may also submit an order and join the combined order pool. Thereafter, the applicant may submit an order at step 3213. At step 3214, the organizer may choose a manner of payment. At step 3215 the application may generate a barcode or other unique identifier for the user or group of users, who sent an order to the organizer, to proceed to step 3216. For either in-store, drive thru or remote related flow of order processing, the organizer order process may continue to step 3217 where the application flow as described may process the order. The process may then be completed with step 3216 for either the in-store, drive thru or remote Flow.

In an exemplary instance, the process may be configured to take order favorites from a user. The user may be another person using the mobile device. In some examples, the application may validate a request or setting in such a way to facilitate that the application allows the taking of a favorite and the designation of who is paying for the order or portion of the group order. In some examples, the user may allow or grant an organizer the ability to always allow other users to place an order on behalf of the user or to place a specific order at any time. The permissions or allowed functions may have constraints. Thus, additional functions may be constrained or limited by one or more restrictions including in a non-limited perspective the time of day, order dollar amount total, item category, nutritional restrictions, allergy restrictions, and the like. In some examples, either the user or the organizer, or both, may be required to grant or verify each instance, or designate who pays in each order process.

Combined Order with Multiple Restaurant Locations or Franchises

Figure 33:
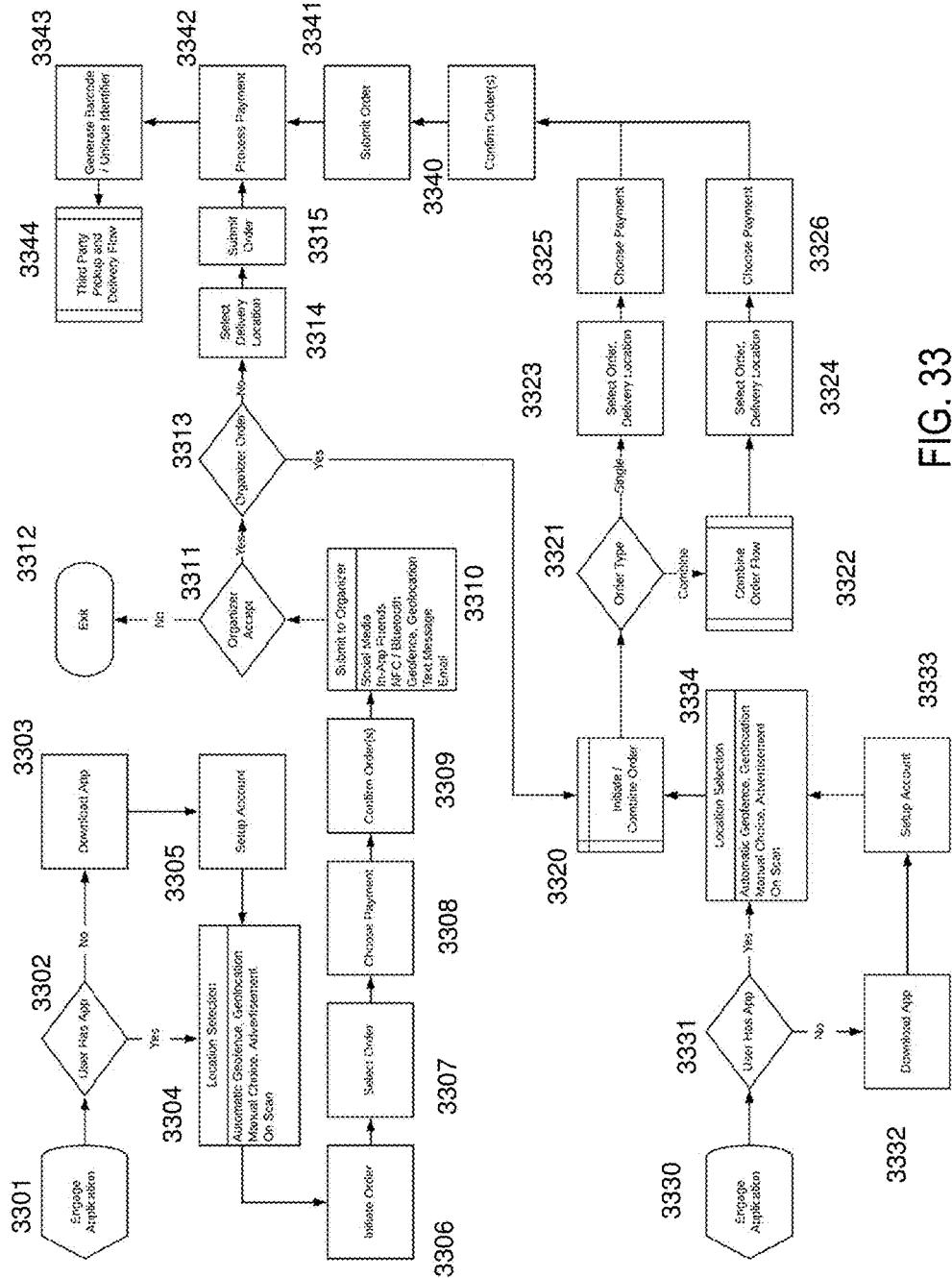
FIG. 33 illustrates aspects of a third-party order flow.

Referring now to FIG. 33, a combined order process flow may begin at step 3301 where a user may engage the application. At step 3302 the process may check that a user has the application on a device that a user is utilizing. If the application is not present on the device, then the application may be downloaded at step 3303 and an account may be set up at step 3305. After account setup, the user may use the application at the same point on the flow when the earlier determination would have found that the application was present. The application may be used to select a location for the user to obtain a food product at step 3304. At step 3306, the user may initiate the order process. At step 3307 the user may interact with the application to select order. Proceeding to step 3308, the user may make a selection of the manner of payment for the order. The application may default to a user's favorite method of payment and confirm the order(s) at an optional step 3309. At step 3310, the application may process a set of orders into a combined order and submit these to the organizer. Such combined orders may either be activated by an organizer or activated by first being sent to an organizer from a contact, mobile application's designated friend, participant, and the like. The method of sending an order to an organizer or starting a combined order by an organizer may be done by geofence, global positioning systems, near field communications, Bluetooth, text, email, social network, in application, and the like. Encryption features may be applied to the aforementioned methods of communication. At step 3311 an organizer may be requested to accept an order from one of the group. In some examples, the first person who initiated all the ordering may be considered an organizer 3313. At step 3312, the order processing may cease, and the process Exit when an organizer does not accept the invitation. At step 3320 a loop may occur to accept orders from multiple user that constitute the group. At the step the group order process may be initiated, and orders may be combined for users who accept the invitation from the Organizer. At step 3314 the delivery location may be selected. At step 3315 the order may be submitted. At step 3342 the payment may be processed. Continuing, at step 3343 the application may generate a barcode or unique identifier for users. A user or users may take the barcode or unique identifier and proceed to step 3344 where one of the group or a third party may initiate a pick-up or delivery flow. Continuing from Step 3320, the application may initiate a combined order step 3321 for each of the users of a group. In the combination order flow the process may identify an order type. In some examples the order type may be "single". For single orders the processing may proceed at step 3323 where the order delivery location may be selected. Next, at step 3325 a user may choose the means for payment. At step 3340, for a single type order, the order may be confirmed by the user. And at step 3341 the user may then submit the order subsequently following steps 3342-3344.

If the order type is determined to be of a combined type, at step 3322 a flow for combining orders from multiple user may be followed. In a loop for multiple users each user executes their own part of an order at step 3324 and also may select their order delivery location. At step 3326, a user may choose the type of payment. And, for this user of the group, the order processing may follow with the previously discussed steps at 3340-3344. The combined orders process may involve new users entering the flow, such as for example at step 3330 where another user may engage the order processing application. At Step 3331, the user may be asked if they have the application on their computing device. If they do not then at step 3332, the user may be facilitated to download the application and at step 3333 to setup an account. If the user had the application the processing may proceed to step 3334 where a selection of location may be made. Thereafter, processing of the order flow may proceed to the order processing steps discussed previously at steps 3320 to 3334 where ultimately at step 3344 a third-party may pick-up an order or receive delivery of an order. In some examples, numerous locations may be the location for pickup of an order such as multiple restaurant locations or franchise locations.

Third Party Delivery from Organizer Order

An organizer may decide to place a delivery order through the use of a third-party delivery service, such as Uber Eats, Grubhub, and the like. In this case, an organizer opens up a mobile application and begins to enter in order details, delivery location, and payment information. In the aforementioned example, an organizer may either receive or send a request via wireless communication to initiate a combined order method. Wireless communication may consist of text message, email, near field communication, Bluetooth, biometric identification, and the like. Said forms of communication may be encrypted to protect user information. A single, encrypted, unique identifier may represent the combined order when the combined order is placed.

The order may contain several food preparation facility selections. In this case, a centralized remote or offsite dispenser may host the several orders when picked up by a third-party delivery service. Multiple user may select several restaurants. Upon an organizer sending an order on behalf of the combined order party, the several separate food preparation facilities may prepare their orders, group customers' orders from same location, if needed, and commence to deliver to centralized offsite dispenser for third-party collection and subsequent delivery. Delivery to and from a centralized dispenser location may be done via a human deliverer, autonomous vehicle, delivery drone, and the like.

Once a combined order is sent or processed, appropriate payment may be made to the respective third parties such as the delivery service and food preparation facilities. The customers participating in the combined order may also be individually charged once the order is sent or processed. Upon submitting an order, one or more of the combination of order, user, or payment information may then be submitted to a food preparation facility to begin making the order. Simultaneously, the same details of the order may be sent to a third-party delivery service and converted to an encrypted, unique identifier corresponding or matching to that of the combined order. Said unique identifier may be used to pick up the customer's order at a dispenser location onsite or offsite of a food preparation facility. An autonomous vehicle/car or delivery drone may instead serve as the delivery vehicle and therefore may use other identification means to interact with a dispenser upon order pickup such as laser scanning identification, near field communication, license plate scanning, onboard wireless communication, camera identification, and the like. The food preparation facility may send the order to a centralized or remote dispenser location for third-party food pickup by one of several means, such as human driver, autonomous vehicle/car, drone, and the like.

Once the third-party delivery service has verified the customer's order via scan or identification at the dispenser, the third-party delivery service may proceed to deliver organizer's food items at the desired delivery location or at another delivery location dispenser for customer interaction and pickup. If the latter delivery dispenser method is chosen, the deliverer is provided with an encrypted, unique identifier, matching the delivered food item of the organizer and is able to deposit the order into the dispenser. The combined order organizer may pick up from the offsite pickup dispenser via scanning the encrypted, unique identifier or via other means of identification such as facial scan, license plate recognition, geofencing, global positioning systems, near field communication, Bluetooth, and the like.

Third-Party Fulfillment

Third-party order fulfillment and delivery may be utilized. A third-party may have access and connectivity to the third-party application. An organizer may start, send, or invite a combined order invitation or wirelessly receive an order from another user, may subsequently add to the order, and then proceed to send said combined order to be fulfilled at a food preparation facility for third-party delivery. All users participating in the order may be separately charged. The order request is sent to both the restaurant and third-party who will be delivering the order.

The third-party deliverer may approach a pickup dispenser, onsite or offsite from a food preparation facility, and then proceed to be identified at said dispenser, to activate dispenser, and then pick up the combined order organizer's placed order. Traditional pickup means exist, outside of the dispenser flow pickup. Identification may be any of the means discussed herein, such as facial recognition, license plate recognition, camera recognition, Bluetooth recognition, near field communications, geofence verification, and the like. The third-party deliverer may proceed to deliver to the combined order organizer's selected delivery address or to an offsite pickup dispenser location that the organizer or other member may access. This dispense may too be activated by a third-party deliverer of the order (drone too).

Figure 34:
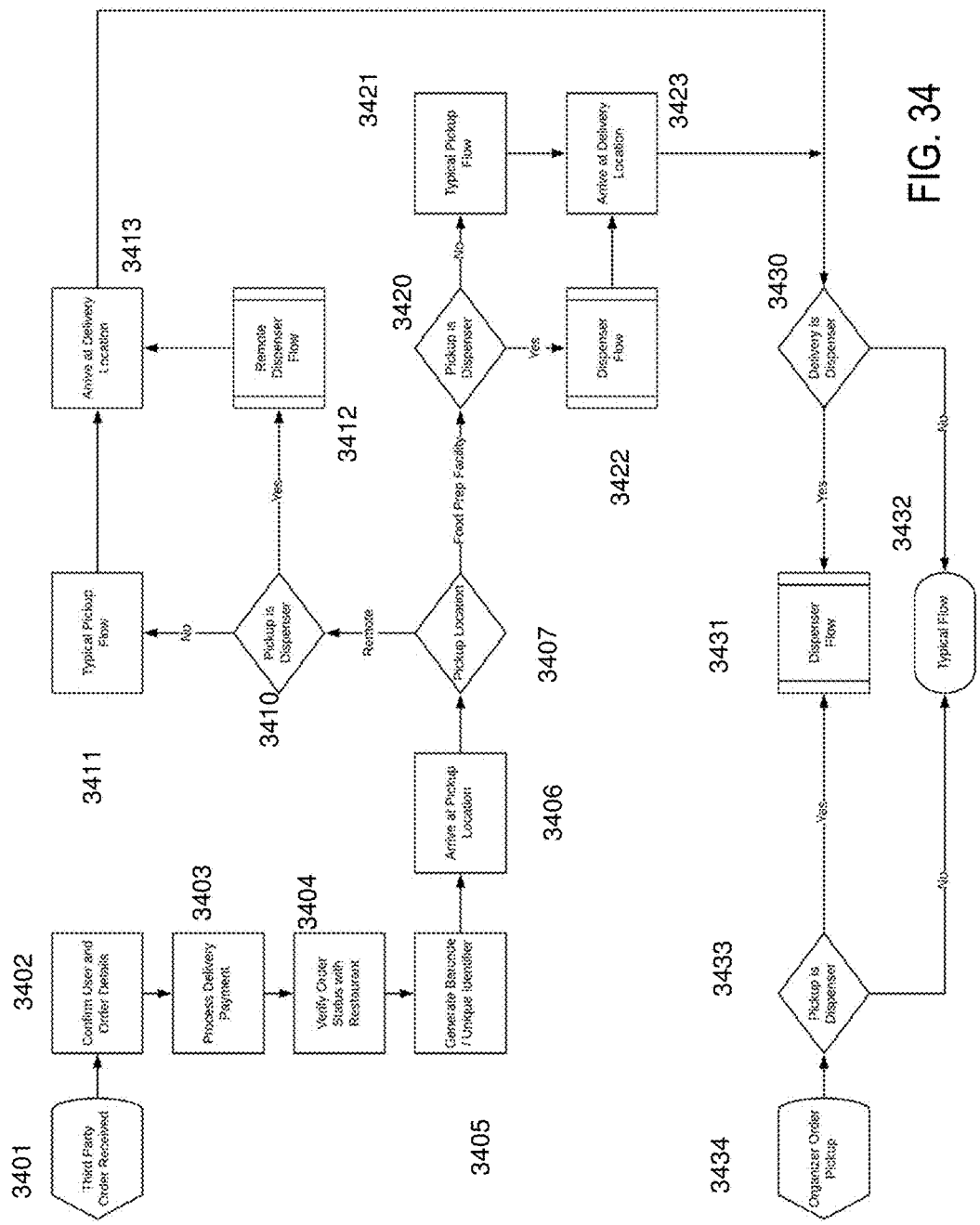
FIG. 34 illustrates aspects of third party pickup and delivery flow.

Referring to FIG. 34, a process flow of an option to select multiple restaurant locations or separate food franchises is depicted for different conditions of the order method. For example, a dispenser pickup location offsite of a food preparation facility or a combined order may be compiled, each order may be sent remotely to the corresponding restaurant location or food franchise for order preparation. At step 3401, where the third-party delivery order is received the process may start. Continuing in step 3402, the process confirms the user and order details. Proceeding to step 3403, a payment may be processed. Continuing on to step 3404 the order fulfillment status may be verified with a restaurant to ready said order for pickup. At step 3405 a barcode or unique identifier may be generated and associated with the user and the order. Once order preparation is completed, the order may be sent via human deliverer, autonomous vehicle, delivery drone, and the like, from a dispenser or other location at the site of the food preparation facility to a location remote of the food preparation facility. At step 3406, the delivery diver, autonomous vehicle, or delivery drone arrives at the pickup location. At step 3407 a pickup location may be either onsite of a food preparation facility or offsite of a food preparation facility. The order, once picked-up from the pickup location, may then be transported to a designated, centralized pickup dispenser located offsite of a food preparation facility or to another delivery location designated by the organizer or organized group. A user or member of the group may arrive at the pickup location. Different processing may occur depending on the pickup location. In some examples, a transfer of the order may be done at a pickup dispenser location, intermediate to a final delivery location. In such case, the order may be transferred by various methods such as in a non-limiting case between a combination of human deliverer, delivery drone, or autonomous vehicle. If the type of remote pickup is not with a dispenser at step 3410, 3422 then processing may proceed to Step 3411, 3421 and a typical pickup flow may occur. Alternatively, if the pickup location is at a dispenser the order process may proceed to step 3412, 3422 where operations related to a dispenser pick-up flow may occur. The pickup and delivery flow may proceed to step 3413, 3423 where the third-party delivery service may arrive at a delivery location and thereafter continuing to follow steps 3430 to 3434.

At step 3434, an organizer of a single or combined order may arrive at the delivery location to commence order pickup. If order delivery is through a dispenser 3433, 3430 then a typical dispenser flow 3431 will commence where a delivery driver, autonomous vehicle, or delivery drone deposits said order upon identification into a dispenser and an organizer of either the single or combined order will pickup said order at the same dispenser upon proper identification.

Autonomous vehicles, human deliverer, delivery drone, and the like may be identified in similar fashion at a pickup point or drop-off location as a customer would use a normal order flow. Upon customer arrival to a dispenser or arrival of a third-party deliverer to a designated destination or dispenser, geofence identification may recognize and verify both parties. This may occur within or outside of a dispenser drop-off and pickup flow.

Vehicle Tracking

Vehicle Tracking and Recognition, Multiple Order Kiosks and Dispensers

Figure 35:
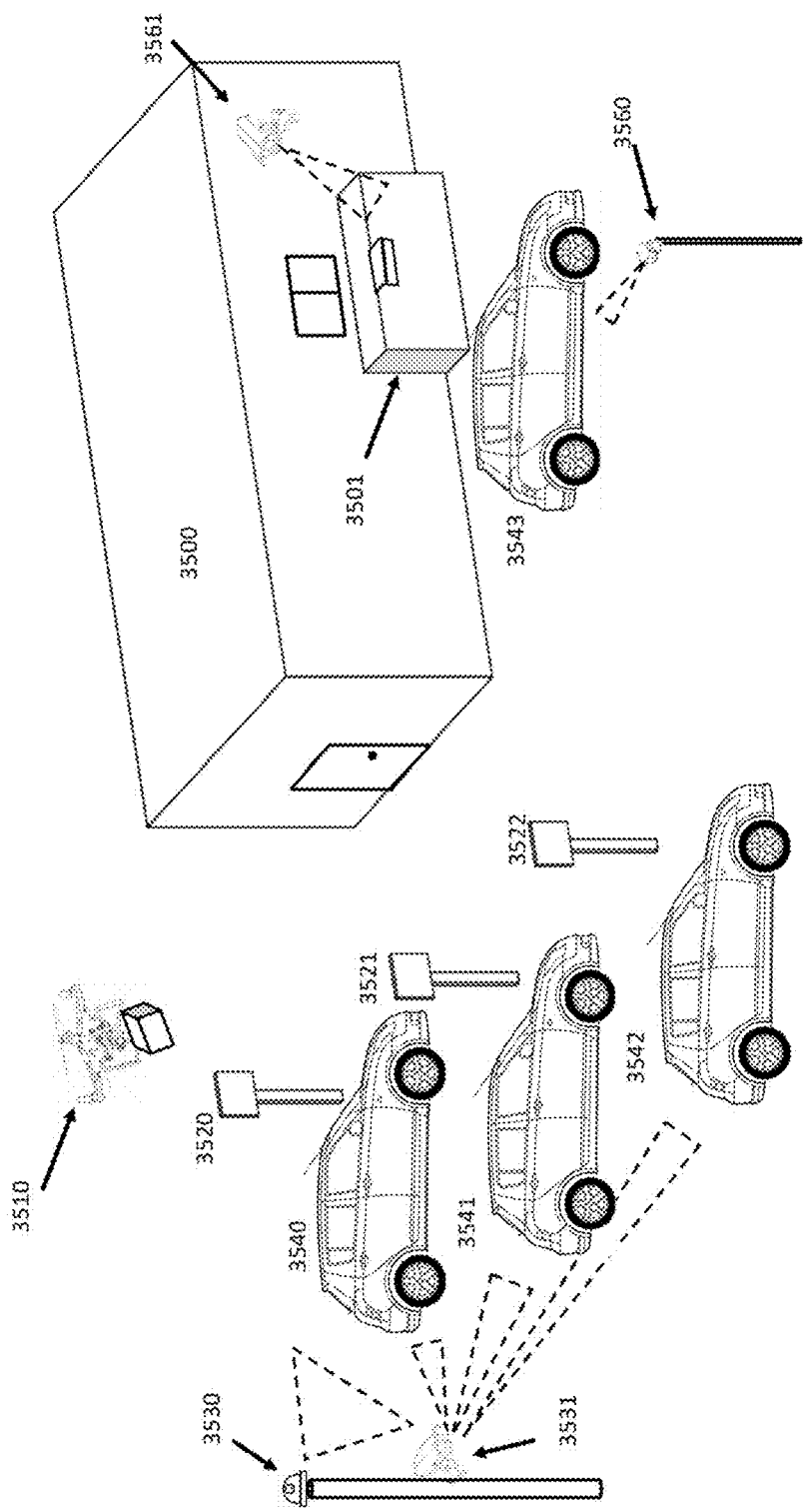
FIG. 35 illustrates aspects of a remote or onsite pickup pad.

Referring now to FIG. 35, operations at a remote pad 3500 is illustrated. This illustration may also be representative of an onsite food preparation facility. As one of the vehicles 3540-3542 approaches an order kiosk 3520, 3521 or 3522, it may be marked or identified by a camera 3530 or laser/license plate scanning system 3531 onsite. If an order is placed coinciding with a vehicle 3540 in front of an ordering kiosk 3520, the order may be stored and matched to a saved image or render of the vehicle 3540. Said order may be paired with the image saved within a stored database. License plate image storing or scanning, may also be traced in-lieu of or in conjunction with the stored camera image. A customer in a vehicle 3543 may continue to a drive-through dispenser 3501 or remote dispenser (not shown), where the image of the vehicle or license plate is traced, followed, or tracked perhaps with a camera 3560. The identification obtained from the camera 3560 may then be cross-referenced with the order placed at the order kiosk. Customer payment status may also be verified. There may be a payment window before a dispenser to handle traditional means of payment if a customer has not paid at a kiosk 3520-3522. As the customer in vehicle 3540 arrives at the drive-through dispenser 3501, the paired order contained within the dispenser is recognized and cross-referenced with the image or license plate of said vehicle perhaps, perhaps obtained from cameras or scanners 3530 or 3531, with another camera or imaging device 3560 or 3561, and the dispenser 3501 commences movement to dispense the bin or pod containing the customer's order to the customer. The operation of vehicle tracing may be helpful in managing the automation of a drive-through dispenser or remote dispenser. In some examples, aberrant states may occur when for example a customer may abandon ordering at an order kiosk. Without proper identification methods, a drive-thru dispenser may associate the next customer with another's order. In some examples, a site may have several order kiosks, or there may be several dispenser locations at the site. Order kiosks may exist either onsite, remote, or offsite of a food preparation facility. Order kiosks may recognize existing customers as they arrive to the kiosk through license plate scan, mobile application geofence identification, facial scan, loyalty number, and the like. Kiosks may prompt users with recent orders, confirm automatic orders, recall favorite orders, confirm preorders that may be already ready for dispenser pickup, confirm preorders that the user decides to order onsite, and the like. A customer may wait at a kiosk location until notified that their order is ready for dispenser pickup, and then subsequently directed to the appropriate dispenser if more than one dispensers exits. Kiosks may have an advertising feature as customers wait for their order to be placed. Advertisements may run from commercial ads to food products, or even food products from different food franchises if a kiosk is located at an offsite order or pickup location. Customers can select advertisements on the kiosk and add it to their order or preorder. Kiosks may also be voice controlled and offer integration with voice control applications such as Amazon Alexa and Google Home through a user's mobile device or through the kiosk itself. If several dispenser locations exist at the site, the customer may be directed after placing or confirming an order at the order kiosk as to which dispenser location to pickup said order. The customer may also be notified within their mobile application of when their order is ready for pickup, at what dispenser to proceed to when said order is ready for pickup, and the like. There may be a designated waiting area for customers who have placed their order through the kiosk or mobile application. A screen may also exist at said waiting area, updating certain customers to proceed to a certain, designated dispenser when their order has been fulfilled and is ready for pickup. Said monitor might share a representation or image of the vehicle taken once arrived onsite at the kiosk or when a user is geofenced. This way customers who may not use a mobile application can identify their own vehicle image on a monitor and proceed to the dispenser when called upon.

The aforementioned means of recognition/identification may be substituted or combined with several other recognition systems or methods. For example, a license plate reader may track a license plate onsite at an order kiosk and save order, customer, or payment information details relating to said license plate if an order is placed. Upon arrival at a dispenser location, onsite or offsite of a food preparation facility, one or more license plate scanners may scan the customer's license plate at the dispenser, verify if an order was placed and paid for by said customer, identify user details if they are saved within the system's database. With acceptable verification the process may continue to activate the dispenser to dispense said customer's order. After dispensing, in some examples, the process may close the dispenser, and may delete associated license plate information once a user has collected their order and left the order and pickup site. Information of a user may be kept for a period of time after the customer collects their order in the case feedback is generated or requested from an employee or customer's mobile application. In some cases, a user may be solicited for permission to retain various user information as allowed by local, regional, or national law. In addition to the aforementioned identification methods, an organizer of a single or combined order may arrive onsite and be recognized by geofence or GPS identification. If the order was placed before user arrival, the user's application may direct the user to a dispenser when an order is ready. Otherwise, if an order has yet to be placed, the user will be notified when identified by said geofence or GPS identification methods to either connect to the restaurant or go ahead and place the desired single or combined order the organizer has already compiled. Once said organizer order is processed, fulfilled, and placed into a dispenser, the organizer may proceed to said dispenser and be identified at pickup by either license plate recognition, facial scan, barcode scan, order number entry, NFC technology, Bluetooth connection, and the like.

Identification technologies such as geofencing a user or connecting with a user via WiFi, Bluetooth or near field communication technologies or cellular technologies may exist in-place or in conjunction with the aforementioned identification methods. Said technologies can identify when a customer is onsite, when a customer has placed an order by cross-referencing a user's identity and order status with a database. The technologies may also track movement of a customer to a dispenser or track if the customer has connected to a dispenser. For instance, a customer may be verified to be onsite via geofencing the user. Upon receiving an order, the server's database or network may cross-reference the geofenced location to identify that said user has placed an order. The customer may then approach the desired dispenser for order pickup, connect to said dispenser with wireless technologies (WiFi, Cellular, Bluetooth, near field communications, and the like) or recognition scan. With identification established the dispenser may automatically dispense said order item, or the customer may control a dispenser function via a wireless connection to a mobile device.

Combined order flow may also take place based on proximity to other users. For instance, a mall, park, carpool, office building, and the like. Proximate users may be geofenced, identified via a GPS radius, categorized by location or a landmark, and the like. A mobile application may populate a list of users nearby the subject user. Said list of users may be categorized as unknown, known, friends of social media applications, and the like. Additional information may populate next to those user lists such as favorite restaurant, favorite food items, and the like. The subject user can gift orders, payment methods for ordering said items, or even request certain users join a combine order pool featuring a single or multiple franchise locations. An open invite to all users may also be sent. Connection to said user pool may be through Bluetooth, near field communications, geofence, GPS location, and the like. A user can preselect, predefine, or customize a geofence boundary or even a radius for the GPS locator to identify within. A combine order flow with several payment options may ensue, with a combined order pickup flow from a centralized or decentralized dispense. A combination of a single organizer or several users may pickup said food orders on behalf of oneself or others.

As mentioned, multiple order stations may exist onsite or offsite of a food preparation facility. A customer may arrive at an order station and proceed to either confirm or submit their order. Upon arrival at order station, customer recognition may ensue by detecting the user by one or combination of facial recognition, license plate recognition, geofence, camera recognition, or any of the identification methods previously discussed. After placing an order, the user continues to either a single or given dispenser location. Multiple vehicles may be tracked at once, at several order kiosk locations, and tracked to a single dispenser or multiple dispenser locations. A dispense location or identification number may be given to a customer after they finish submitting or confirming their order at an order kiosk. In some examples, order kiosks may also exist directly next to or on a dispenser. Orders may be brought to the remote pad 3500 with drones 3510, autonomous vehicles or the like.

Remote Order, Pre-Order

Remote Pad Site for Dispenser Pickup

Figure 36A:
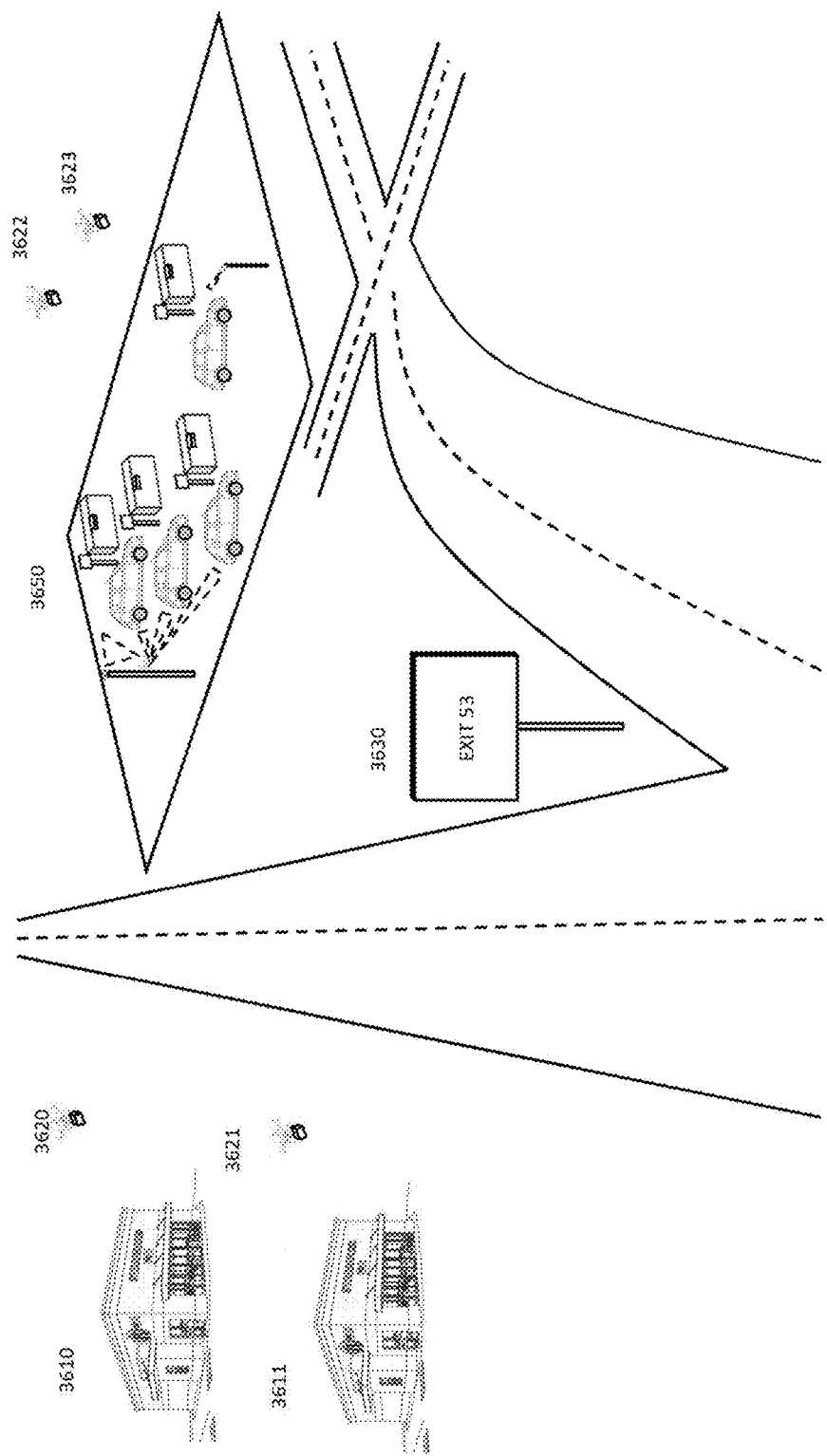
FIGS. 36A-B illustrate an overview of a remote pad.

Referring to FIG. 36A, in a general example of the utility of the concepts herein, a remote ordering area 3650, comprised of several kiosks and dispensers may exist in proximity to several restaurant locations 3610 and 3611, nearby a highway exit 3630, proximate to commercial or residential areas, and the like. Remote orders may be picked up at said remote locations, as well as orders may be placed onsite of said remote pad locations. Such a location may consist of several kiosks and dispensers, which may house or hold orders from several participating food preparation facilities. The user may apply a proximity queue to have an order sent to the dispenser within a radius range. Participating food preparation facilities may deliver orders via, drone delivery 3620-3623, in-person, autonomous vehicles, manned vehicles, and the like.

Figure 36B:
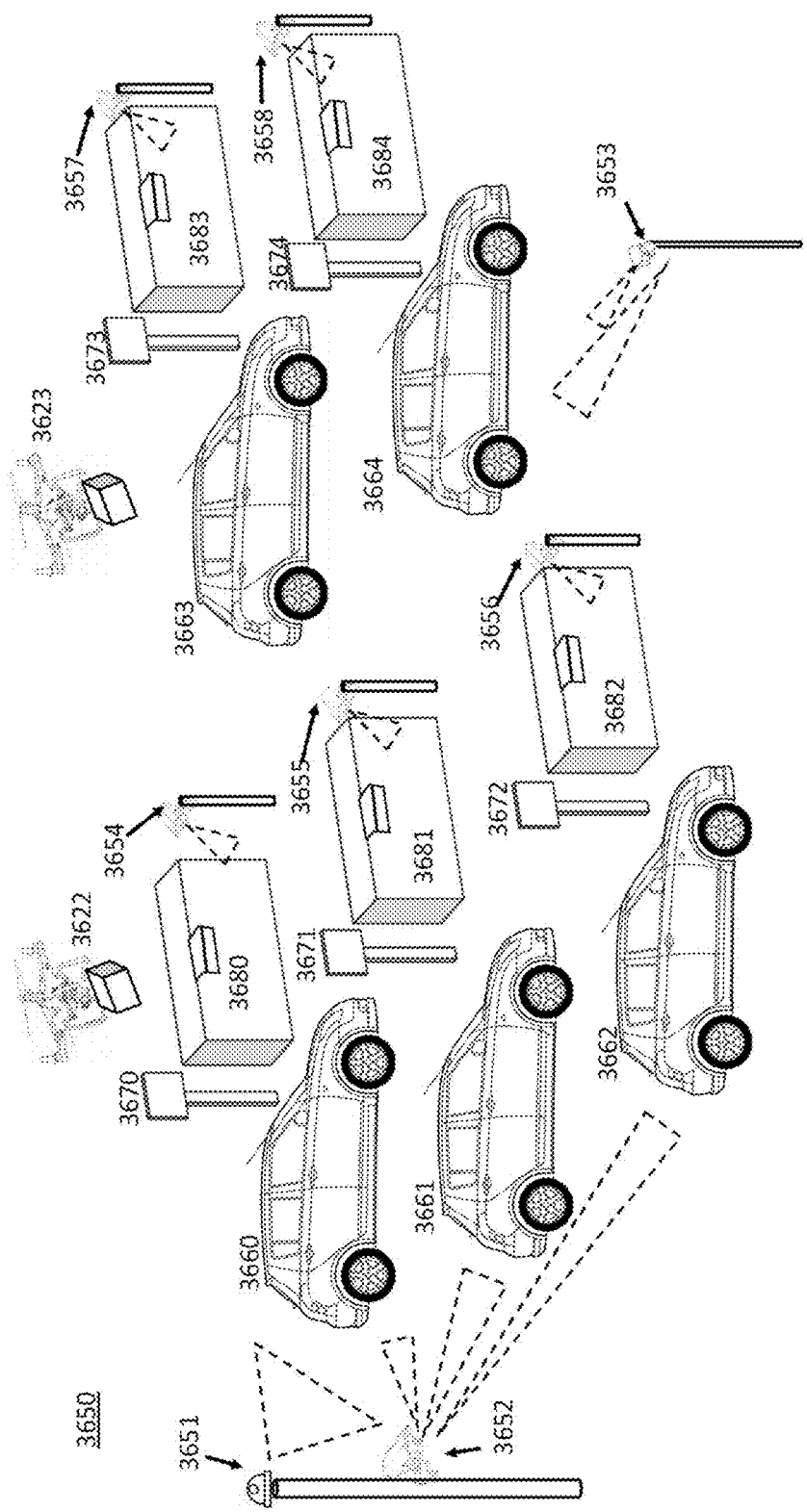

Referring to FIG. 36B, a designated pickup lane or area 3650 containing dispensers 3680-3684 designated for mobile or remote preorders may exist. In some examples, users may pick up their order in automobiles 3660-3664. A pickup area may consist of one or more dispensers or singular box pickup stations where the user may be identified by various means as have been described like cameras 3651 and 3653 or scanners 3652, 3654-3658. In some examples, the identification process may be used to activate a dispenser. Delivery to a particular dispenser may occur with a mechanized track, drone 3622, 3623, slider, and the like to the designated mobile order or remote preorder pickup box. Kiosks 3670-3674 may be located next to the remote pick up stations. In some examples, the dispensers may be simple distribution systems for a single box while in other examples, the dispenser may store multiple orders. In some examples, dispensers may house terminals to query the remote/mobile order pickup and invoke communication such as employee assistance, and the like.

Dispenser Pickup

Figure 37A:
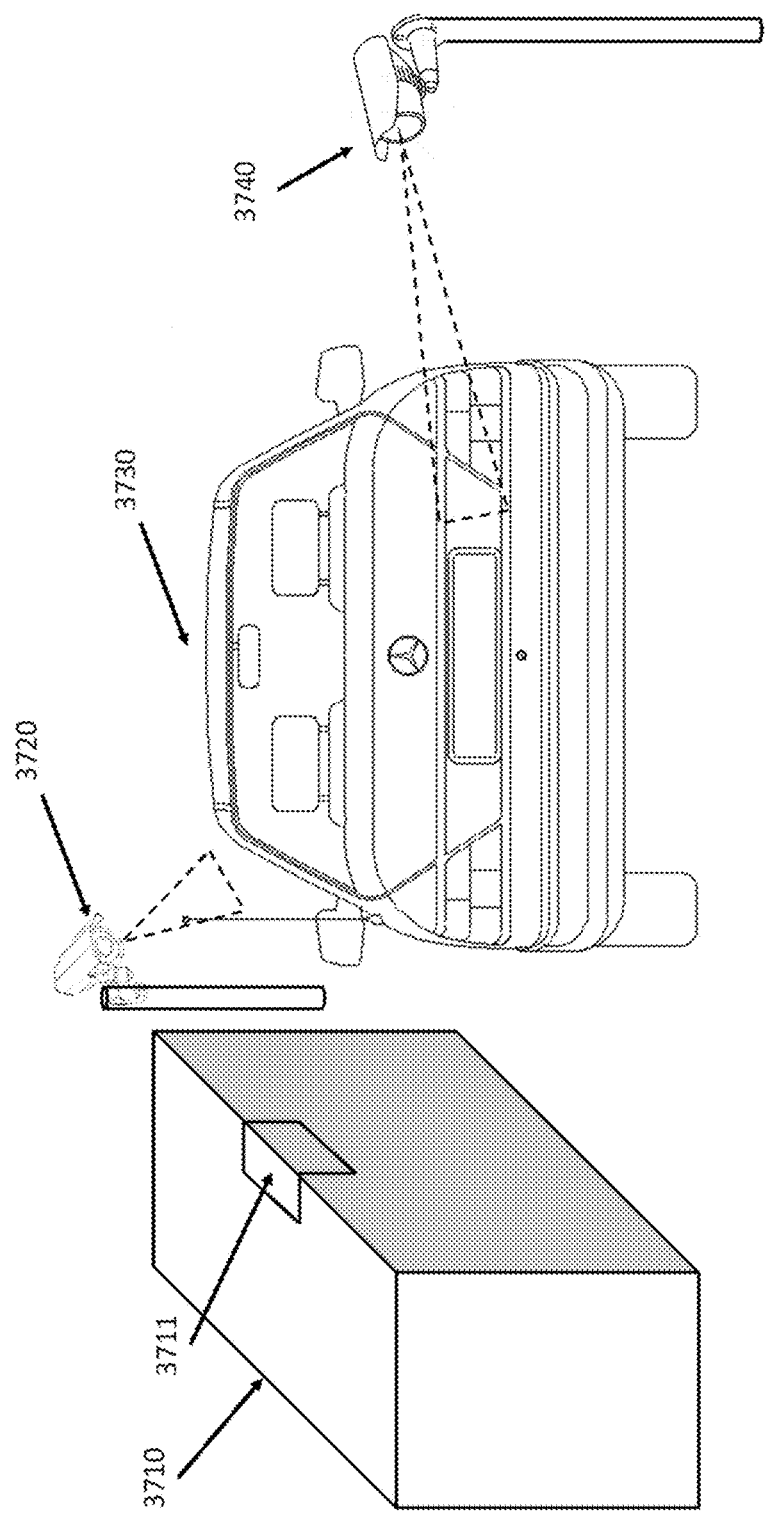
FIGS. 37A-D illustrate aspects of pickup from a dispenser.
Figure 37B:
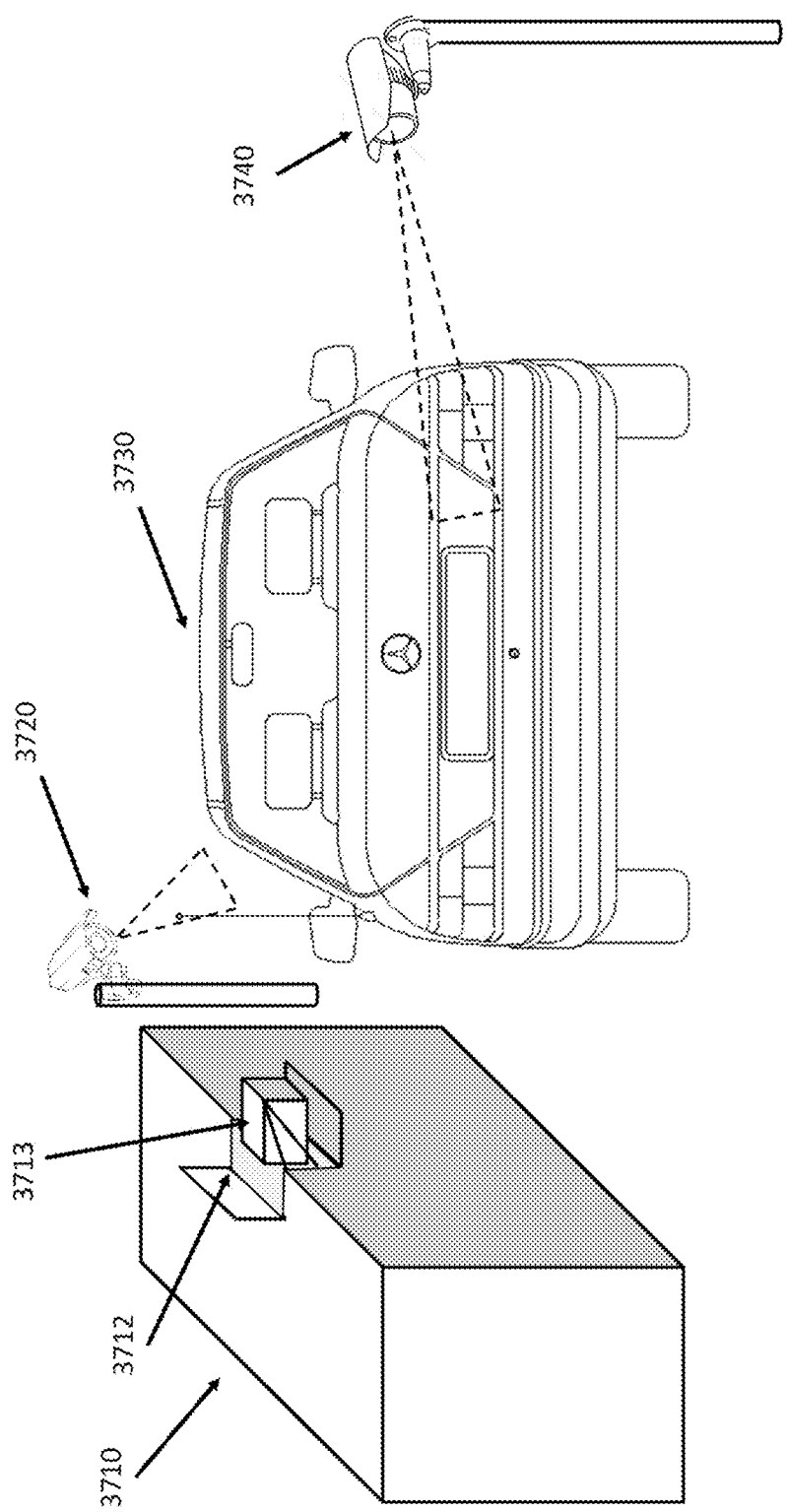
Figure 37C:
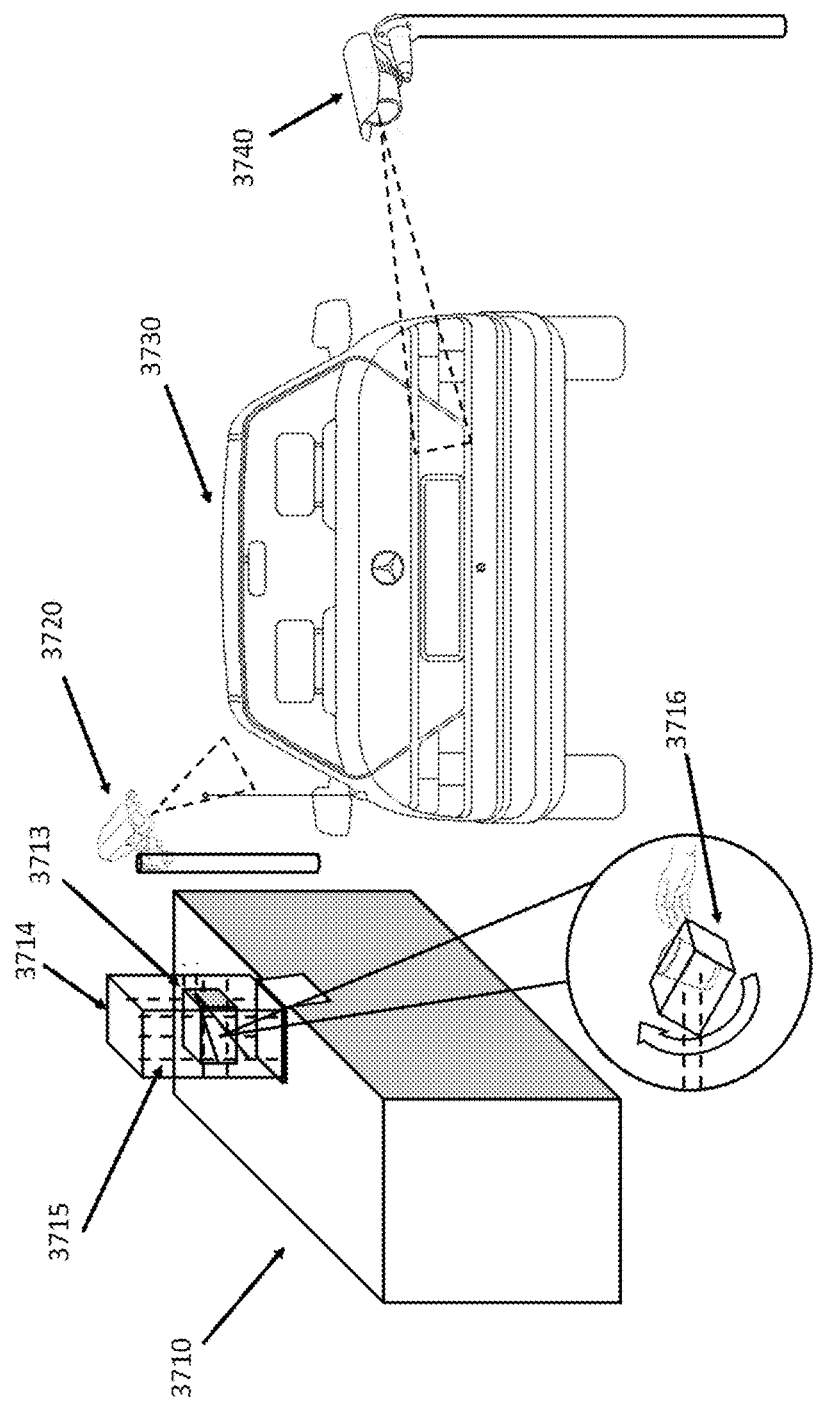
Figure 37D:
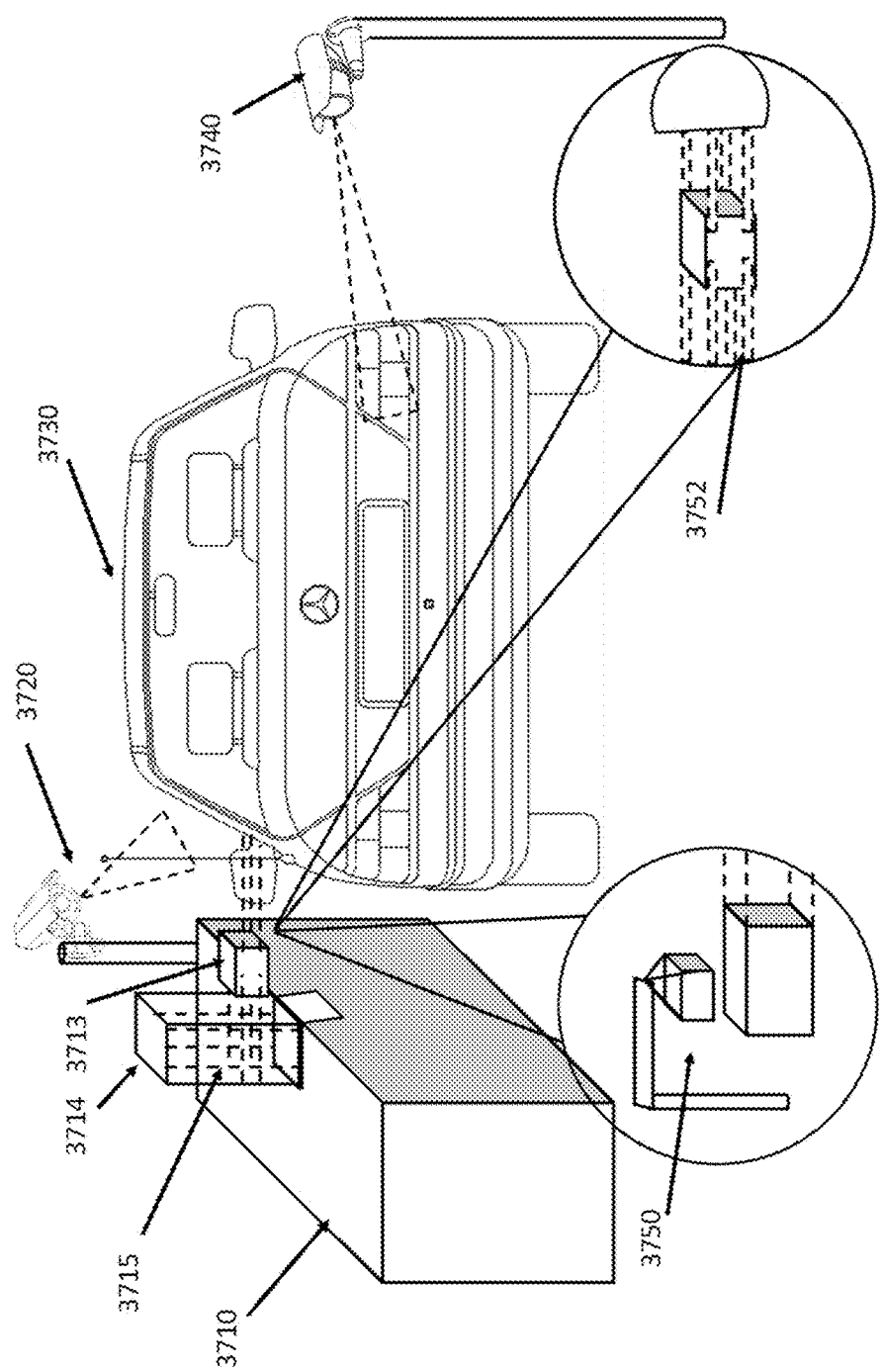

Referring to FIGS. 37A-37D the details of exemplary dispenser based pickup processes are illustrated. At FIG. 37A, a vehicle 3730 may be positioned in front of a dispenser 3710 in front of an access port 3711 where a stored order may be handed off to an operator of the vehicle. The dispenser system may include a camera 3720 that may be used to perform recognition functions of various kinds. A scanner 3740 may be used to identify the vehicle 3730 by a license plate scan for example. The disperser pickup process may continue at FIG. 37B. The dispenser may be authorized by the various means discussed herein to distribute a food order 3713 to the operator of vehicle 3730. The access port may open 3712 to begin dispensing the food order 3713. Referring now to FIG. 37C, a gimble function 3716 is illustrated on the apparatus that is used to distribute the food order 3713. In an alternative example, as illustrated, the access port may open by elevating with an elevator 3714 or within a channel out of the dispenser 3710. The elevator 3714 may include holding rails 3715 which hold the gimble function 3716 in place, so that movement of the device may keep the food order in an upright fashion. Referring to FIG. 37D, an alternative means of dispensing a food order 3713 from a dispenser 3710 is illustrated with a track function 3752. The track function may telescope out from holding rails 3715 to present the user with the food order at a window of their vehicle. In some examples, illustrated with robot handler 3750, the dispenser may operate as a stocker with storage shelves where the robot handler 3750 may retrieve an order and hand off the order to the rail delivery system. Said robot handler may also include a six-axis arm or pick and place feature. Bin transferal processes may exist that connect an autonomous vehicle or drone to a dispenser wherein a bin is either presented from an autonomous vehicle or drone and food items are picked and placed 3750 into said bin. In an alternate method, a bin receptor may reside onboard of an autonomous vehicle or drone that may collect filled bins ready for delivery and also may deposit used, empty bins back into the dispenser. This process may be aided by automated features such as tracks 3752, belts, magnets, pick and place arms, camera or laser recognition for approximating bin location and placement, and the like.

Autonomous Vehicles, Drones

Autonomous Vehicle, Drone Flow

Figure 39:
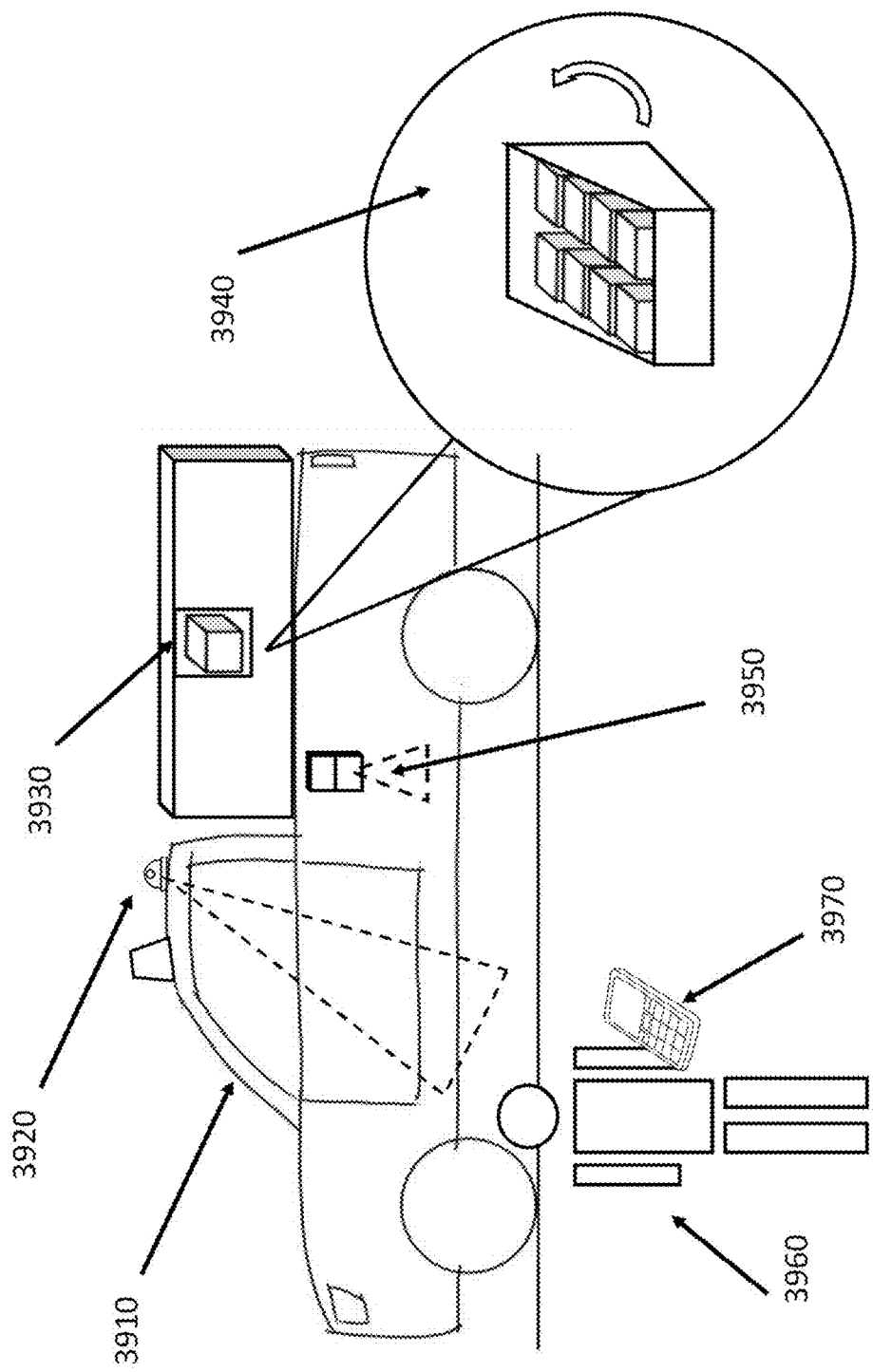
FIG. 39 illustrates additional aspects of an autonomous vehicle pickup.

Referring to FIG. 38, exemplary operation of an interface of order delivery with autonomous vehicles and drones is illustrated. Autonomous vehicles and drones can act as transportation and delivery devices for third-party delivery, delivery from one dispenser to another, delivery to a remote pickup site, and the like. An autonomous delivery vehicle 3810 or drone may originate from onsite or offsite of a food preparation facility and may be owned and controlled by either a food franchise or a delivery service company. When an autonomous vehicle 3810 or drone arrives at a food preparation facility or remote site for order pickup, the order may either be loaded on said drone or autonomous vehicle by a human employee or picked up by a customer 3830, optionally with a mobile device 3840. User identification, such as facial scan or barcode scan, may be aided with the use of cameras 3820 or scanners 3850 and the like. Scanner 3850 may also feature a touchpad functionality for order number entry. Drones and autonomous vehicles can load each other with bins. For example, a drone might pick up a prepared food item from a food preparation facility or remote pad site and deliver said prepared food item to an autonomous vehicle that is either stationary or in movement. The drone may carry a bin and dispense said bin or pod into the autonomous vehicle, or it may transfer food to a bin already loaded onto or fixed onto an autonomous vehicle. In other examples, an autonomous vehicle may contain one or several prepared foods items 3860 onboard and deliver said prepared food items to either a delivery drone or to a dispenser located onsite or offsite of a food preparation facility. The autonomous vehicle may carry a bin and dispense bin or pod into the delivery drone, or it may transfer food to a bin already loaded onto or fixed onto a delivery drone. The customer 3830, once identified and verified that their order is onboard the autonomous vehicle for pickup, may also interact with an onboard bin container 3860. Said bin container may also separately and automatically dispense a bin for food item retrieval by the customer. This action may take place within a slot proximate to the bin container 3860 on the side of the vehicle. Referring to FIG. 39, an autonomous vehicle 3910 may itself include a dispenser 3930 of varying size that contains multiple bins or pods and operates or moves based on several interactions such as item loading, item pickup, item delivery, item transferal, item recall, and the like. The autonomous vehicle may include scanners 3950 and cameras 3920 used for either user identification, guiding vehicle when connecting to a dispenser, and the like. In some examples the vehicle may be a truck. In some examples, a user 3960 may pick up an order from the vehicle. In these examples, the user may interact with the vehicle with a mobile device 3970 which may communicate with the vehicle or present a bar code to a scanner 3950 for example. The order of the user may be located within a collection of items 3940 or be a collection of items such as the entire collection of items 3940.

Autonomous Vehicle, Drone Connection to Dispenser

Multiple methods and technologies may be used to implement a bin transfer to and from a dispenser, delivery drone, or autonomous vehicle. The delivery methods may relate to a prepared food item transfer from one bin or pod to another. Said interaction or engagement may transfer a bin via multiple methods and mechanisms, such as latching, pick and place, magnet connections, sliding, dropping into a designated area, mechanized or motorized track, and the like.

Upon arrival at a dispenser to either pickup or deliver an order, the autonomous vehicle may be identified in similar fashion to a human arrival at a dispenser in a vehicle. This may include, license plate scan, geofencing the vehicle, global positioning systems, near field communication technologies such as Bluetooth, vehicle identification scan of unique vehicle device such as a barcode, onboard wireless communications, and the like.

Laser scan devices, GPS coordinates, visual camera references, onboard wireless communications, and other methods may exist to guide a delivery drone or autonomous vehicle to an appropriate location where said vehicle may coordinate or communicate with a dispenser to successfully exchange or transfer a bin or pod for order pickup or drop-off.

User Identification at Delivery Drone or Autonomous Vehicle

User identification may occur to connect a user to a dispenser bin or pod attached to a manned vehicle, delivery drone, or autonomous vehicle. Similar to user identification at an order terminal or dispenser pickup, a user, customer, deliverer, etc., may be identified upon interaction with a manned vehicle, delivery drone, or autonomous vehicle. For instance, a customer may approach a manned vehicle, delivery drone, or autonomous vehicle at a desired order pickup location and subsequently be identified by one or a combination of several methods such as scanning a unique identifier at the manned vehicle, delivery drone, or autonomous vehicle, geofencing the user, near field communication technologies, Bluetooth, facial scan, biometric identification, and the like. In a similar example, the same identification methods or technologies may be used to identify a deliverer at either a pickup, transferal, or drop-off location onsite or offsite of a food preparation facility. Autonomous vehicles, manned vehicles, or delivery drones with onboard dispensers may pick up several, separate orders at once, either at the same dispenser or multiple dispensers, to create delivery efficiencies based on coordinating or weighing several order factors such as frequency, time, delivery location, and the like.

Geofence Advertisement Conversion to Unique Identifier, Set Scrolling Deals to Radius Advertisements found on a mobile based application, such as a social media website, restaurant websites, or other applications populated from geofencing a user or by GPS location tracking. The identification of a user may be converted to a unique identifier, which may connect to a user's payment or profile preferences, and the like. Such identification information may be scanned upon arrival at a scanning station. The connection between the identification of the user and other social media connections may be inputs to a system that may determine appropriate advertisement to the user and/or location. The advertisement may also be sent to an organizer when the order process is of a combined order type. Advertisements may be populated on a user's device by one or more methods such as geofencing the user to a certain location, global positioning coordinates, time of the day, radius to certain establishments, recent friend orders on social media, and the like. For example, a user or a user's carpool may be approaching an exit on an interstate which may contain several food preparation facilities or remote pad locations. In some examples, a user may invoke navigation guidance from their automobile which may provide input to an advertising system that may invoke remote pad locations along the route along with restaurant establishments that are served by them. A user device may then populate advertisements or deals pertaining to franchises one may order from. Limitations may be applied to the system such as a radius of said user or exit. In some examples, other limitations may pertain to specific stores in radius to the user's current location or a nearby exit from the route they are travelling on. In some examples, an advertisement, once selected, may be placed in a user's order queue to be shared as a combined order feature with other users or other user's in a carpool, or may be included in user's queue to start a combined order as an organizer. A standard, single order flow may also directly result from converting a populated food advertisement to an order. The ordering process may be completed as either a preorder, a remote order, or an order upon scan. Subsequent dispenser pickup may occur after an order method is processed from an advertisement.

Multiple user devices may constantly be updated at each interstate's exit, wherein the passing of an exit would refresh to the options for future restaurant possibilities based on a set radius from geofencing or global positioning of the user. This feature may synchronize with a global positioning device to match a user's travel path, either approximated by direction and speed of travel or a user's travel path based on destination entered into a GPS application.

Detail of Unique Identifier Encryption

The unique identifier may use a signing key encryption method where, upon order scan, the unique identifier is decrypted, read, and used to communicate to the server database to recall one or more of payment status, order information, customer information, and the like. The same unique identifier may be limited to only a single subsequent dispenser pickup, where after dispenser pick up the encrypted unique identifier is deleted or corrupted. After an order is completed and picked up by a user, the server hosting the application to process the order, payment, and user information may delete the information, store the information or set a period of time for which it will be stored before being automatically deleted. Three may be numerous occurrences, and condition changes which may render a unique identifier useless or result in unique identifier deletion. These condition changes may be facial scan, order scan at terminal, scan at dispenser pickup, image verification at dispenser pickup, geofence reference, license plate scan, confirmation of order after biometric identification, and the like.

General Ordering System Overview

Figure 40:
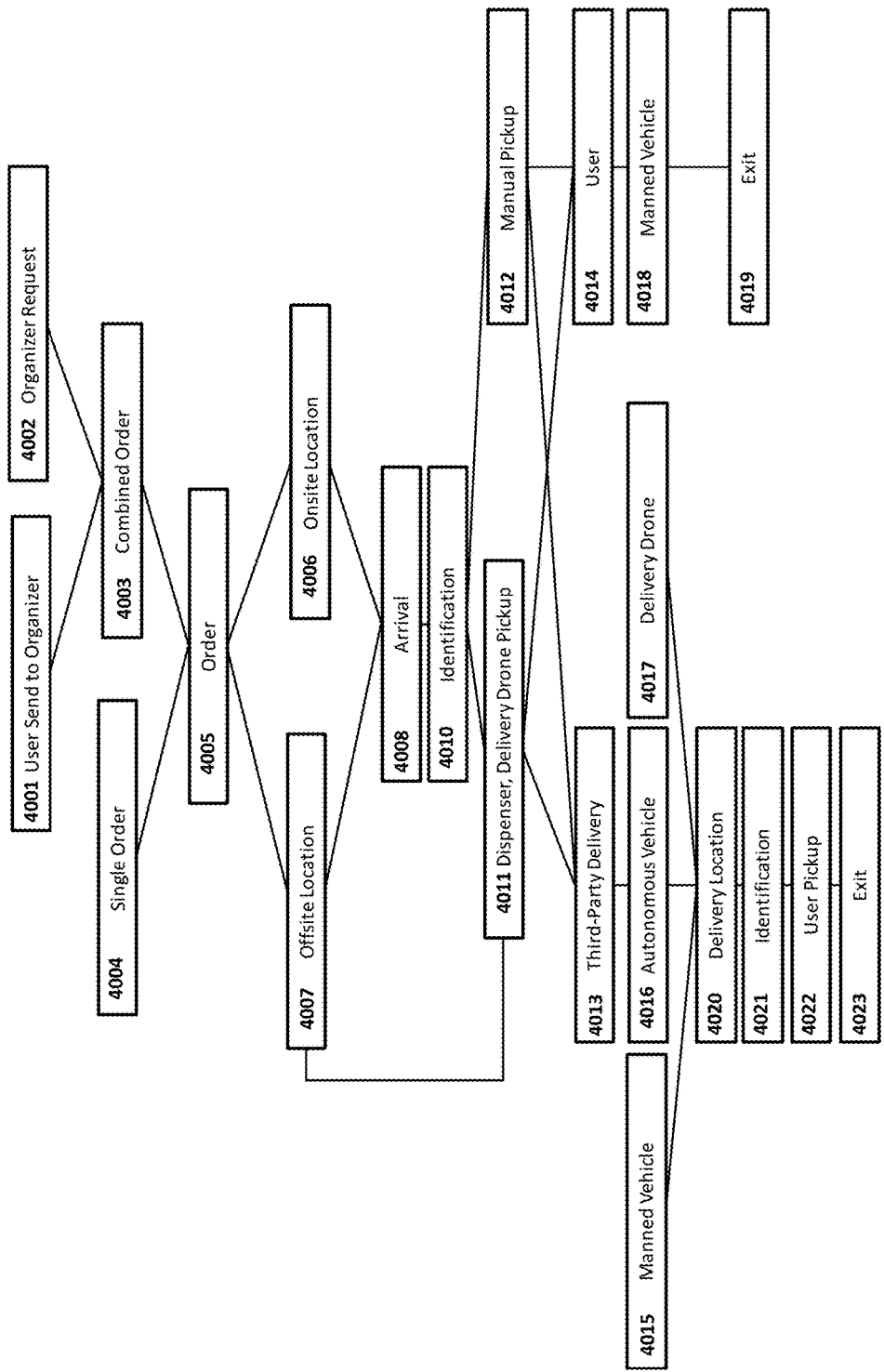
FIG. 40 illustrates overview aspects of an exemplary system.

Referring to FIG. 40 an overview of a general ordering system is found. A user may engage the application and has an option to perform a single order or a combined order. A combined order may be initiated through wireless communication by either sending an order to an organizer 4001 or by requesting a combined order by organizer request 4002. A combined order by organizer request may give the user submitting the request an organizer role. This organizer role may be responsible for collecting orders and payment options from other users and subsequently submitting the order and any payment processing. Wireless communication may be done through text message, email, geofencing users, GPS location coordinates, social media applications, near field communications, Bluetooth, and the like.

Once a single order 4004 or combined order 4003 is ready to be processed, the user or organizer may begin to submit the order. The order 4005 may be a preorder where payment is processed, and the user is able to move directly to a pickup location, or the order may be placed upon arrival at a desired pickup location. At this step, the user or organizer placing the order has a decision between an offsite location 4007 or an onsite location 4006.

An offsite location may be a pad site approximate to a highway, within an apartment community, or other location offsite from a food preparation facility. Said offsite location may contain a single dispenser or multiple dispensers for either order placement once the user has arrived or for order pickup. Delivery drone drop-off zones may also exist for order pickup. Once the user or organizer has arrived 4008 to the offsite location, an identification process 4010 may occur. This identification process may be one of where the user or organizer places an order and processes payment upon arrival of the offsite location by one or a combination of several methods such as identifier scan, GPS location, geofence location, license plate scan, facial scan, and the like. If the user or organizer has preordered or completed an order within the confines of the offsite location, they may move to dispenser pickup following additional identification procedures. Said identification methods such as identifier scan, GPS location, geofence location, license plate scan, facial scan, and the like may take place at dispenser pickup, delivery drone pickup 4011, or manual pickup 4012, which is a traditional flow of a human interfacing with a user 4014 or organizer in delivery of the prepared food items via manned vehicle 4018 and exit 4019.

Third-party delivery 4013 such as Grubhub or Uber Eats may interface with a dispenser pickup, delivery drone drop-off, or manual pickup on behalf of a user or organizer of the application. Third-party delivery may share in the unique identifier or may contain identification qualities that match or correspond said third-party delivery with a user or organizer's placed order. Several means may exist by which a third-party delivery interacts with either a dispenser pickup or manual pickup. Said means may be manned vehicle 4015, autonomous vehicle 4016, or third-party delivery drone 4017. Subsequent to order pickup, the third-party delivery service may continue to order delivery at delivery location specified by the user or organizer. Upon arrival of said delivery location 4020, identification 4021 of the user may exist between the user and either manned vehicle, autonomous vehicle, or third-party delivery drone. Methods at the point of identification may include as identifier scan, GPS location, geofence location, license plate scan, facial scan, near-field communications, Bluetooth, and the like. Upon successful identification, the system may allow user pickup 4022 of the single or combined order. The means of pickup may be manual methods or automation technologies such as an onboard vehicle dispenser, bin dispensing, and the like. Following a successful user pickup, the application may end and exit 4023.

Third-Party Delivery Detail

Figure 41:
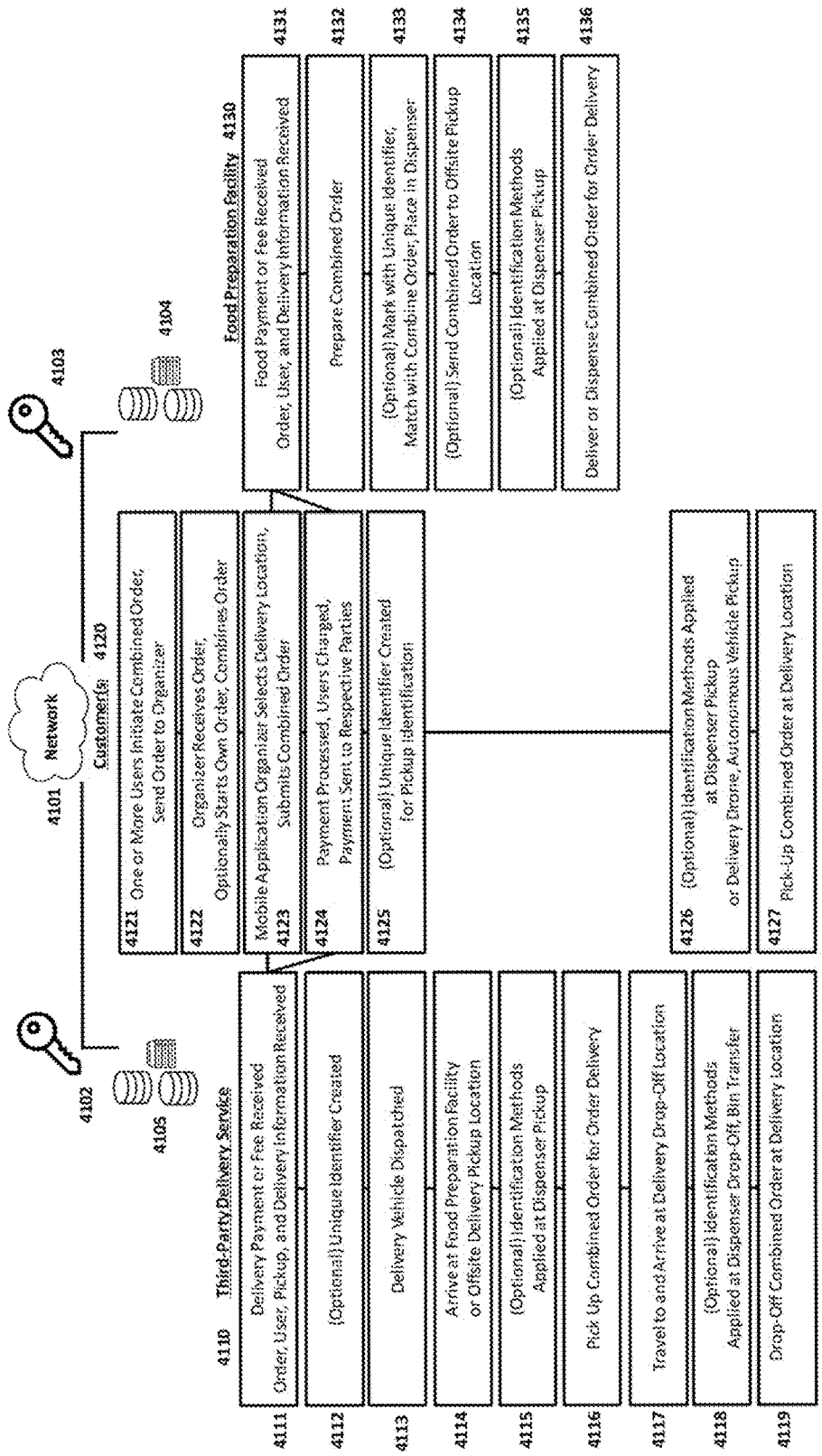
FIG. 41 illustrates aspects of third party delivery.
Figure 42:
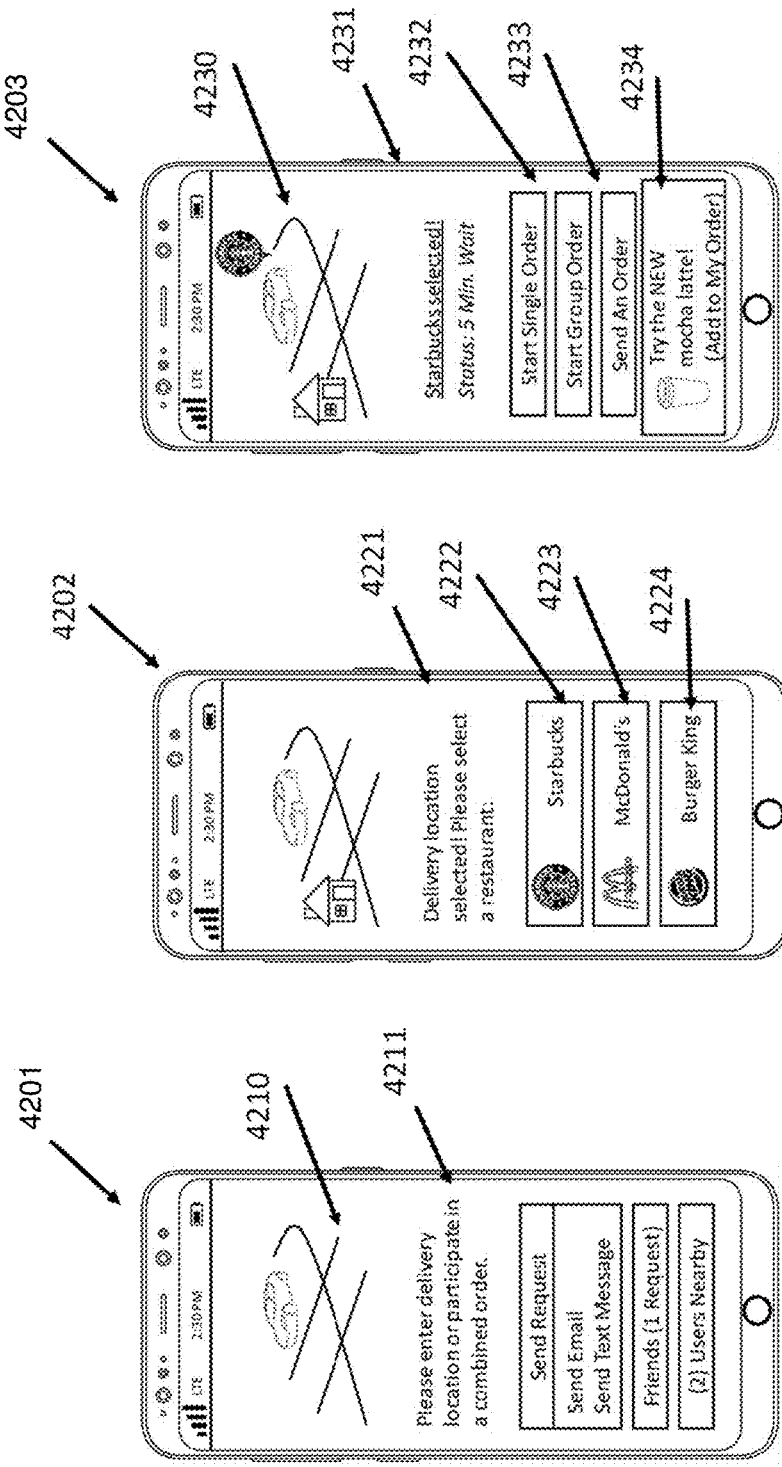
FIGS. 42 A-C illustrate aspects of mobile device order processing.
Figure 43:
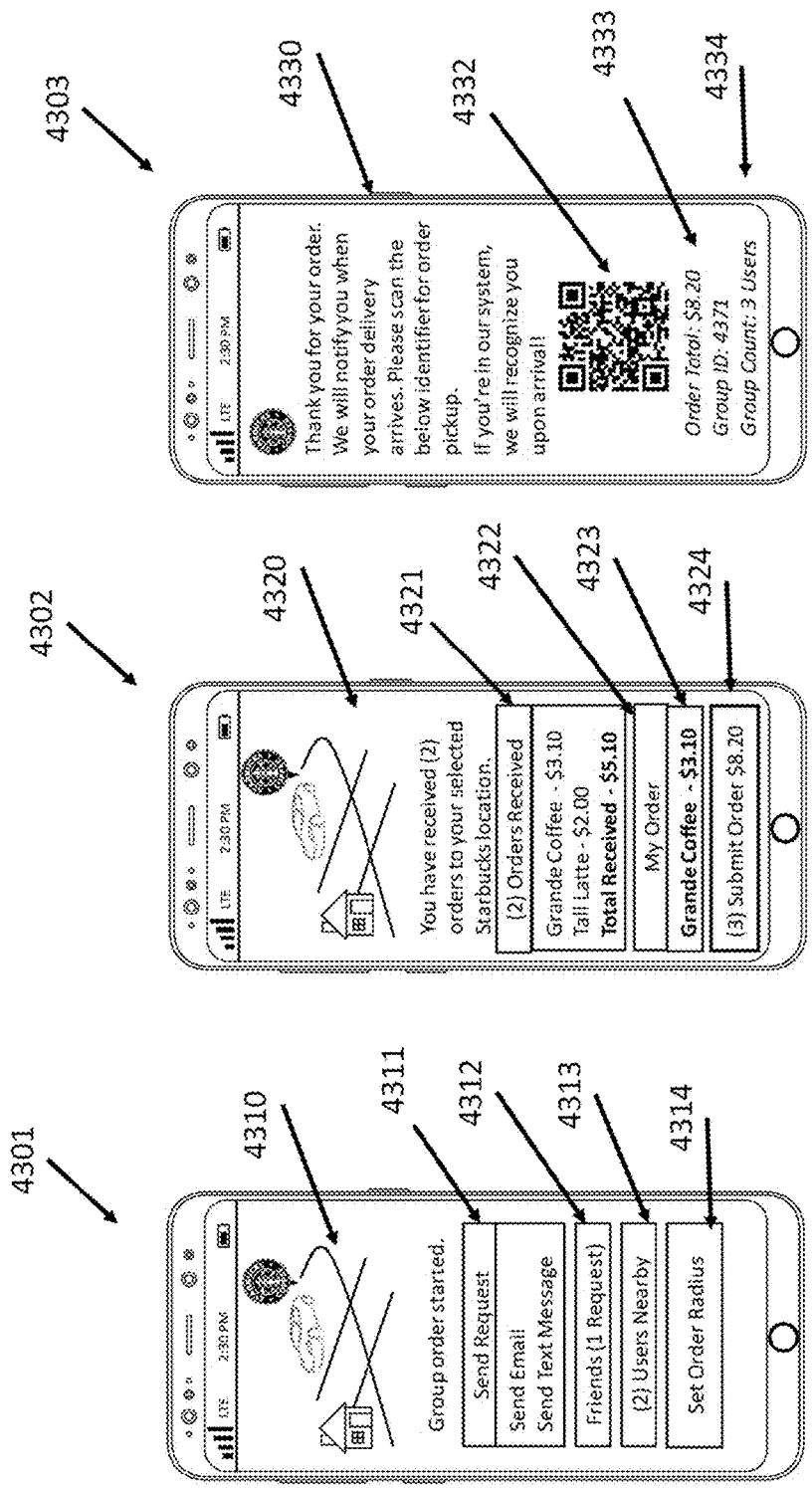
FIGS. 43 A-C illustrate further aspects of mobile device order processing.

Refereeing to FIG. 41, a detail of third party delivery details are illustrated. A network 4101 may exist comprised of encryption verification servers 4102, 4103 and database servers 4104, 4105 enabling customers 4120, third-party delivery services 4110, and food preparation facilities 4130 to identify users or orders, communicate, process orders, fulfill orders, collect payment, and deliver food orders. Data pertinent to a food order and fulfillment process such as user, order, and payment information may be stored, encrypted, decrypted, shared, transferred, among third-party delivery services, customers, and food preparation facilities. One or many mobile application users may communicate to an organizer 4121 via wireless communication a desired food order to be placed. Alternatively, an organizer may start a single order or combined order 4122 and send a request to combined order to one or many users of the application. A combination of sending an order, sending payment options, participating in payment-sharing, or a combination of the aforementioned may be sent by the user to an organizer. In either combined order initiation, an organizer may set a radius for orders from separate food preparation facilities to be processed, fulfilled, and merged into one order and delivered by one deliverer vehicle. For instance, the organizer may set a 2-mile order radius from a desired restaurant location, dispenser pickup location, drone drop-off location, or delivery location. Users participating in the combined order may select food items from participating food preparation facilities within said 2-mile order radius. A delivery vehicle may pick up the ordered items individually from each food preparation facility, or from a centralized dispenser site within said radius, and continue to the delivery location for combined order drop-off.

Once an order 4122 is combined, the organizer may select the desired delivery location 4123. Setting a delivery location may also be done before submitting a request to fellow users for a combined order flow. Following delivery location selection and combined order, the organizer submits the order. Upon submitting the order, payment may be processed 4124 and each respective user may be charged separately for the amount of their order. Alternatively, a user may elect to pay for another user or share in payment of a single order. An encrypted, unique identifier may be created 4125 within the organizer's application for pickup identification 4126 upon delivery vehicle arrival. The combined order may next be picked up at the delivery location 4127.

Once an order has been sent by the organizer, the respective third-party delivery service and food preparation facilities may be notified of order submittal. The food preparation facility may receive payment for the food and any related order, user, or delivery information 4131. The third-party delivery service may also receive a delivery fee or payment for their delivery service and may also collect necessary order, user, pickup, and delivery information regarding the combined order 4111.

Meanwhile, the food preparation facility or facilities may begin to prepare, make, and fulfill the combined order 4132. The facility may optionally mark the food items with identifiers 4133 matching the combined order and place said items into a dispenser for order pickup by a third-party delivery service or by additional vehicles transporting said combined order to an offsite pickup location 4134 such as an offsite or remote dispenser. Wherever the combined order has been taken or placed, identification processes 4135 may be used to identify the third-party delivery service. Such methods may include traditional identification methods such or unique identifier scan, geofence, facial scan, Bluetooth, near field communications, license plate scan, and the like. Once the third-party vehicle is identified, the order may be dispensed to the third-party delivery service for order delivery at the delivery location 4136 requested by the organizer or to a central pickup station where an additional third-party delivery service may continue with the combined order delivery to the requested delivery location.

An encrypted, unique identifier matching the organizer's combined order may be sent to the third-party delivery service 4112 for both delivery and order identification at pickup. A delivery vehicle may be dispatched 4113, such as a manned vehicle, autonomous vehicle, or a delivery drone, to the order pickup location. Once the third-party delivery service arrives at the pickup location 4114, whether it be an offsite location or onsite of a food preparation facility, an identification method 4115 of the third-party delivery vehicle may be enacted. After successful identification, the combined order may be picked up either manually 4116, via a delivery drone drop-off zone, or at a dispenser location. The third-party delivery service vehicle may travel and arrive at a delivery drop-off location 4117. In some examples, a drop-off location may be a middle point in combined order transferal to another, subsequent third-party delivery vehicle that may continue in transit to the final delivery location requested by the organizer. If there is no middle transferal point, the original delivery vehicle may continue to the final delivery location requested by the organizer. At any arrival point, identification methods may occur to verify drop-off 4118. Otherwise, the delivery vehicle may continue with a drop-off method without identification processes. In an example, a delivery vehicle may approach the final delivery location requested by the organizer and identification methods of the user ensue. In some examples, the identification methods may include scanning of the organizer's unique, encrypted barcode, facial recognition scan, order code entry, and the like. Upon verification of the user, the delivery vehicle may drop-off the order 4119, either manually or through an onboard vehicle dispenser, and the user may pick up the combined order and proceed to exit the third-party delivery flow to successfully complete the transaction.

Referring to FIGS. 42A-C and 43A-C, a graphical illustration of combined order processing is illustrated. At FIG. 42A, a cell phone display 4201 illustrates a map with current user location information or delivery vehicle location 4210 and options to choose a delivery location 4211. Continuing to FIG. 42B, the cell phone display 4202 changes to a map with the current user location and with the chosen delivery location 4221 as well as options for restaurants to choose from such as Starbucks 4222, McDonald's 4223, and Burger King 4224. After a user makes a choice the processing continues at FIG. 42C, wherein the cell phone display 4203 changes to a map with the current location a chosen pick up location, and a restaurant which for example was Starbucks in illustration 4230. The display includes a summary of the chosen restaurant with status information 4231 and illustrates options to choose ordering process as single 4232 or group 4233 order. Advertisement content 4234 is also illustrated. Continuing to FIG. 43A, a display 4301 shows a map which indicates the current user and deliverer location, pick up location and restaurant with an update on a group order starting 4310. The display offers ability to send request 4311, status of friends for a request 4312, a summary of users of the app nearby 4313 and an ability to set parameters for an order radius 4314. Continuing to FIG. 43B, a display 4302 shows a map which indicates the current user location, pick up location and restaurant with an update to the order status 4320. Information about the order status 4321 of users and the current organizer order 4322 with cost information 4323 or other pertinent order item information, with a dialog button to submit the order 4324. Proceeding to FIG. 43C, a display 4303 shows a message from the vendor 4330. An encrypted identification 4332 used for delivery pickup identification, a summary of the cost of the order 4333, as well as a count of the number of people in the group order 4334 or other group order information is illustrated.

GPS Combined Order Detail

Figure 44:
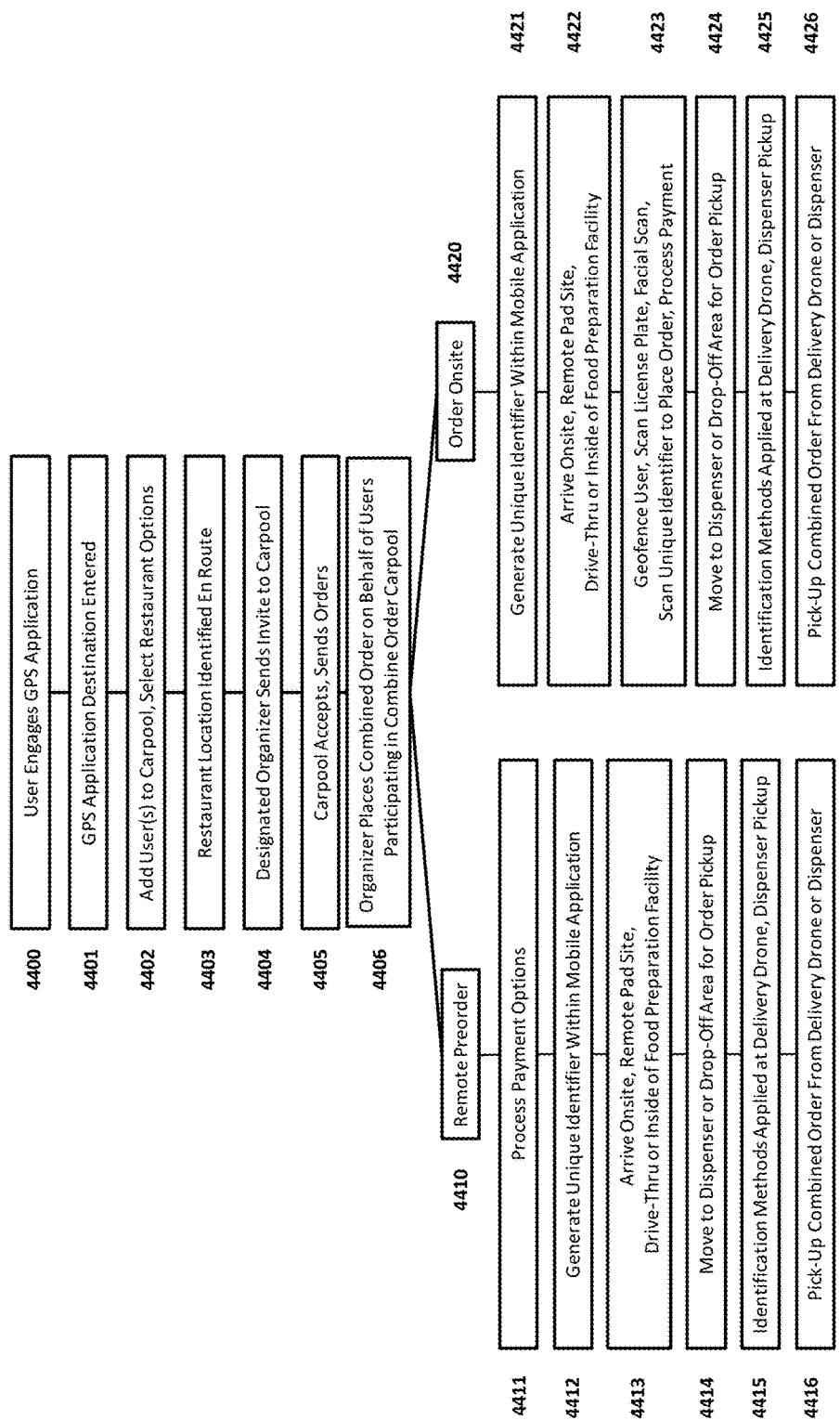
FIG. 44 illustrates aspects of GPS combined order processing.

Referring to FIG. 44, a user may engage a GPS application 4400 and subsequently enters in a destination 4401 within the application. Through wireless communication or in application features, the user may then elect to add a single or multitude of users to the carpool group 4402 within the application. Upon doing so, the user or group of users may select a single or several restaurants based on favorites, selections, and the like. Restaurant location may auto-populate and be identified en route 4403 as a potential selection for the group pool based on prior orders, favorites, social media interaction history, and the like. The driver of the vehicle in en route, a restaurant location or multiple locations may be identified, potentially by approximating the vehicle's distance and direction toward a restaurant radius or identifying a restaurant along a GPS suggested travel route the diver has taken, and a designated organizer may send an invite to a carpool 4404. Alternatively, desired orders may already be preselected and stored within the combined order pool based on the carpool sending order requests to an organizer or an organizer sending an invite to the carpool. For example, a driver may be approaching a highway exit and the application may notify the driver that two of the carpool's favored restaurants are within a specified radius of the approaching exit. At step 4405 the carpool may accept the organizer request and an order may be sent. A designated organizer of the group may elect to send a combined order 4406 for that particular restaurant, and either select drive-thru or inside pickup. In some cases, preselecting the combined order 4410 items may also have occurred, and the driver or organizer of the group just has to hit a send function to either queue the order or place the order with subsequent payment processing 4411.

The organizer may be the driver or another designated user within the vehicle, who may also order on the driver's behalf. The driver or any other user may grant an organizer the permission to order a specific item on their behalf or place an order limited to designated dollar amount or value to be applied toward any item. Alternatively, a single user or organizer may enter all order information, but may assign and match payment responsibility amongst the carpool's users, through numerous wireless communication methods, to specific orders within and in the combined order.

Once the users within the carpool combined order group accept participation, the organizer may then proceed to submit the order to a selected or proximate restaurant. Alternatively, said carpool ordering process may be queued and then automatically processed when proximate to a desired food preparation facility or offsite pickup/order location within or on a designated route. This may be done through GPS coordinates or geofencing the carpool. The application may notify when an organizer or carpool has been identified, and upon placing an order or having the order automatically processed by said GPS or geofence identification, the application may update the organizer or carpool on order status and dispenser pickup location. Additionally, a user may predefine or geofence a site they allow to always make orders on the carpool's behalf or as a single order outside of carpool flow. For example, the user may designate or create a specific geofence boundary to a location nearby their home or place of business. When an item is queued, and the user or carpool is identified, an order may automatically be placed, possibly upon user approval, when said user enters a predefined GPS coordinate or geofenced boundary area.

Similarly, the application may notify driver that one of their favorite restaurants is in proximity to them along a designated route. For example, Bluetooth identifies a user as they enter their vehicle and detects a direction the user is traveling. The application's algorithm may deduct that the user is heading home. Upon a certain distance or radius to a favored restaurant or entrance into a predefined geofence boundary, a query to order an item may populate. This can be based on many factors, such as time of day, traffic patterns, etc. The user may then continue to a dispenser pickup flow.

With reference to the carpool order, the order may be delayed and instead ordered onsite 4420 upon carpool arrival. If an onsite order method is selected, the organizer's application may generate a unique identifier 4421, which may feature encryption capabilities. As the carpool arrives onsite of a food preparation facility or a remote pad site 4422, identification methods may exist to submit the combined order and process payment for the carpool 4423. A single or combination of identification methods may be applied such as unique identifier scan, GPS location, geofencing, Bluetooth connection, near field communications, license plate scan, manual order identifier entry, facial scan, and the like. In some examples, the user may continue to pick up the combined order a standard drop-off area 4424 for order pick up, a drop-off area of a delivery drone or vehicle, or a dispenser location. Once arriving at the pickup location, a single or combination of additional identification methods 4425 may be applied such as unique identifier scan, GPS location, geofencing, Bluetooth connection, near field communications, license plate scan, manual order identifier entry, facial scan, and the like. Once successfully identified and matched with the combined order, the organizer or driver of the carpool may pick up the order from either a delivery drone drop-off zone 4426, autonomous vehicle, dispenser, human employee, and the like.

If the carpool elects to remotely submit an order 4410 to a selected location, the carpool may submit a remote pre-order. Then a combined order payment processing may be enacted. After payment is processed 4411, the organizer or driver's application will generate a unique identifier 4412, which may also have encryption capabilities. As the carpool arrives onsite of a food preparation facility or a remote pad site 4413, the carpool may move directly to the pickup location to pick up the combined order 4414. Said pickup location may be a standard drop-off area, a drop-off area of a delivery drone or vehicle, or a dispenser pick up location 4415. Once arriving at the pickup location, a single or combination of identification methods may be applied such as unique identifier scan, GPS location, geofencing, Bluetooth connection, near field communications, license plate scan, manual order identifier entry, facial scan, and the like. Once successfully identified and matched with the combined order, the organizer or driver of the carpool may pick up the order 4416 from either delivery drone drop-off zone, autonomous vehicle, dispenser, human employee, and the like.

Figure 45:
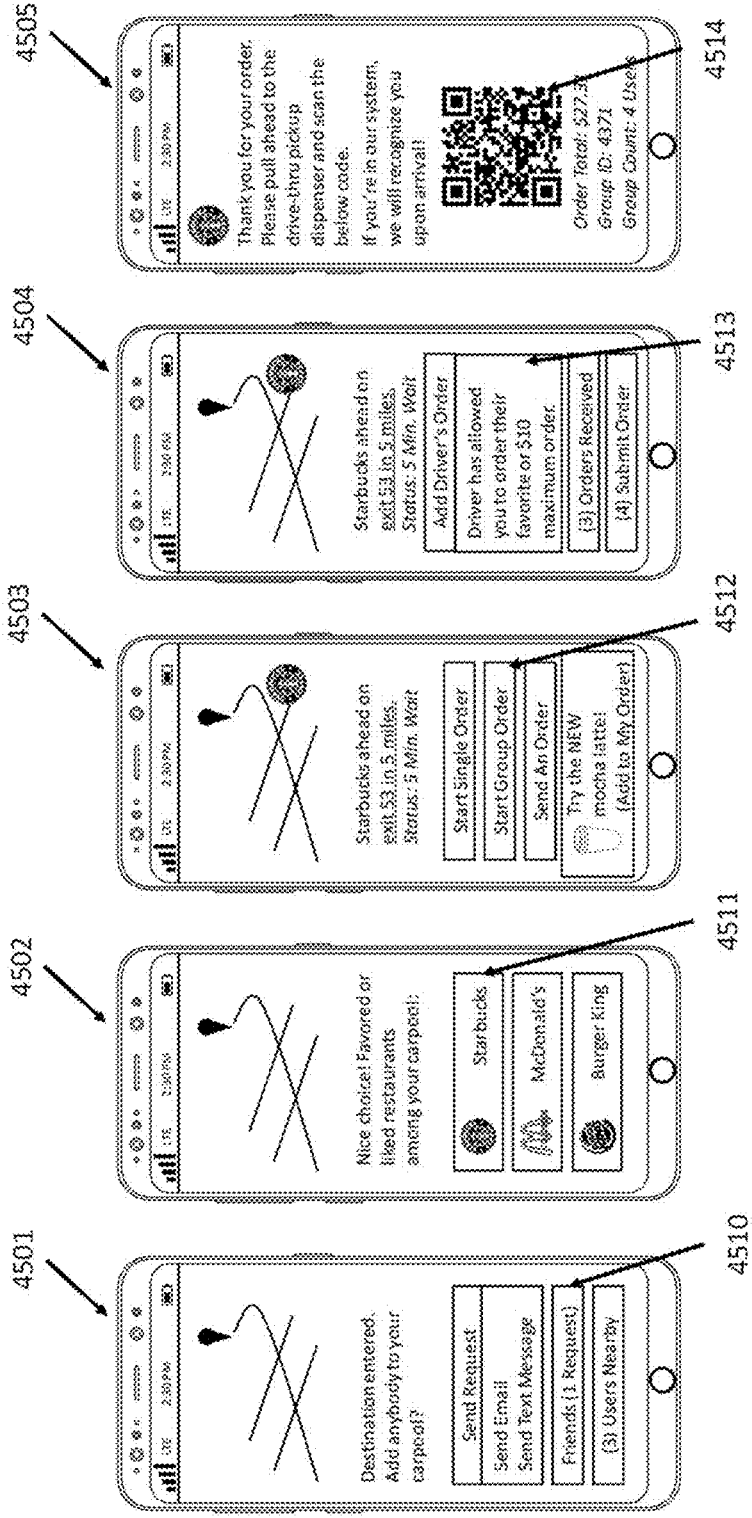
FIG. 45 illustrates aspects of ordering with multiple restaurants at an exit.

Referring to FIG. 45, a graphical depiction of display screens from a mobile device as it may be used in a combined order process with multiple restaurants at an exit. At screen 4501, a query is made asking a user whether they want to add anyone to their carpool. At 4510, in an example, the user may select a friend from his database, identifying a nearby user through wireless communication, searching users through an application database, and the like. Proceeding to screen 4502, the system may respond to the organizer's added carpool members and display favored or liked restaurants from the various participants in the carpool. At 4511 the user may select one of the restaurants, for example Starbucks, or even decide to select all restaurants as preference to be identified as a potential selection when the carpool is en route. Proceeding to screen 4503, a status of the current location may be depicted on a mapping application that also shows the selected reference with status information such as the distance the current location is away from Starbucks. The user may be queried whether they want to start a single order that may normally take place outside of a combined carpool order flow, or the organizer may continue with a group order 4512. Restaurant status options and corresponding restaurant franchise advertisements that may be converted to orders may also be displayed. The system may next proceed to screen 4504, where a message relating to configuration parameters on the group order for the user may be displayed 4513. In some examples, at screen 4505 the system may have received a completed order sent to the proximate restaurant by the various methods as have been discussed herein. The system may provide both status and directions for the group to proceed to receive their order. An encrypted identification code 4514 or ID number may be provided to the user to provide identification at a pick-up location. The organizer may select a desired pick up selection before placing the order such as inside the store or at the drive-thru dispenser.

Combined Order Detail

Figure 46:
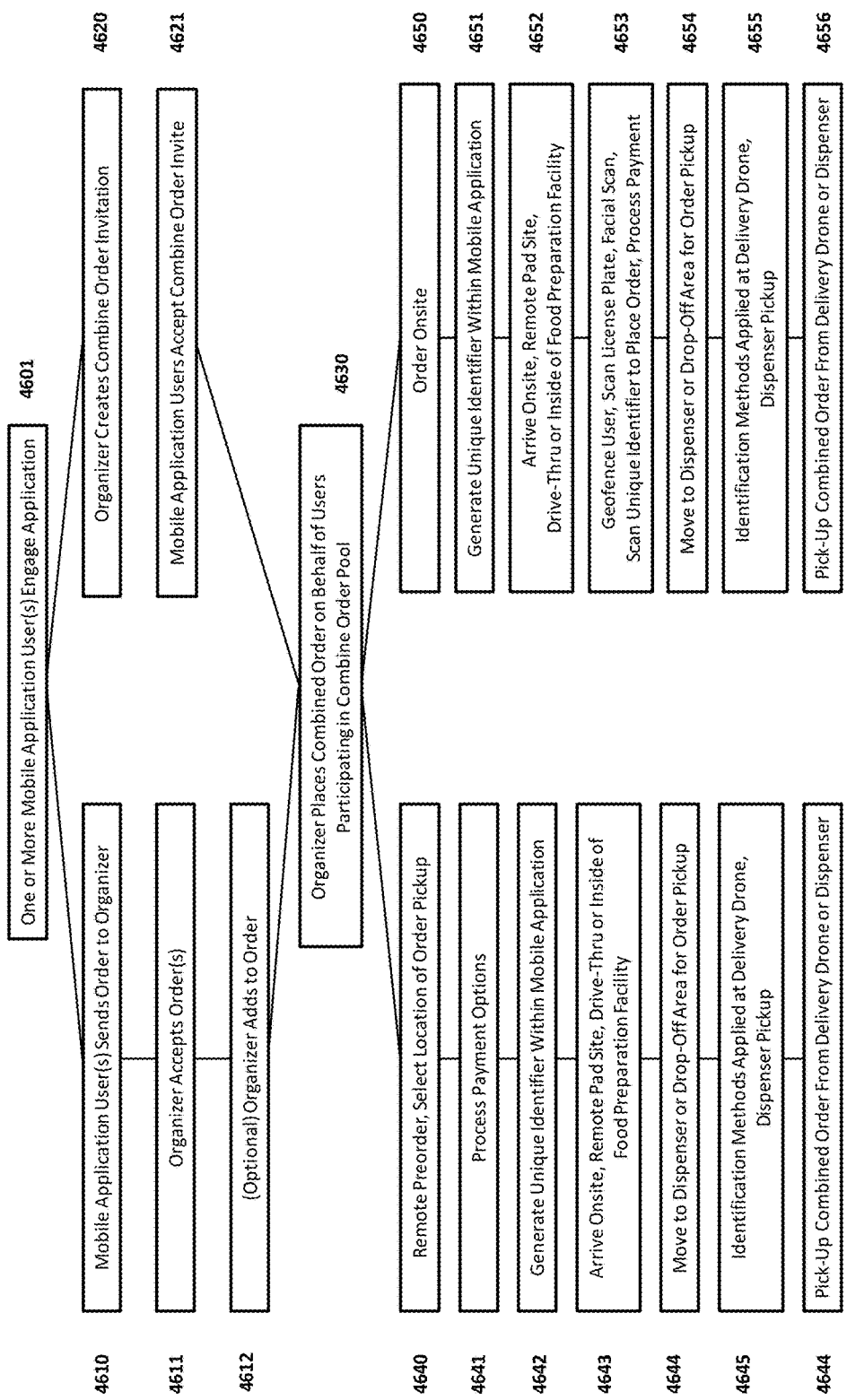
FIG. 46 illustrates details of combined order processing flow.

Referring now to FIG. 46, one or more users may engage a mobile application 4601. In one instance of initiating a combined order, a mobile application user may send to an organizer 4610, through wireless communications such as text message, email, Bluetooth, near field communication, in-app friends, social media, geofence identification, and the like, a desired order to share or a request to pay. The organizer may accept such a request 4611. Optionally, an organizer may choose to participate in placing an order 4612, sharing in the order payment, or a combination of the two. The organizer may then place a single order and payment on a user's behalf or a combined order and payment on the group's behalf for the combined order pool 4630.

Alternatively, an organizer may create a combined order invitation 4620 to one or more mobile application users. The combined order invitation may be a requested payment to participate in placing a food order, an order submittal by one of the invited users, or a combination of the two. The invitation may be sent through wireless communications such as text message, email, Bluetooth, near field communication, in-app friends, social media, geofence identification, and the like. A user may accept the combined order invite at step 4621.

The organizer may then continue to place a combined order on behalf of other users participating within the combined order pool. The organizer may have a choice of how to place a combined order such as placing a preorder and selecting a location of the order pickup 4640. Another method of how to place a combined order may be to wait to place the order onsite 4650 upon the onsite arrival of the organizer at either a remote pad site or at a food preparation facility.

Upon the submission of a preorder, all payment options may be processed, 4641 and the respective, corresponding parties may be charged for their portion of the combined order. The organizer's application may generate a unique identifier 4642, which might also include encryption capability. As the organizer arrives onsite of either a food preparation facility or a remote pad site 4643, the organizer may move directly to the order pickup location 4644 to pick up the combined order. Said pickup location may be a standard drop-off area, a drop-off area of a delivery drone or vehicle, or a dispenser pickup location 4644. Once arriving at the pickup location, the user may be identified using one or more identification methods 4645 such as unique identifier scan, GPS location, geofencing, Bluetooth connection, near field communications, license plate scan, manual order identifier entry, facial scan, and the like. Once the user is successfully identified and matched with the combined order, the organizer may pick up the order 4646 from either delivery drone drop-off, autonomous vehicle, dispenser, human employee, and the like.

Once the organizer submits an onsite order 4650, the organizer's application may generate a unique identifier 4651, which might also include encryption capability. As the organizer arrives onsite of either a food preparation facility or a remote pad site 4652, identification methods may exist to submit the combined order and process payment for the combined order pool. One or more identification methods may be applied such as unique identifier scan 4653, GPS location, geofencing, Bluetooth connection, near field communications, license plate scan, manual order identifier entry, facial scan, and the like. The organizer may continue to pick up the combined order from typical flow such as a standard drop-off area 4654, a drop-off area of a delivery drone 4655 or vehicle, or a dispenser location. Once arriving at the pickup location, a single or combination of additional identification methods may be applied such as unique identifier scan, GPS location, geofencing, Bluetooth connection, near field communications, license plate scan, manual order identifier entry, facial scan, and the like. Once successfully identified and matched with the combined order, the organizer may pick up the order from either delivery drone drop-off 4656, autonomous vehicle, dispenser, human employee, and the like.

Geofence Order Detail

Figure 47:
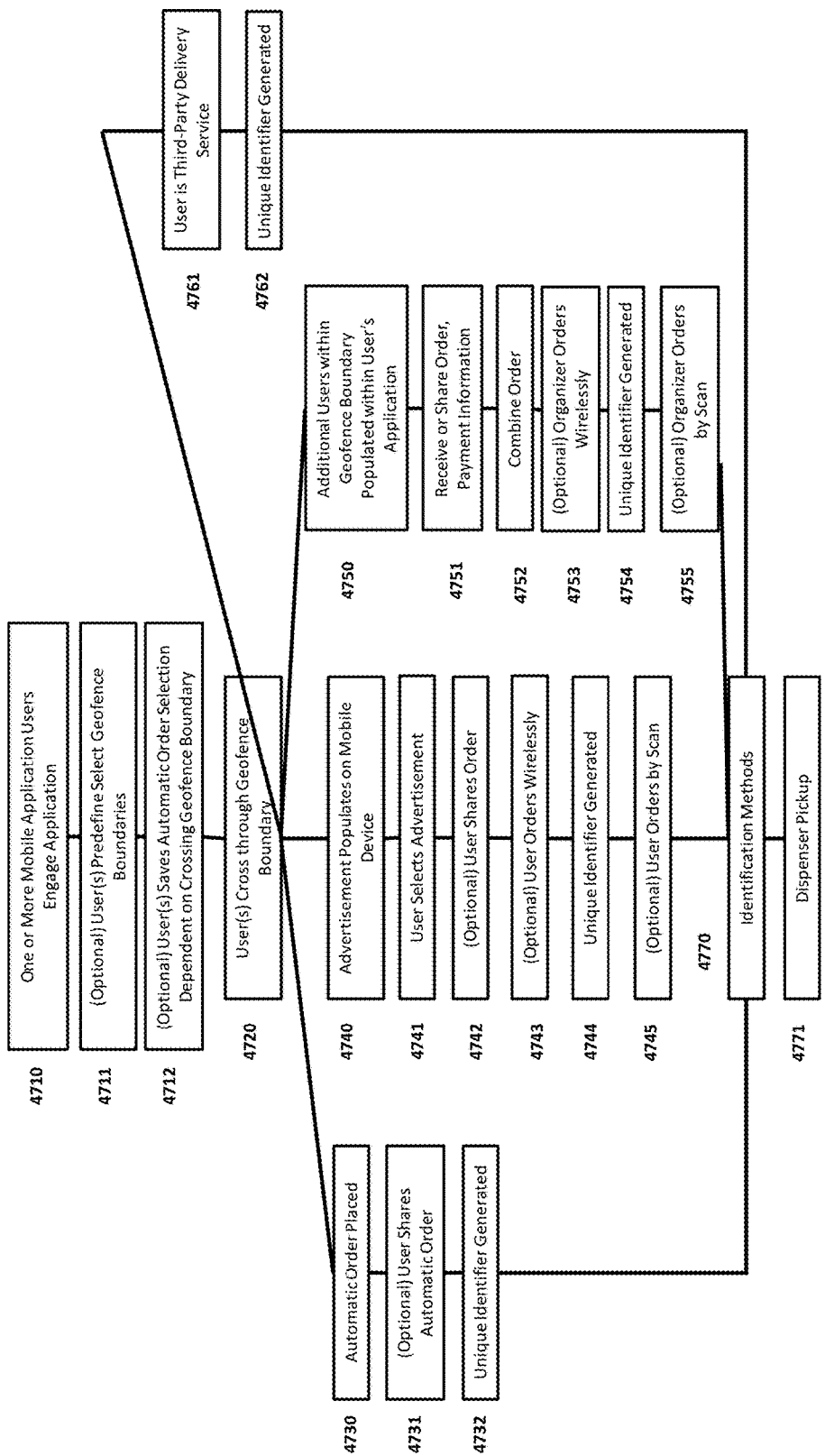
FIG. 47 illustrates aspects of Geofence order processing.

Referring to FIG. 47, one or more mobile application users may engage the application 4710. Upon doing so, a user may elect to predefine a certain geofence boundary 4711 that may lead to an order flow from the user based on the user crossing through said geofence boundary. The user may predefine a geofence boundary by either manually drawing a boundary or either selecting from a subset of boundaries given to the user. The user may give conditions to the boundary to activate, enact, or command an order flow from the user. Said conditions may be criteria contingent on time of day, proximate location to a highway exit, day of the week, balance of funds in an account related to the application, temperature outside, the user's social media activity, and the like. Multiple criteria may be applied to the selection or activation of said geofence boundary. These criteria may also apply to or limit all existing, standard geofence boundaries in use by the application or applied by another user. A user may save an order to the application, which may have permission to automatically make an order. The application may submit an order upon a user crossing any geofence boundaries or in some examples just a preselected geofence boundary. The application may default to, or a user may also set a radius outside of the geofence boundary to begin an automated order process flow. Again, an order may be limited to or constricted to one or more multiple criteria such as on time of day, day of the week, balance of funds in an account related to the application, temperature outside, the user's social media activity, and the like. Much like orders, user's may share geofence boundaries or combine a geofence boundary with an order and set limiting factors on said order that depends on said geofence boundary.

As the user crosses through a geofence boundary 4720, multiple actions may occur. If there is an automatic order which was saved or queued within the user's application, the application may automatically place that order when the user crosses the geofence boundary 4712. The user may be notified of this geofence boundary crossing even and be queried to elect to proceed or cancel the automatic order. The user may also specify the order or pickup location of said automatic order. The user may select to share an automatic order 4731. In some examples, the user may also determine associated user payment information with another user instead of placing the order by one's self. If the user continues to place the automatic order 4730, a unique identifier 4732 may be generated for identification purposes 4770 upon order pickup 4771.

An advertisement may populate on a user's application 4740 upon entry of a geofence boundary. Subsequently, a user may select said advertisement 4741 for order processing. Optionally, the user may elect to share the advertisement with another user 4742 to place an order on the sending user's behalf. In some examples, the user may place an order remotely. If so, the user may select a desired pickup location and payment processing may take place after wirelessly submitting the order. A unique user identifier 4744 may be generated within the application and corresponds to user's order. Alternatively, to placing the order wirelessly 4743, the user may elect to instead scan the unique identifier 4745 onsite of the current location to both process and send the order, and to submit payment processing. Following either order flow, the user may continue to identification methods 4770 upon order pickup 4771.

Additional users may be added to a group user process on the user's application 4750 based on those additional users also entering a geofence location concurrent to the user's arrival. The users may interact in either receiving or sharing one or more of user information, order information, and payment information 4751. An organizer may combine a shared order 4752 and continue to send the order wirelessly 4753, and potentially designating a pickup location. A unique user identifier 4754 may be generated within the application and correspond to the organizer's combined order. Alternatively, instead of placing the order wirelessly, the organizer may elect to scan 4755 the unique identifier onsite of the current location to both process and send the order, and to submit payment processing. Following either order flow, the organizer may continue to identification methods 4770 upon order pickup 4771.

A third-party delivery service 4761 may cross into a geofence boundary and be identified as such. Crossing into a geofence boundary may also be done so without predetermination of a delivery vehicle, signaling that an order is ready for pickup and the system decides that said delivery vehicle may pick up the order and continue with delivery processes of said order. Further delivery instructions may be given to the delivery vehicle through onboard systems or a mobile application upon delivery vehicle's geofence boundary entry. Upon entry and identification as a third-party service provider, a unique identifier may be generated 4762 within an application controlled by the third-party delivery service. Said unique identifier may correspond with a user's order onsite of the geofenced location and may have been matched to said third-party delivery service before or during entry to the geofenced location. The third-party delivery service may continue to identification 4770 and subsequent order pickup 4771.

Figure 48:
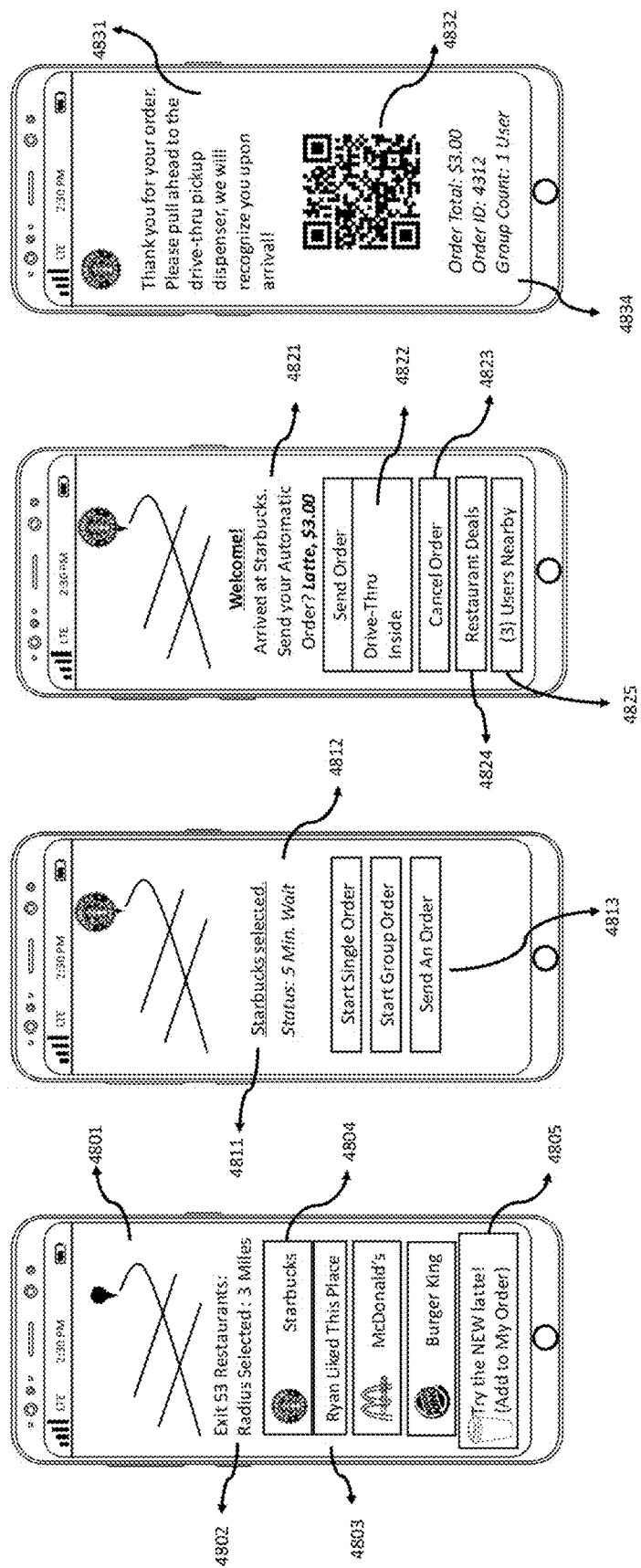
FIG. 48 illustrates aspects of mobile device geofence ordering.

Continuing to FIG. 48, GPS location tracking 4801 or geofence locations may exist proximate to highway exits, landmarks, popular intersections, city centers, and the like. When traveling, a single user or group of users may enable the application to continuously update and search for restaurant locations, status, deals, ratings, and the like. A restaurant 4804 may be displayed on the application as the user is in transit on foot or in a vehicle. The user may elect to apply conditions or restrictions on such updates or restaurant selection such as radius 4802, time of day, day of the week, balance of funds in an account related to the application, temperature outside, the user's social media activity, and the like. One or more filters or restrictions may be applied. For example, a friend of a social media application 4803 may have recently eaten at a certain restaurant and left a positive review. Said restaurant 4804 may be within the 3-mile radius 4802 set by the user and may be placed at the top of the application selection screen. The user may continue to select that restaurant 4811, click on an advertised deal 4805, or subsequently manually participate in order options 4813 such as sending the order to another user or starting a single or group order. The user may be recognized as they enter a geofence location and an automatic order 4812 saved by the user may populate and queue for submittal. The user may send the order wirelessly and select a drive-thru or inside pickup location 4822. A status 4821 of detecting arrival at the geofence may be provided through the mobile interface. The user may cancel the automatic order 4823, select an order from restaurant deals, coupons, or other advertisements 4824, or may connect or share order, user, or payment information with other users nearby 4825 either within the same geofenced area, within the radius set by the user, and the like. Once an order is submitted, a notification 4831 may populate on the user's application directing them to the pickup location. A unique identifier 4832 may populate in order to pick up the order if the user is not automatically recognized in the system upon pickup. Other order details 4834 may populate as well.

Geofence Site Overview

Figure 49:
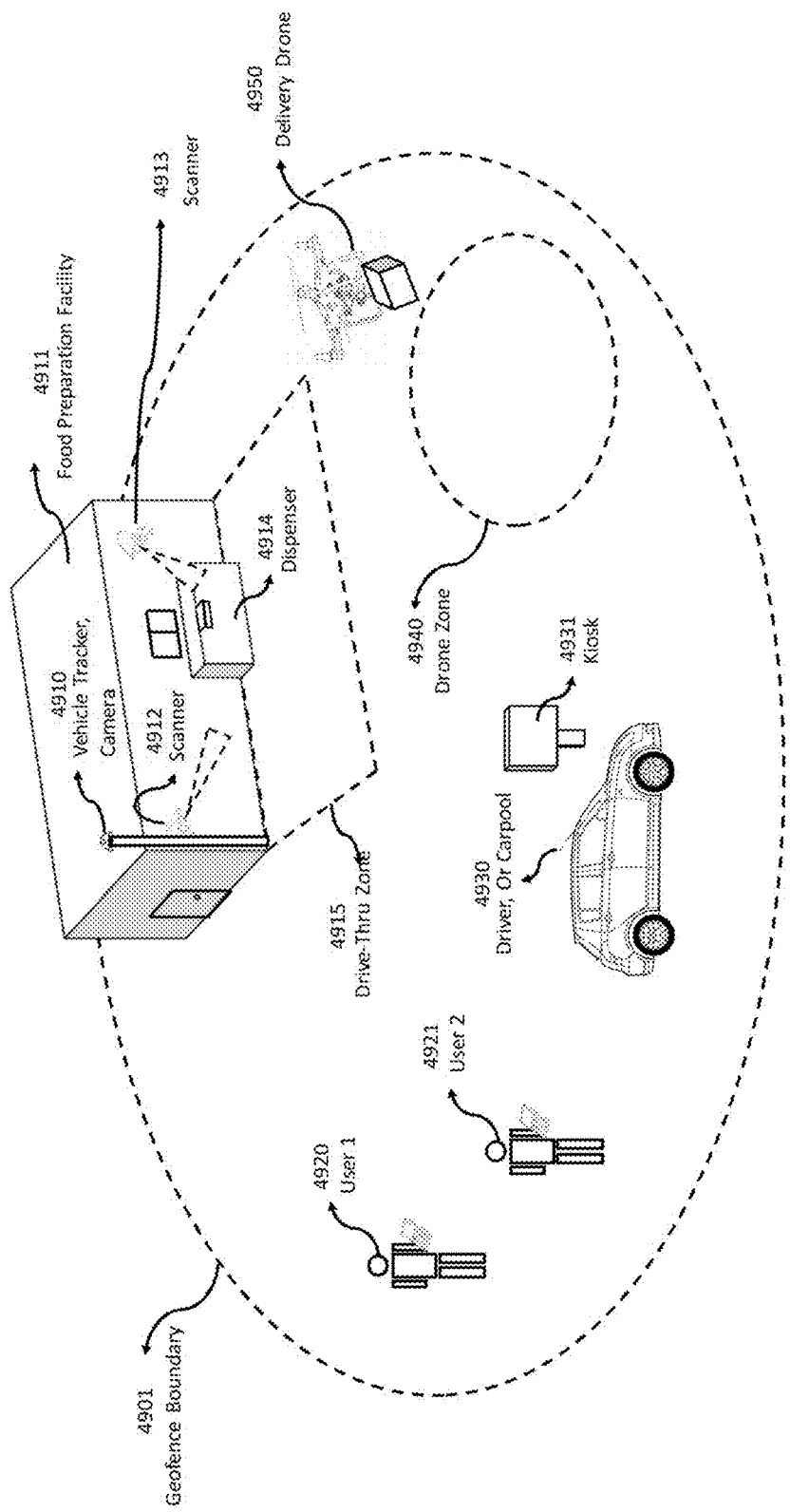
FIG. 49 illustrates an overview of a Geofence Site example.

Referring to FIG. 49, multiple users such as "user 1" 4920, "user 2" 4921, and a driver or carpool 4930, may enter into the geofence boundary 4901 onsite of a food preparation or offsite of a food preparation facility 4911, such as a remote pad site. Entrance to the geofence boundary may enact several order-related commands. These commands may range from but are not limited to automatically placing an order, sharing an order with another customer, notifying the user to connect to a dispenser, restaurant, and the like, or generating an advertisement within a user's application. A combination of said commands may exist. A vehicle tracker or camera 4910 may track a driver or carpool 4930 and cross-reference said driver or carpool's information with identification provided from crossing the geofence boundary. The identification of driver or carpool through crossing a geofence boundary may enable the user to confirm an order at a kiosk 4931, or automatically place an order, which may require user approval, and continuing on to the dispenser 4914. The vehicle tracker or camera 4910 may receive identification information that the driver and carpool is onsite by way of crossing the geofence boundary, track the vehicle to the dispenser pickup 4939, and cross-reference with a scanner or license plate scanner 4912 that the driver or carpool is at the dispenser, their order is ready for pickup and that payment has been received. The process may then allow the dispenser 4939 to dispense food order to driver or carpool 4930 by the cross-referenced information. Additional subsections or layers of geofence boundaries, such as a drive-thru zone 4915 or drone drop-off zone 4940, may exist within a larger overlapping geofence boundary 4901. Upon crossing said zones or sub-boundaries, actions or commands may enact based on the user being identified by the initial or larger geofence boundary 4901. Upon the user crossing into the drone zone 4940, a drone may be dispatched to receive or place an order, dependent on the nature of the user within the particular zone. Upon the user crossing into the drive-thru zone, an order may be placed or the dispenser 4939 may be queued to deliver or receive based upon the user's arrival in said zone. A user being identified by either outside geofence boundary 4901, the drive-thru zone 4915, or drone zone 4940, may be a human customer, a driver or carpool of a manned vehicle, an autonomous vehicle, a delivery drone, or a third-party delivery service. An additional scanner 4913 may be onsite that may work in conjunction with the aforementioned identification methods or may provide assistance to the dispenser 4939.

Gyroscope Overview

A bin of varying shapes and sizes may exist and contain a gyroscopic feature so that in the case of movement, the prepared item container may remain significantly upright and secure. Dispensers may contain a multitude of bins that include this gyroscopic feature inside each bin. Upon identification of a user, the dispenser may move said bin containing gyroscopic feature in any direction to transfer one or more prepared food items to the identified user. The bin gyroscopic features may be included within dispensers located either offsite or onsite of a food preparation facility.

Figure 50:
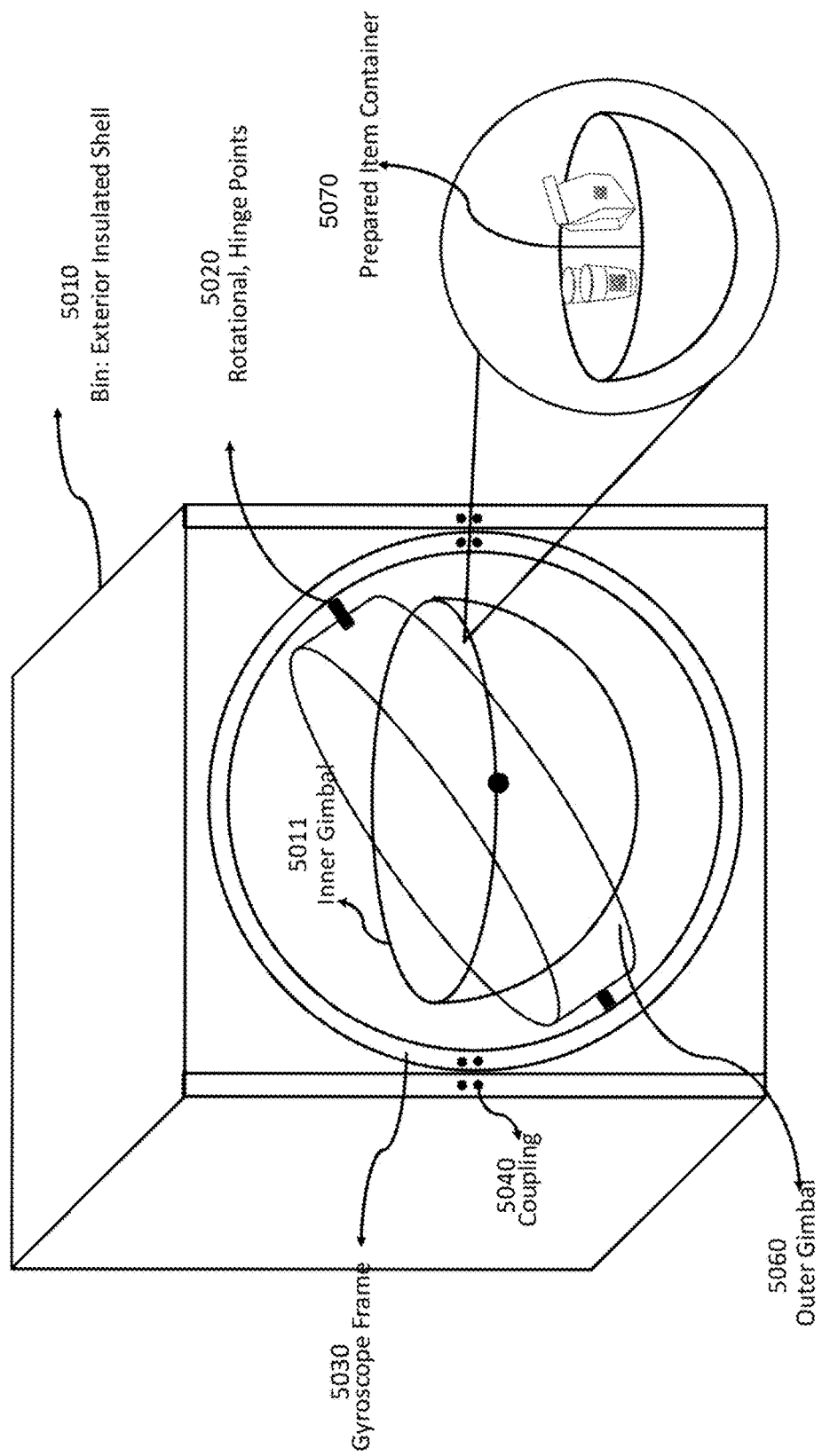
FIG. 50 illustrates examples of a gimbal system in a dispenser pod.

Referring to FIG. 50, an which highlights many functions or features of a gyroscopic bin is illustrated. The gyroscopic bin may include an exterior or shell 5010, which may have insulation features or qualities. The bin exterior may have a sliding door, lathing door, opening, or any other moveable component to allow the user to reach inside of a bin and collect prepared items from within the prepared item container 5070. The prepared item container may include all features of a bin previously discussed, such as designated areas for hot and cold areas, cup holders, insulation qualities, designated bag holders, and so on. The exterior of the prepared item container may also serve as the inner gimbal of the gyroscope, which may connect to the outer gimbal 5060 through rotational, hinge or pivot points 5020, which may allow the gyroscope's pieces to individually move and keep the prepared item container or inner gimbal 5011 upright. The outer gimbal may also connect to the gyroscope frame 5030 via rotational, hinge or pivot points 5020. The gyroscope frame may be attached to the exterior bin or bin shell 5010 through similar hinge points of the gimbals, to allow slight movement, or through a coupling 5040. Said coupling ma keeps the gyroscope frame in place and move with the bin or exterior shell and keep all components intact and in-place.

Detail of Bin/Pod Movement, Gyroscopic Features

Variations of individual bin or pod movement may exist. Such movement may be isometric up and down, pick or place, rotational, Ferris wheel, conveyer belt, carousel, and the like. The bin or pod structure may include a gyroscopic exoskeleton, arm, or container which may house or hold each individual bin or pod. Such is the case that enables the individual pod or bin to move freely and limit spilling of drinks, soups, food items, and the like. When moving on an automated track, the gyroscopic feature helps each individual bin stay upright and secure.

Encryption Overview

A number of the systems and parties discussed herein will use encryption technology to encode, encrypt, share, decrypt, identify, and process information necessary to placing and fulfilling a food order or delivery and for payment and personal identification information handling. Participating parties may include an organizer, user, restaurant or food preparation facility, remote facilities, third-party food delivery services, delivery vehicles, order kiosks, food dispensers, and the like.

In some examples, the core encryption model used between some or all nodes may be Public Key Cryptography with Digital Signatures. A Digital Signature may be generated for each data exchange along with the encrypted data. In some examples, the receiver may verify the digital signature before decrypting the data and processing anything further. Both private and public keys may be used in the encryption and decryption process. Such processing may utilize asymmetric cryptography or encryption. In some examples, digital signatures being used in encrypting data may be practiced. In some other examples, either a single use or combination of public or private keys may be used to encrypt data, and subsequently decrypt said data. In lieu of a digital signature discussed herein being created utilizing a private key, a public key may also be used to encrypt pertinent information being sent or shared. A private or public key may correspond to the desired encryption method to then decrypt said pertinent information and verify the data being sent.

Several different types of encryption algorithms and methods may be used to facilitate the encryption and decryption process such as, but not limited to, RSA Encryption, the Advanced Encryption Standard (AES), Quantum Key Distribution/Encryption, Blockchain Technology, JSON Web Token (JWT) Authentication and the like.

A unique identifier or means of identification may represent encrypted user, order, and payment data and decrypt said data based on successful identification methods. A system may store encrypted user, order, and payment information within a unique representation such as a unique identifier, biometric representation, license plate, and the like. Said encrypted information may be linked to a user account and translated, communicated, decrypted, and processed based on successful identification methods such as identifier scan, facial scan, geofencing the user, license plate scan, and the like.

Invite Order Flow Encryption

Figure 51:
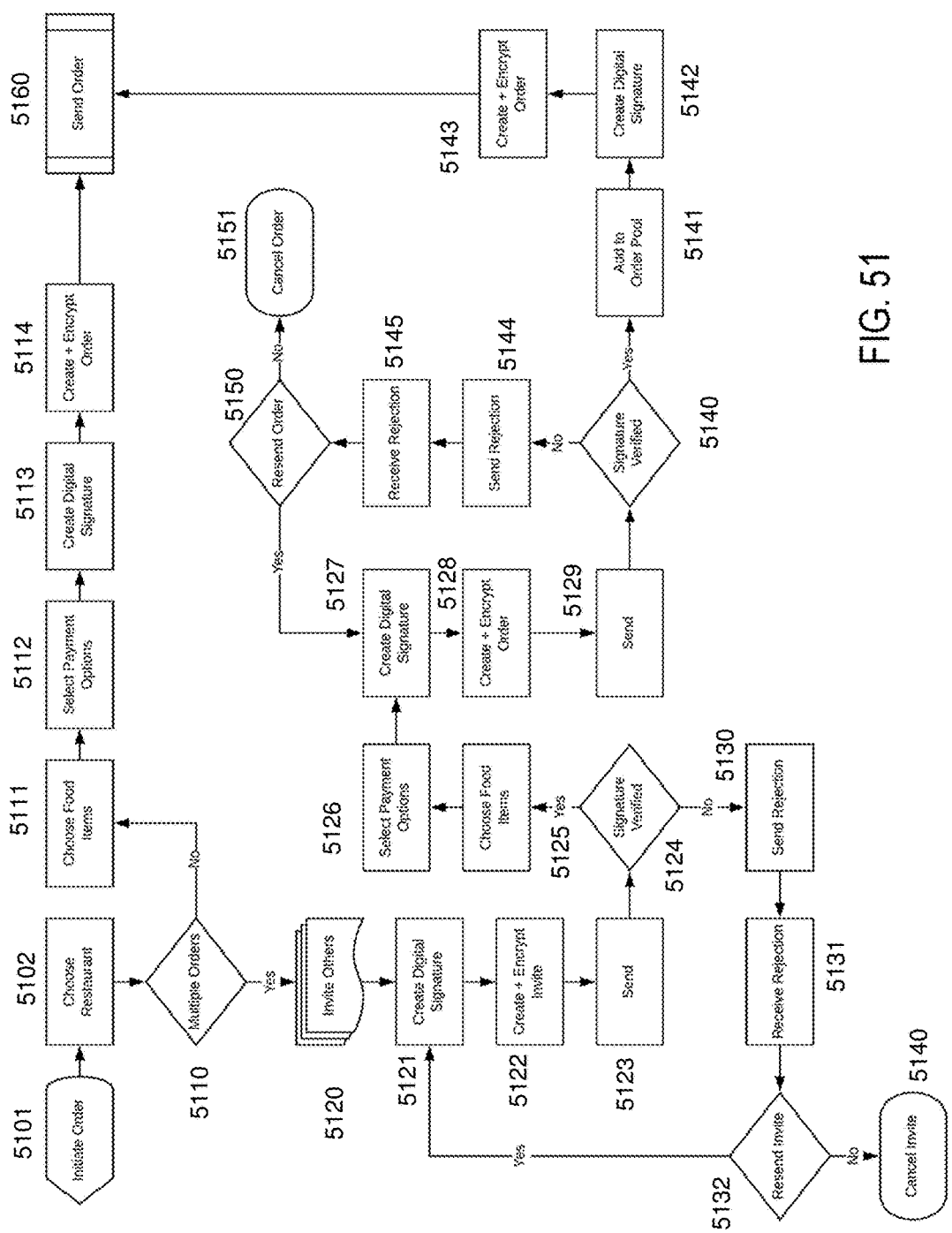
FIG. 51 illustrates aspects of an invitational order flow.

Referring now to FIG. 51. An organizer may initiate an order 5101, possibly within a mobile application, and selects a restaurant 5102. The organizer has an option to either invite one or more users 5120 into a combined order pool for multiple orders 5110 or continue with a single order. If the organizer decides to continue with a single order, the organizer may select the desired food items 5111 and select a payment method 5112. After the organizer selects food and payment options, the order is digitally signed 5113, encrypted 5114, and submitted 5160 to the respective parties such as a food preparation facility, location remote to a food preparation facility, or a third-party delivery service.

The organizer may create a new order pool of multiple orders 5110 and invite users 5120 through wireless communication to said combined order pool. Each invitation may be digitally signed 5121 and encrypted 5122. Once the invitation is sent 5123 to a desired user, said user may then verify the digital signature 5124 and may either accept or deny the invitation. If the invitation is denied by the user or the signature verification is rejected 5130, the organizer may receive notification of said rejection 5131, choose to resend the invitation 5132 and recreate another digital signature 5121 or if the organizer does not choose to resend the invitation, the organizer may cancel the invitational altogether 5140.

Upon accepting an organizer's combined order invitation, the user may choose food items for their order 5125 and select a payment method 5126. Once the user's selections are complete, a digital signature 5127 is created for the user's order and the order is encrypted 5128 before sending the order back to the organizer 5129.

The digital signature may be verified and if successful, the order is placed into the order pool 5141. If the order's signature verification is rejected 5144, the user may receive notice of the rejection 5145 and choose to resend the order 5150. If the user chooses to resend the order, a new digital signature may be created 5127, otherwise, the user may cancel the order 5151.

The order invitation, digital signature encryption, and order sharing action may take place take place for several users. The organizer may also place an order within the combined order pool. Once all orders are within the order pool 5141 and the organizer finalizes the order, a digital signature is created 5142 for the order pool and the combined order is encrypted 5143 before being sent 5160 to the respective restaurant or food preparation facility, location remote to a food preparation facility, or any other participating parties such as a third-party delivery service and the like.

Share Order Flow

Figure 52:
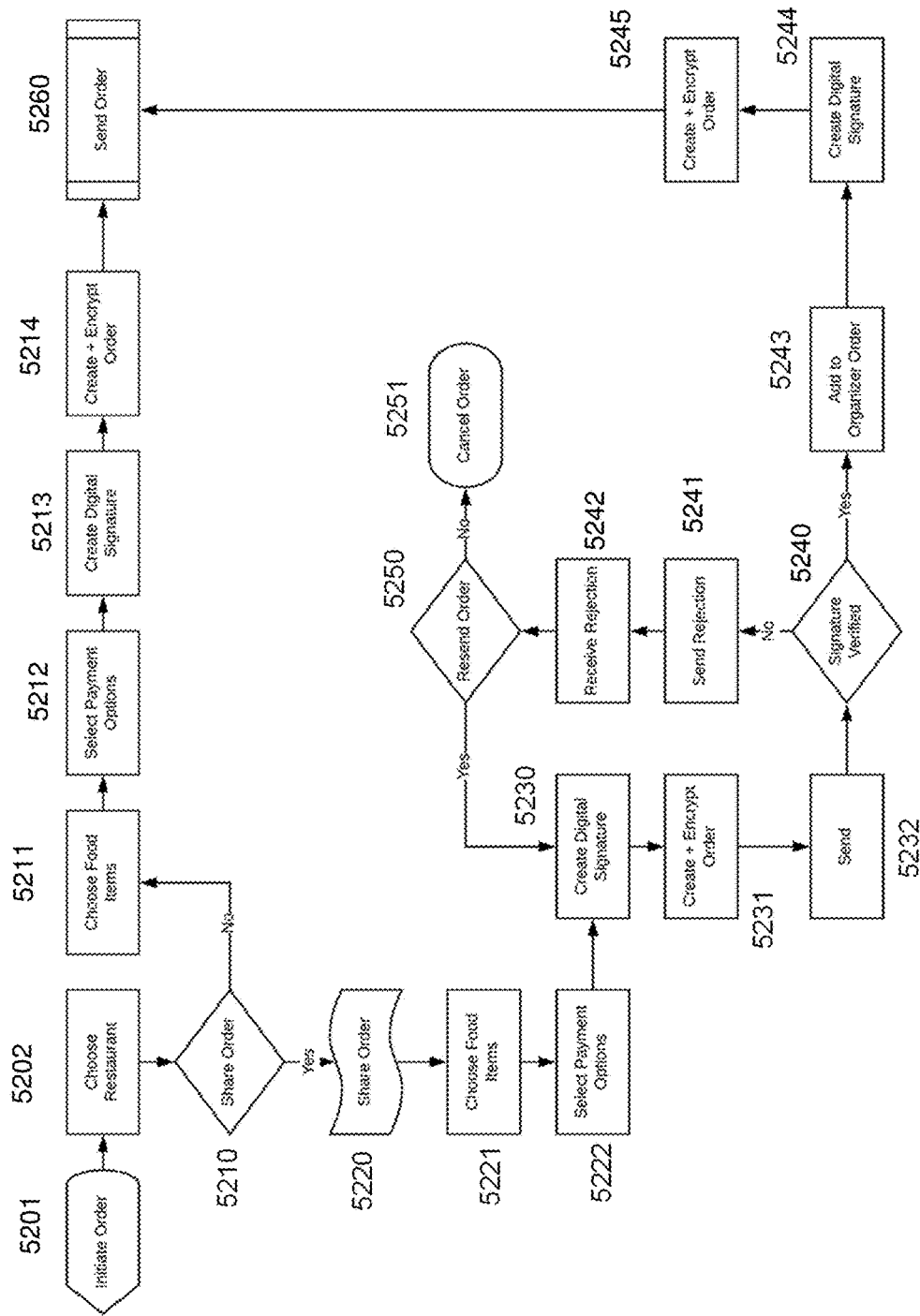
FIG. 52 illustrates aspects of a shared order flow.

Referring to FIG. 52, a user may instead submit an order to an organizer independent from an order invitation from said organizer. A user may continue to submit a single order (with steps 5211,5212, 5213 and 5214), similar to the invite order flow previously discussed; however, this time the user may send or share an order 5220 directly to an organizer without having been invited to a combined order pool. This may be done so through wireless communication. A user may initiate an order 5201 select a restaurant 5202, and then designate a user or friend to share an order with 5210. A user may then select desired food items 5221 and payment options 5222. Note that restaurant, food, and payment selections may occur either before or after an organizer recipient has been selected. Once a user has finalized their restaurant, food, payment, and organizer selections, a digital signature may be created 5230 for said order and the order is encrypted 5231 before being sent 5232 to the organizer.

The digital signature may be verified by the organizer 5240, who may either accept or deny the user's shared order. If the order is accepted, the order is added to the organizer's order 5243. The organizer may choose to add to the order, create a subsequent combined order pool with additional users, or may continue to order on behalf of the first user.

If the user's digital signature is not verified by the organizer and a rejection is sent 5241, the user may receive notice of the rejection 5242 and choose to resend the order 5250. If the user chooses to resend the order, a new digital signature may be created 5230, otherwise, the user may cancel the order 5251.

Once the organizer approves and finalizes the order, a digital signature is created 5244 and the order is encrypted 5245 before being sent 5260 to the respective restaurant or food preparation facility, location remote to a food preparation facility, or any other participating parties such as a third-party delivery service and the like.

Restaurant Flow

Figure 53:
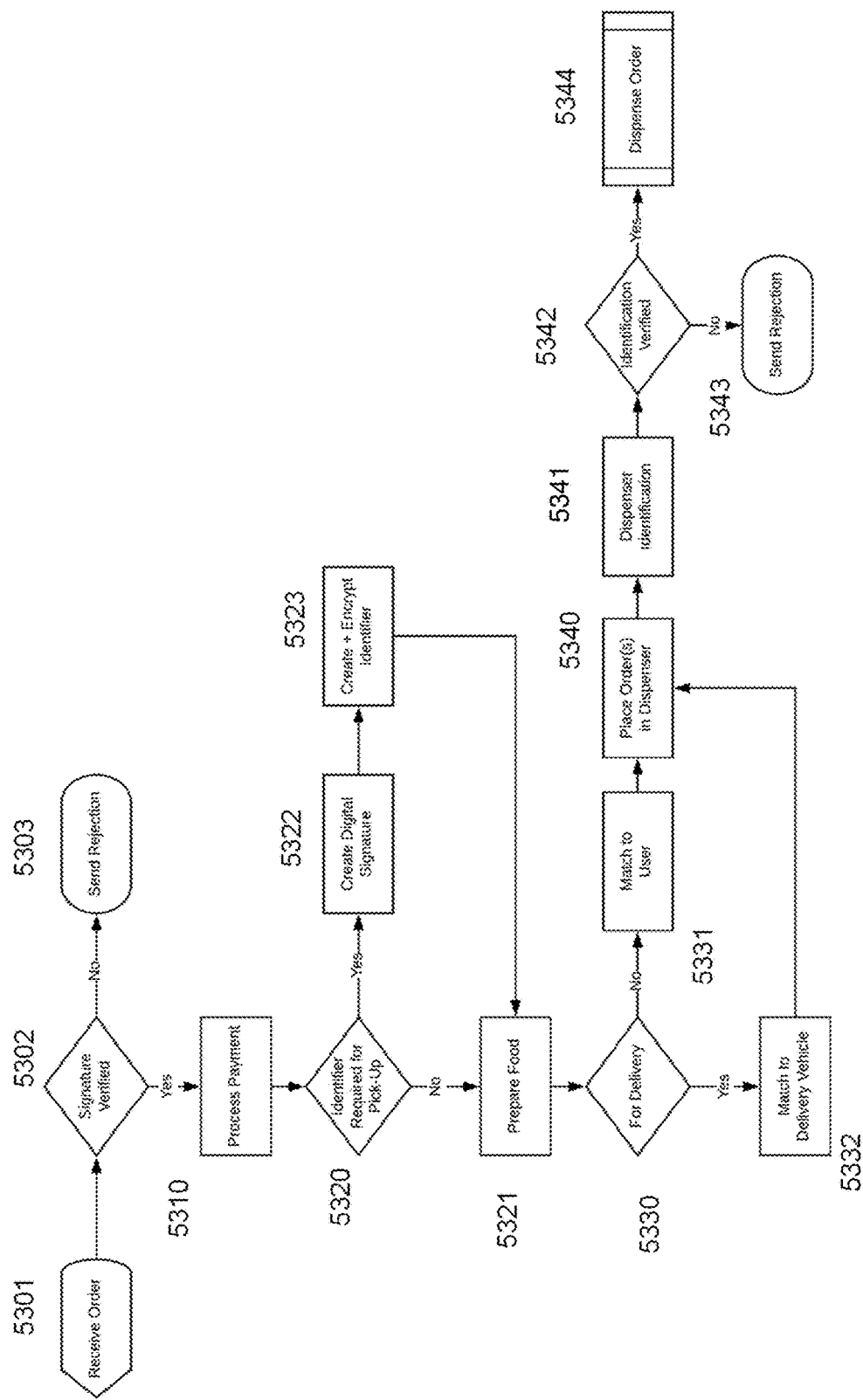
FIG. 53 illustrates aspects of a restaurant-based order flow.

Referring to FIG. 53 an exemplary restaurant flow is illustrated. A restaurant or food preparation facility may receive an encrypted order 5301 from an organizer or user with attached digital signature. The digital signature may be verified 5302 and the order is either accepted or rejected. If the order is rejected, then the process may send a communication about the rejection 5303. If the order is accepted and verified, payment may be processed 5310 and based on systems in-place, an identification or identifier may be required for order pick-up 5320. If an identification method is required for order pick-up, a digital signature may be created 5322 for the order and encrypted 5323 for verification at pick-up. Said encryption may take the form of an identifier such as a QR code and the like. For instance, a kitchen employee may place an encrypted identifier onto a food item or match a dispenser's bin with an encrypted identifier to be verified and decrypted upon user pick-up. Said identifier may match the user's encrypted identifier used for pick-up. Food preparation 5321 may begin after payment is processed and, if necessary, an encrypted identification may be associated with an order. The identifier itself may or may not need to be encrypted. If an order is for delivery 5330, a delivery service or delivery vehicle may be selected and matched to the order 5332. A request may be sent to a driver or vehicle with digital signature and encryption used for order identification at order pick-up. If an order is not for delivery, but instead is for user pick-up, a user may be matched to the prepared order. Similar to a third-party delivery, a user may receive a digitally signed and encrypted identification for pick-up identification and order matching. Once the food is prepared and matched to the appropriate user or delivery for pick-up 5331, it may be placed in a dispenser 5340 for pick-up. An update may be generated, encrypted, and digitally signed before being sent to delivery driver or organizer for pick-up. Upon user or third-party delivery arrival at the dispenser, identification actions may exist 5341, such as scanning a unique identifier or scanning a user's license plate, at said dispenser to verify the digital signature of the order 5342. Upon successful identification, the order may be dispensed 5344 to the user or third-party delivery service for pick-up. If the digital signature is not verified by the identification methods at the dispenser, a rejection may be sent 5343.

Third-Party Flow

Figure 54:
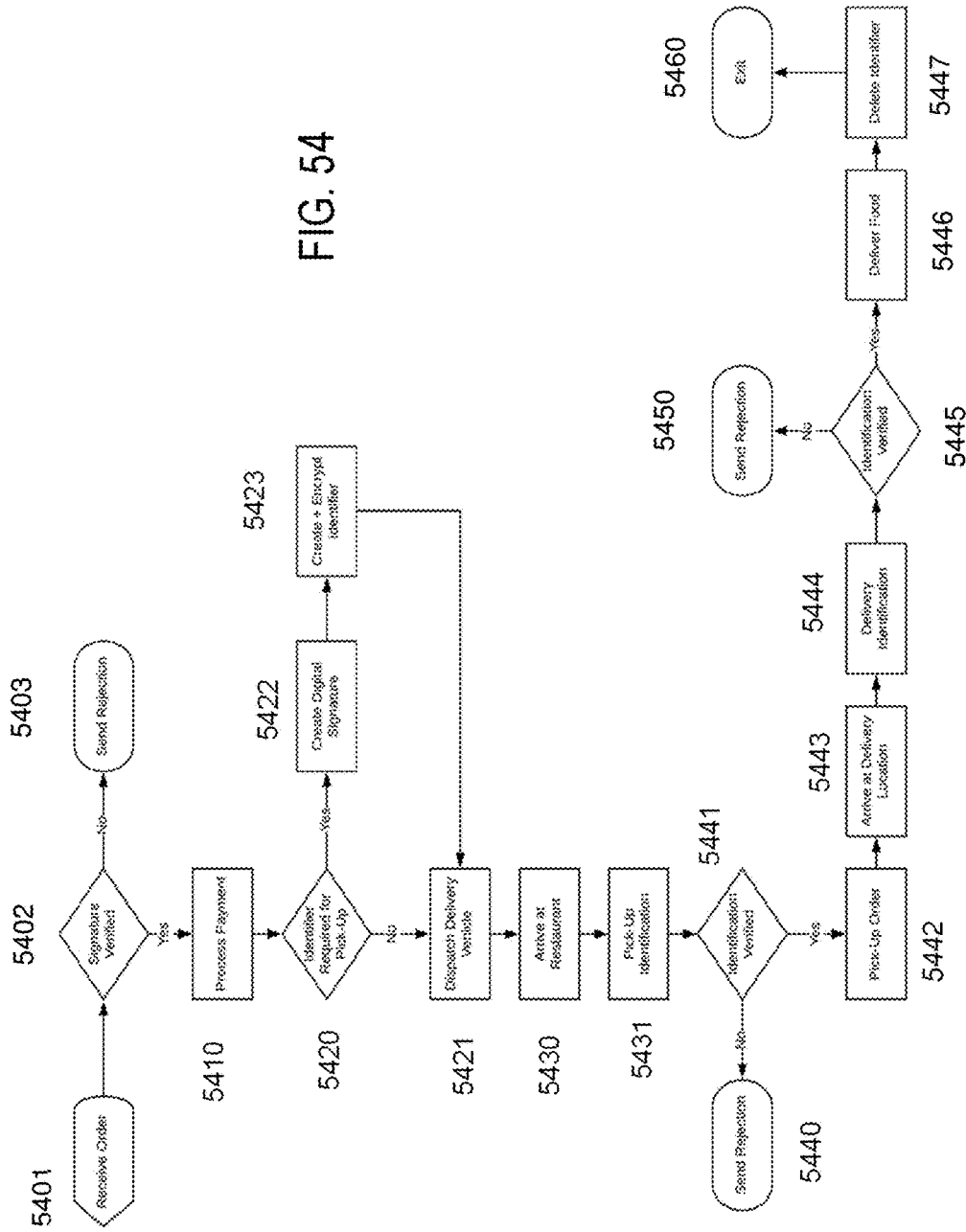
FIG. 54 illustrates additional aspects of third party order flow.

Referring now to FIG. 54, an exemplary third-party delivery flow is illustrated. A third-party delivery service may receive an encrypted order 5401 from an organizer with attached digital signature. The signature may be verified 5402 and the order is either accepted or rejected. If the order is rejected, then the process may send a communication about the rejection 5403. If the order is accepted and verified, payment may be processed 5410 and based on the systems in-place, an identification method or identifier may be required 5420 for order pick-up identification and verification. If an identification method is required for order pick-up, a digital signature may be created 5422 and encrypted 5423 for order identification and verification at order pick-up. Said encryption may take the form of an identifier, such as a QR code and the like. A delivery vehicle or deliverer may be assigned to an order and dispatched 5421 to pick-up said order. As the delivery vehicle or deliverer arrives at the pickup-up location of a restaurant, food preparation facility, or remote location 5430, identification actions may exist 5431. Identification may be at a dispenser, where the delivery vehicle or deliverer's digital signature is verified 5441. Upon successful identification, the order may be dispensed to the third-party delivery vehicle or deliverer for pick-up 5442. If the digital signature is not verified by the identification methods at the dispenser, a rejection may be sent 5440. The delivery vehicle or deliverer may then continue to arrive at a desired delivery location 5443 requested by the organizer. Delivery identification 5444 may take place at the delivery location where either the user, delivery vehicle, or deliverer's digital signature may be verified. If the user is interacting directly with a delivery vehicle, then the user's digital signature may be identified and verified by the delivery service. If the delivery vehicle or deliverer is depositing the order into a dispenser for a user to later pick-up or secondary delivery vehicle or deliverer transferal, then the delivery vehicle's digital signature may be identified and verified by said dispenser or secondary delivery vehicle or deliverer. Upon successful identification 5445 and verification, the food may be delivered 5446, the identifier may be subsequently deleted 5447 or the digital signature marked as used, and the order flow is completed 5460. If the identification fails, then a communication of the rejection may be sent 5450.

User Flow

Figure 55:
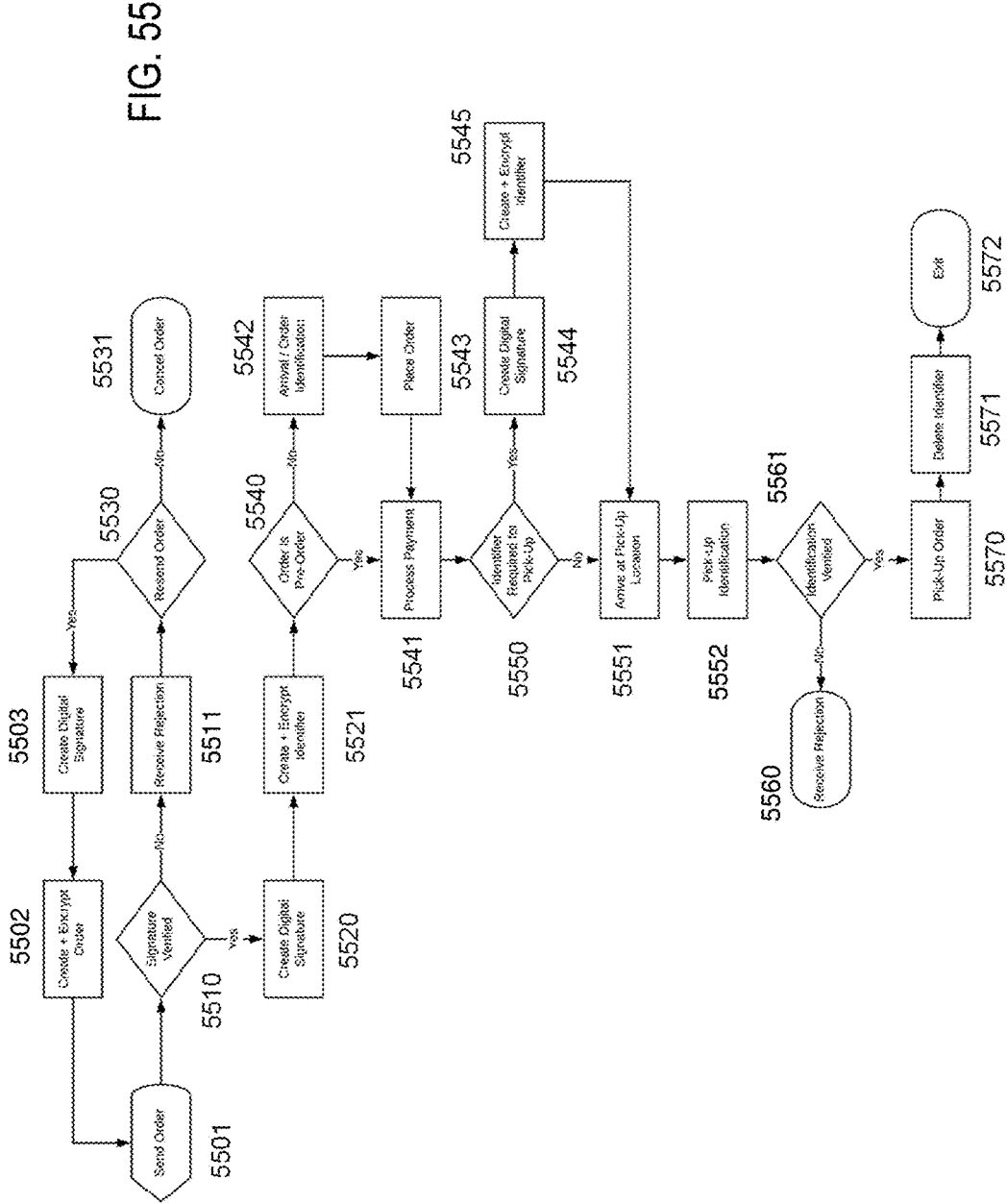
FIG. 55 illustrates aspects of order flow from a user perspective.

Referring now to FIG. 55, a user delivery flow is illustrated. Once a digital signature is created for a user or organizer's order and the order has been encrypted, the organizer may proceed to send the order 5501 to the desired food preparation facility, third-party delivery service, offsite facility, and the like.

The digital signature may be verified 5510 and if successful, the order may be sent to the respective parties and a digitally signed 5520, encrypted identifier 5521 may be created associating the user or organizer with the placed order. If the order's signature verification is rejected, the user or organizer may receive notice of the rejection 5511 and choose to resend the order 5530. If the user or organizer chooses to resend the order, a new digital signature may be created 5503 with encryption 5502, otherwise, the user may cancel the order 5531.

If the order is a pre-order 5540, payment may be instantly processed 5541. If the order is to be placed in-person either onsite of a food preparation facility or a facility remote to a food preparation facility, the identifier 5542 associated with the user or organizer may be used to place order 5543 and subsequent payment processing 5541 upon user or organizer arrival and identification 5551.

In some examples, an identifier may be required for pickup 5550. In such cases, the order may be sent to the respective parties and a digitally signed 5544, encrypted identifier 5545 may be created. Identification methods may decrypt the identifier and verify a user or organizer's signature related to their order. Identification methods for order placement and payment upon user arrival may include, but is not limited to, identifier scan, license plate scan, facial scan, Bluetooth, NFC technologies, geofencing the user or organizer, manual order code entry, and the like.

After an order has been placed and payment has been processed, an identifier 5552 may be created for use of user or organizer identification and signature verification at order pick-up. The same identifier created at step S545 may be used for pick-up verification and identification. Once an organizer arrives 5551 at the pick-up location, organizer identification 5552 may follow. Said identification methods may be identifier scan, facial scan, license plate scan, geofence identification, order number entry, and the like.

Upon successful identification and signature verification 5561, the user or organizer may proceed to pick-up the order 5570, otherwise the user may receive a rejection 5560. In some examples, the identifier may be subsequently deleted 5571 or the digital signature marked as used, and the order flow is completed 5572.

Bin Movement

Figure 56:
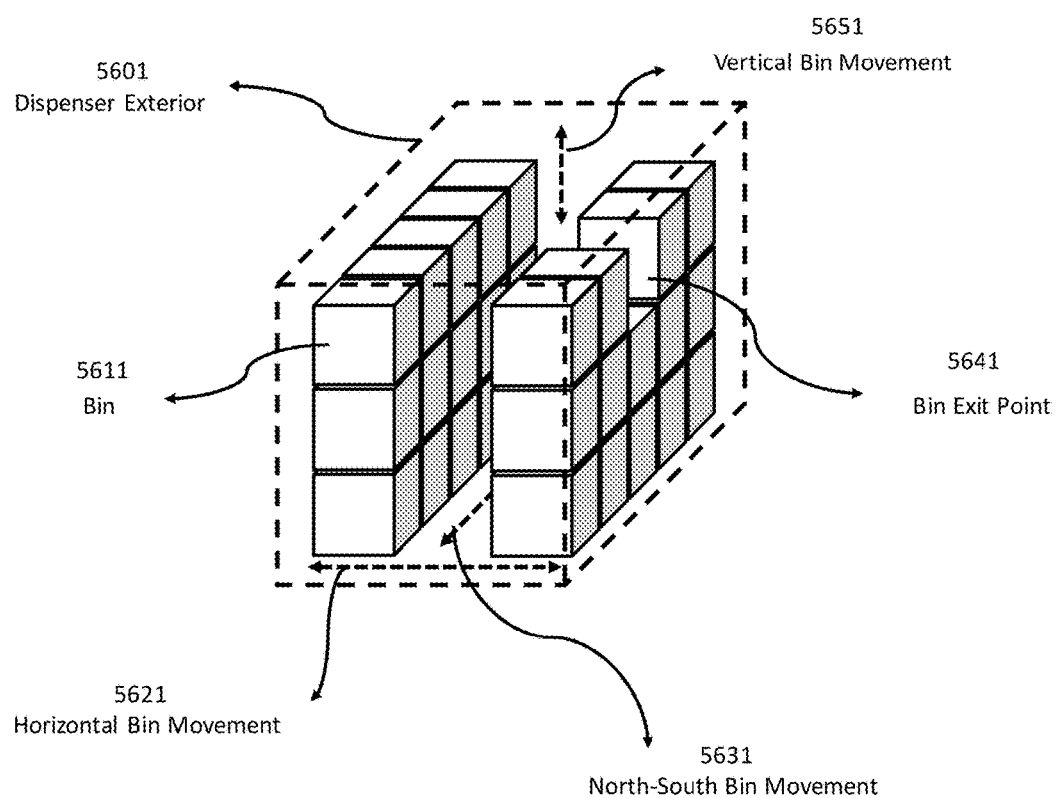
FIG. 56 illustrates aspects of bin movement in an exemplary storage equipped dispenser.

As discussed herein, several different methods of bin movement, may occur within a dispenser. Referring to FIG. 56, an exemplary method of one type of bin movement may be based on a x, y, z axis system or three-dimensional Cartesian coordinate system. For instance, individual bins may move horizontally 5621, vertically 5651, and in a north-south direction 5631 (where north-south relates to a third coordinate direction, not being limited to actual polar orientations). Movement may be made via one or more methods such as a mechanized track, a pick-and-place arm, magnetized containers, and the like. The exterior of the dispenser 5601, may surround and contain several bins of the type of bin 5611. One or more bin exit points 5641 may allow for a customer to retrieve and pick-up an order. Said bin exit point may exist in many forms such as a passage that auto-levels to a user for pick-up, an exit point that directly dispenses a bin on the exterior of a dispenser, an exit point that exposes a bin either flush to the exterior of a dispenser or interior of a dispenser, and the like. An employee may deposit a bin either manually or automatically through one or several entrances to the dispenser. A bin entrance and exit point may also share the same points of conveyance.

An additional form of bin movement within a dispenser may be on a circular conveyor belt or track. The belt may hold a multitude of bins and continue to move in a 360-degree motion, placing bins at either an entrance or exit point. A single or multitude of conveyor belts may exist. The belts may directly house bins within container stations, locks, or designated bays, or the bins may be placed directly on the conveyor belts or carousel. A multitude of options may be used to secure said bin to a conveyor belt.

Additional Features of Combined Orders

An additional method for users to share and combine orders may be for each member of the combine order pool to have enter a code which represents the combined order pool. For instance, an identification code for an organizer may be fixed to the organizer's account or continuously changing. A multitude of users who desire to place an order under said organizer or group may enter in the organizer's or group's account code or another code automatically generated that identifies said organizer or group. Upon entering said account code, the multitude of users may submit their orders and said organizer will be notified of the several order requests with an option to deny or accept. The organizer may continue to place the combined order, with payment and order options in the nature of what is discussed herein. Additionally, a store code or dispenser location code may be combined to said organizer code to direct an organizer to a correct pickup location. A single order may also be placed with said store or dispenser code for a desired location of store or dispenser pickup. Said store or dispenser code will match an organizer order to a predefined or desired pickup location. A group code may also exist which automatically combines and aggregates any order or payment information from various users into a single group order that is sent to said group code. Additional desired restaurant location or dispenser location codes may also apply. Said group order code and group order may then subsequently be sent to a desired restaurant, pickup location, dispenser, and the like. Any user may send the order on behalf of the group, or a designated organizer may be selected.

If a user participating within a combined order pool arrives at the pickup location before any of the other users within the combined order pool, said user may be identified and recognized as the first arriver. The user may be geofenced or recognized through other identification methods. The user may elect to proceed to a dispenser pickup and enact identification methods to pick up the combined order. The user may send a request to the organizer who may send accept or deny the request. The organizer roles may switch based on first user arrival and role reversal may be performed automatically, without the original organizer's approval. Said first arrival user, now organizer, may then enact same role responsibilities of an organizer such as order and payment placing, and order pickup. An organizer role may manually be switched at any time in the combined order process.

Bin Material

In addition to metals, bins may be made of a lightweight, insulated biodegradable material such as a plastic, paper, foam, cork, foil, and the like, that house the same qualities, functions, and designated item slots of a bin discussed herein. Said bin may be involved in the same dispensing fashion and flow but may also be removed and disposed of by the customer. Upon subsequent order fulfillment, an employee or automated function may place a new bin into the dispenser with matched food items, or before items are matched and placed into said bin. Item containers, such as a paper tray, may be placed into a dispenser bin or on a dispenser track itself, outside of a bin flow, with subsequent automation and movement within a dispenser upon order fulfillment, matching, or placement by the employee and user pickup identification.

Insulation Stations and Drink Sleeves

Insulated stations may exist that take the form of dispenser bins, compartments, or designated and insulated containers or cup holders for food and drink items. Said stations may be proximate or fixed to a countertop within kitchen. The fixed stations, bins, compartments, or cup holders may be opened manually or automatically when scanning a packaged, prepared food. After a packaged food order is placed into said station, similar identification methods may exist to a dispenser and the station may release, open, twist, or reveal said ordered food items to the pickup user. Said bins, compartments may contain individualized compartment, with insulated barriers and may be temperature controlled similar to a dispenser bin. A user may control said temperature of the insulated stations. An insulation station may be picked and placed into a dispenser manually or via automated motion. Insulating materials may consist of one or a combination of metal, foam, fiber, cork, foil, and the like.

Selection of Users in Combine Order and Combined Order Pickup

A first user's mobile application may automatically identify though wireless communication additional users using the same mobile application, such as a carpool, within a proximity of the first mobile application user. In this example, a user may not have to send, request, or receive an order invite upon initiating an order. Upon identification, each user may accept to connect and link with one or several nearby users. This may be done so automatically with all nearby users or by a user manually selecting which user to connect or link to. Upon a connection being made, the participating mobile application users are now considered a group and may each individually submit orders to a certain restaurant franchise nonspecific to a specific location, or to a specific restaurant location that may dictate where the other user's may order from. The combined user group may either submit a pre-designated combined order, or rather upon crossing the geofence or Bluetooth boundary upon arrival or proximity to a restaurant, communicate to the group to begin the order process.

The same combine order process may be done for the aforementioned third-party delivery flow. Several users may connect and select one or several restaurant locations to deliver from. A single delivery destination or delivery pickup may be selected for either order or third-party delivery flow. When an order is placed the order is sent on behalf of the entire participating group. Any user participating in the combined order pool may be identified or designated to pick-up an order at either a pickup location or dispenser. Alternatively, a single organizer may be identified and selected by the group to either pickup an item or receive an item from a third-party delivery.

Boundary Containing Multitude of Restaurants

A mobile application user may cross a Geofence or Bluetooth boundary which may consist of multiple restaurants contained within said boundary, such as a mall cafeteria or interstate exit. Said boundary may exist depending on user specification or other factors, such as time of day, hours of operation, and the like. The user may select one of the participating restaurants contained within said boundary zone and proceed to submit an order for pickup. The user may specify a pickup location such as an indoor or drive-through dispenser. Several users may be connected in a group order flow and proceed to order in the same method or process, either selecting the same restaurant or a separate participating restaurant. If several restaurants are selected in a combined order flow, a centralized dispenser may exist to aggregate, store, and dispense said combined order items upon user identification. Any user or a single identified organizer may pick up the order from said dispenser pick up.

Ordering on a User's Behalf

A mobile user participating within a combine group order pool may elect for another user to assign an order and payment method for said first user. A user, for instance a passenger within a vehicle, may select an order on behalf of the driver. The driver may have a pre-existing relationship with the passenger through either mobile application friends or social media contacts. The driver may have already elected that said passenger may order any order and select any payment on behalf of the driver, based on alternative constraints such as on order type, order price, and the like. The passenger may either select the drive under the combined order pool, from a friends or contact list, or may enter the driver's contact information directly into the mobile application. A list of the driver's favorite orders may populate. The passenger may select a driver's favorite order or may continue with a manual selection of other order items. The passenger may then either pay for the driver's order or select a favored payment method designated by the driver. Upon doing so and submitting an order and payment into the combined order pool on behalf of the driver, or any other user, the driver may receive a notification to either accept, deny, or alter any detail of said order such as food items or payment method. This may reduce the time it takes for a driver to place an order and allows minimal effort to accept, deny, or change an order detail of the driver's order within a combined order flow. This flow may apply for other interactions between two or more mobile application users.

Additional GPS Order Details

In addition to the aforementioned, GPS or geofence identification and order method while a user is in transit to a proximate or estimated route, a GPS route may be shared with additional users in the carpool who are linked, connected, or participating within a combined order flow via their mobile applications. The mobile application may designate a location on the entered GPS route of either a single or combined group of user's. For example, the application might say "heads up, there is a Starbucks on your route 5 miles ahead." The single user or group of users may be notified of the impending restaurant and it's radius from the carpool either by approximating the vehicle by distance and direction on the GPS, cross-referencing the restaurant with a designated route entered into the GPS application, or by the user or carpool crossing a geofence boundary. The user or carpool may then either connect to the restaurant and submit their order, wait to be identified onsite at said restaurant with a subsequent, automatic order taking place, or ignore the request to connect and instead wait for the next store on the designated or approximated route to populate within the application. Subsequent order pickup or pickup at a user-designated dispenser may occur inside the store or at the drive-thru. The user or group of users may be notified within the application when the order is ready for pickup. A GPS system may also differentiate between an interstate and common, standard road in order to properly identify and provide appropriate exit points and corresponding restaurants at said exit points.

A user may additionally connect to a restaurant en route of a desired location when taking a taxi or taxi service such as Uber or Lyft. For instance, the application may similarly identify a route placed by the user or group of user's in the carpool, and instead, sync with the taxi or Uber/Lyft driver's identification to provide proper pickup identification. A driver's identification and one or many passengers may be linked, paired or matched together within said flow and application. As mentioned, one or several desired restaurant locations may populate within the user's or group of users' mobile application, identifying several possible locations in proximate or direct route of the desired drop-off location, syncing with the driver or user's GPS application. After submitting an order, the taxi driver may be notified of the restaurant or food pickup address. Said location may be updated within the taxi driver or user's application. The rider or group of riders may designate a pickup location, such as an indoor dispenser, or may continue to a drive-through or car pickup dispenser where identification methods described herein can identify the taxi or Uber/Lyft driver for order pickup. The application may also verify that said user or group of user's is synced to the taxi driver of the vehicle, and upon identification of said taxi driver, to either charge or complete the order process with respect to said passengers.

Multiple Bins

Multiple bins may be paired for a large order or for a combined order flow that may exceed the size limitations of a single bin. Said multitude of bins may be paired to a single pickup identification so that when a user, either of a single order or a combined order, arrives to pickup said order, multiple bins will be dispensed containing the large or combined order items.

Connecting to Restaurant/Inventory Notification

A user or group of users may be identified upon preordering or ordering onsite that a restaurant is out of stock of a desired item. Based on inventory management systems in-place and packaged or marked item scans upon order fulfillment or dispenser placement, a restaurant and integrated application may notify users of item shortage or if an item is out of stock. This notification may be sent to a user or group of users if preordering to a specific location; however, some preorders may not be to a specific location, instead to a general franchise. As mentioned herein, some order flows may start only upon a user's arrival. A user or group of users may be identified upon a radius of or onsite arrival to a restaurant location by either crossing a geofence or Bluetooth boundary, or GPS approximation of distance from a restaurant. Upon user identification by the restaurant, the user or group of users may elect to connect to the restaurant and may select a designated inside or drive-through flow. A menu may populate for that specific restaurant, which indicates that said order flow order flow is placed either onsite or in a radius to said location, conditional to the specific restaurant location. Said menu will contain all in stock items at the time of the menu's creation within the mobile application. Said mobile application may be separate from a kiosk or connect and sync through wireless communications to an order or pickup kiosk onsite. A user or group of connected users in a combined order pool may select items off of said populated menu within each user's mobile application, which may be tied directly to a specific location. Finishing item selection off of said menu, group users may aggregate said items into the group order pool. Once said order flow is submitted and paid for, the user or group of users may continue to the designated dispenser pickup when notified within the mobile application or video board that said order is available for pickup.

Conclusion

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments may also be implemented in combination in a single embodiment. Conversely, various features that are described in the context of a single embodiment may also be implemented in combination in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Glossary

Bin

References to the term Bin are made herein. It is understood that the reference to bin may include a single feature or a combination of either all or a subset of bin qualities discussed herein. A bin may include a single feature not limited to the complexities discussed herein. A bin, in its simplest form, may be interpreted as a designated housing box or location for a prepared food item.

Dispenser

References to the term dispenser are made herein. It is understood that the reference to dispenser may include a single feature or a combination of either all or a subset of dispenser qualities discussed herein. A dispenser may include a single feature not limited to the complexities discussed herein. A bin, in its simplest form, may be interpreted as a designated housing location of a multitude of bins or prepared food items, delivered to a user upon user identification. A dispenser's delivery method is not limited to what is discussed herein and may include a single or combination of delivery methods such as pick and place, a locked bin or locker opened upon user identification, lateral movement, circular movement, and the like.

Identification Methods

References to the identification methods are made herein. It is understood that the reference to identification methods may include a single feature or a combination of either all or a subset of identification methods discussed herein. An identification method may include a single feature not limited to the complexities discussed herein. Identification methods may consist of facial scan identification, biometric scan, order number entry, license plate scan, unique identifier scan, Bluetooth connection, near field communication, and geofencing the user. Additional identification methods may be applied to enable successful order flow described herein. Decryption of information may also occur upon user identification using any combination of identification methods discussed herein.

Wireless Communication Methods

References to the wireless communication methods are made herein. It is understood that the reference to wireless communication methods may include a single feature or a combination of either all or a subset of wireless communication methods discussed herein. A wireless communication method may include a single feature not limited to the complexities discussed herein. Wireless communication methods may consist of text message, email, social media applications, in-application friends list, Bluetooth, near field communications, and messages sent though voice control. Wireless communication methods may include encrypted messaged or firewalls to keep user information secure and safe when shared.

What is claimed is:

1. A method of dispensing food items prepared for consumption by a customer, the method comprising the steps of:
   a) receiving programmable code for execution on a customer smart device;
   b) entering into the customer smart device an identification of the customer;
   c) entering into the customer smart device one or more preferred restaurant franchises;
   d) generating a geographic position of the customer smart device based upon global positioning coordinates;
   e) generating a desired route to a destination and preferred restaurants within a predetermined distance to the route;
   f) displaying a selected preferred restaurant on a screen on the customer smart device, the selected preferred restaurant comprising one of the preferred restaurant franchises;
   g) displaying a travel path to the selected preferred restaurant;
   h) generating an order comprising food items into a customer interface on the customer smart device;
   i) transmitting the order comprising food items to the selected preferred restaurant;
   j) displaying on the customer smart device a direction of travel based upon the geographic position of the customer smart device and a geographic position of the selected preferred restaurant;
   k) transmitting payment information for an amount based upon the food items;
   l) displaying a unique identifier associated with the order for food items;
   m) conveying the unique identifier associated with the order for food items to an automated dispenser; and
   n) based upon conveyance of the unique identifier and the transmitted payment information, causing the automated dispenser to dispense the order for food items.

2. The method of claim 1 for dispensing food items prepared for consumption by a customer additionally comprising the step of periodically updating the geographic position and transmitting the updated geographic position to the selected preferred restaurant.

3. The method of claim 1 for dispensing food items prepared for consumption by a customer additionally comprising the step of periodically updating the geographic position and updating the direction of travel based upon the updated geographic position.

4. The method of claim 1 for dispensing food items prepared for consumption by a customer additionally comprising the step of generating an indication of completion of preparation of the order for food.

5. The method of claim 1 for dispensing food items prepared for consumption by a customer additionally comprising the steps of:
   o) receiving a list of a plurality of users which may participate in forming a food product order;
   p) communicating with the plurality of users, wherein the communication offers an ordering session to two or more of the plurality of users;
   q) receiving orders from two or more of the plurality of users; and
   r) combining the orders received from the two or more of the plurality of users with an order on the customer smart device to generate the order comprising food items that is transmitted to the selected preferred restaurant.

6. The method of claim 5 for dispensing food items prepared for consumption by a customer additionally comprising the steps of receiving payment information from each of the plurality of users from which orders are received and transmitting the payment information to the selected preferred restaurant.

7. The method of claim 1 for dispensing food items prepared for consumption by a customer additionally comprising at least one of the steps of:
   o) generating a travel time;
   p) generating a route of travel;
   q) inputting a permissible deviation in one or both of time or distance from the route of travel;
   r) generating a list of food vendors with automated dispensers within the threshold of travel time or distance from the route of travel.

8. The method of claim 1 for dispensing food items prepared for consumption by a customer additionally comprising the steps of:
   o) scanning a license plate number with an image capture device; and
   p) identifying the order for food based upon the scanned license plate number.

9. The method of claim 1 for dispensing food items prepared for consumption by a customer additionally comprising the steps of:
   o) scanning a face of a customer with an image capture device to generate a facial image;
   p) performing facial recognition on the facial image; and
   q) identifying the order for food via the facial recognition.

10. The method of claim 1 for dispensing food items prepared for consumption by a customer additionally comprising the step of transmitting the unique identifier from the customer smart device to the automated dispenser via one of near field communication and Bluetooth protocols.

11. An automated food dispenser dispensing food prepared for consumption by a human, the dispenser comprising:
   a) a container comprising multiple disparate bins, each bin suitable for storing prepared food and comprising thermal insulation from atmospheric temperature ambient to the respective bins;
   b) at least one cup holder within at least one bin, said cup holder shaped to maintain cup containing fluid in an upright position while the cup is in the cup holder;
   c) a digital input device for receiving a unique order identifier from a customer comprising:
      i) an automated barcode, QR Code, or other unique identifier recognition device; and
      ii) a computer capable of transmitting information relayed by unique identifier and verified by a verification means to the automated food dispenser for further processing;
   d) a receiver for receiving digital information via a distributed network;
   e) a processor in communication with a storage device storing executable code for causing the processor to:
      i) receive an order comprising food items;
      ii) associate the order with a customer and the unique order identifier;
      iii) verify payment status associated with a customer order;
      iv) display on a user interface the food items;
      v) associate the container to receive food items comprising the order;
      vi) register placement of the food items comprising the order into the container;
      vii) receive into a digital input device a user input into the digital input device, the user input comprising the unique identifier; and
      viii) transmit a command to make contents of the container available to the user;
   f) automation for providing bin movement within the dispenser to facilitate loading of the ordered food items into the bins and pickup of the ordered food items based upon input or recognition of the unique order identifier and
   g) automation for delivering the bins containing the ordered food items to the proper customer upon recognition of the unique customer identifier following confirmation of customer payment.

12. The automated food dispenser of claim 11 wherein at least one bin is insulated to retain heat and at least one bin is insulated to reject heat.

13. The automated food dispenser of claim 11 wherein prepared food items stored in the bins are prepared specific to a user's specification and are ready for immediate consumption by the user.

14. The automated food dispenser of claim 11 wherein disparate food items are individually packaged.

15. The automated food dispenser of claim 11 wherein each ordered food item is prepared based upon the order and assigned a designated dispenser bin and placed inside an insulated area of the designated bin.

16. The automated food dispenser of claim 15 wherein a dispenser container storing the food items prepared according to the order is matched to the unique order identifier and made available for automated order pickup based upon user input of the unique order identifier.

17. The automated food dispenser of claim 16 wherein the executable code causes the processor to receive an estimated time of travel for the customer to arrive at the automated food dispenser.

18. The automated food dispenser of claim 17 wherein the processor is additionally operative to transmit a control signal to cause the automation to move a bin based upon input of the unique order identifier.

19. The automated food dispenser of claim 11 wherein the unique order identifier comprises a barcode.

20. The automated food dispenser of claim 11 wherein an identification process comprises a license plate scan.

* * * * *